United States Patent
Tsukazaki et al.

(10) Patent No.: US 7,801,818 B2
(45) Date of Patent: Sep. 21, 2010

(54) CONTENT PROVIDING SYSTEM, INFORMATION PROCESSING DEVICE AND METHOD, AND PROGRAM

(75) Inventors: Hideo Tsukazaki, Tokyo (JP); Kotaro Asaka, Kanagawa (JP); Akira Kurihara, Kanagawa (JP)

(73) Assignee: Sony Corporation, Tokyo (JP)

( * ) Notice: Subject to any disclaimer, the term of this patent is extended or adjusted under 35 U.S.C. 154(b) by 1173 days.

(21) Appl. No.: 10/518,797

(22) PCT Filed: May 20, 2004

(86) PCT No.: PCT/JP2004/007235

§ 371 (c)(1), (2), (4) Date: Dec. 20, 2004

(87) PCT Pub. No.: WO2004/104883

PCT Pub. Date: Dec. 2, 2004

(65) Prior Publication Data

US 2006/0089962 A1    Apr. 27, 2006

(30) Foreign Application Priority Data

May 20, 2003 (JP) ............................. 2003-141440
May 17, 2004 (JP) ............................. 2004-146402

(51) Int. Cl.
*G06Q 99/00* (2006.01)

(52) U.S. Cl. ............................. 705/52; 705/56; 705/57; 705/59

(58) Field of Classification Search ............... 705/50–79
See application file for complete search history.

(56) References Cited

U.S. PATENT DOCUMENTS 6,574,611 B1 * 6/2003 Matsuyama et al. ........... 705/57

(Continued)

FOREIGN PATENT DOCUMENTS

EP    1 071 031 A1    1/2001

(Continued)

OTHER PUBLICATIONS

Muller, "Desktop Encyclopedia of the Internet", 1999, Artech House Inc., Norwood, MA, all pages.*

(Continued)

*Primary Examiner*—Andrew J. Fischer
*Assistant Examiner*—Jacob C. Coppola
(74) *Attorney, Agent, or Firm*—Oblon, Spivak, McClelland, Maier & Neustadt, L.L.P.

(57) ABSTRACT

The present invention relates to a content-providing system, information-processing apparatus, information-processing methods and programs which are capable of keeping up with changes in content value. A license server 221 transmits a utilization condition and a price table to a terminal 211. The terminal 211 has set contents stored in advance in a database 212. In an offline environment, the terminal 211 is capable of utilizing desired contents by using an electronic point count. The terminal 211 transmits information on contents used by the terminal 211 to the license server 221. The license server 221 collects a history of utilizations of contents in the terminal 211, extracts apparatus favorite contents for the terminal 211 from a database and properly transmits the favorite contents as well as price data reflecting changes in price to the terminal 211. The present invention is thus suitable for a system for providing contents.

3 Claims, 45 Drawing Sheets

U.S. PATENT DOCUMENTS

| | | | |
|---|---|---|---|
| 7,063,251 B2 * | 6/2006 | Namekawa et al. | 235/375 |
| 7,092,909 B2 * | 8/2006 | Muto et al. | 705/52 |
| 7,120,604 B2 * | 10/2006 | Maari | 705/51 |
| 7,266,530 B2 * | 9/2007 | Yodo | 705/55 |
| 2001/0047318 A1 * | 11/2001 | Yodo | 705/34 |
| 2002/0035552 A1 * | 3/2002 | Tsubura | 705/412 |
| 2002/0035688 A1 * | 3/2002 | Kutaragi et al. | 713/168 |
| 2004/0073451 A1 * | 4/2004 | Maari | 705/1 |
| 2004/0243488 A1 * | 12/2004 | Yamamoto et al. | 705/30 |
| 2004/0249759 A1 * | 12/2004 | Higashi et al. | 705/59 |
| 2006/0168451 A1 * | 7/2006 | Ishibashi et al. | 713/176 |

FOREIGN PATENT DOCUMENTS

| | | |
|---|---|---|
| EP | 1071031 A1 * | 1/2001 |
| JP | 11-272762 | 10/1999 |
| JP | 2000-148861 | 5/2000 |
| JP | 2001-83874 | 3/2001 |
| JP | 2002-108918 | 4/2002 |
| JP | 2002-169912 | 6/2002 |
| JP | 2002-176419 | 6/2002 |
| JP | 2002-217894 | 8/2002 |
| JP | 2002-279211 | 9/2002 |
| JP | 2002-320246 | 10/2002 |
| JP | 2002-342223 | 11/2002 |
| JP | 2003-76375 | 3/2003 |

OTHER PUBLICATIONS

Gralla, "How the Internet Works", Millennium Edition, 1999, Que Corporation, Indianapolis, IN, all pages.*

White, "How Computers Work", Millennium Edition, 1999, Que Corporation, Indianapolis, IN, all pages.*

Derfler, "How Networks Work", Bestseller Edition, 1996, Ziff-Davis Press, Emeryville, CA, all pages.*

* cited by examiner

FIG. 3

| ID OF SET CONTENT | APPARATUS ID | SELLING PRICE (¥) | SALE DATE |
|---|---|---|---|
| ID OF CONTENT Ca | ID OF TERMINAL 11-1 | 200 | 04/09/2005 |
| ID OF CONTENT Cb | ID OF TERMINAL 11-1 | 200 | 05/01/2003 |
| ID OF CONTENT Cc | ID OF TERMINAL 11-1 | 300 | 04/11/2003 |
| ID OF CONTENT Ca | ID OF TERMINAL 11-2 | 250 | 04/13/2002 |
| ID OF CONTENT Ca | ID OF TERMINAL 11-3 | 200 | 11/11/2002 |
| ID OF CONTENT Cd | ID OF TERMINAL 11-3 | 200 | 04/29/2003 |

21A

F I G. 4

| MODEL | TERMINAL MANUFACTURER | APPARATUS ID |
|---|---|---|
| MODEL M1-1 | MANUFACTURER M1 | ID OF TERMINAL 11-1 |
| | | ID OF TERMINAL 11-2 |
| MODEL M2-1 | MANUFACTURER M2 | ID OF TERMINAL 11-3 |
| | | ID OF TERMINAL 11-4 |

| CONTENT PRODUCER | ID OF SET CONTENT |
|---|---|
| LABEL L1 | ID OF SET CONTENT Ca |
|  | ID OF SET CONTENT Cb |
| LABEL L2 | ID OF SET CONTENT Cc |
| LABEL L3 | ID OF SET CONTENT Cd |
|  | ID OF SET CONTENT Ce |
| ⋮ | |

FIG. 14

| ID OF SET CONTENT | PROGRAM ID | SELLING PRICE (¥) | SALE DATE |
|---|---|---|---|
| ID OF CONTENT Ca | ID OF PROGRAM Pa | 200 | 04/09/2005 |
| ID OF CONTENT Cb | ID OF PROGRAM Pa | 200 | 05/01/2003 |
| ID OF CONTENT Cc | ID OF PROGRAM Pa | 300 | 04/11/2003 |
| ID OF CONTENT Ca | ID OF PROGRAM Pa | 250 | 04/13/2002 |
| ID OF CONTENT Ca | ID OF PROGRAM Pb | 200 | 11/11/2002 |
| ID OF CONTENT Cd | ID OF PROGRAM Pb | 200 | 04/29/2003 |

| PROGRAM DEVELOPMENT ENTERPRISE | PROGRAM ID |
|---|---|
| MANUFACTURER P1 | ID OF PROGRAM Pa |
|  | ID OF PROGRAM Pb |
| MANUFACTURER P2 | ID OF PROGRAM Pc |
|  | ID OF PROGRAM Pd |
| ⋮ | |

| ID OF SET CONTENT | PROGRAM ID | NUMBER OF REPRODUCTIONS |
|---|---|---|
| ID OF CONTENT Ca | ID OF PROGRAM Pa | 10 |
| ID OF CONTENT Cb | ID OF PROGRAM Pa | 3 |
| ID OF CONTENT Cc | ID OF PROGRAM Pa | 92 |
| ID OF CONTENT Ca | ID OF PROGRAM Pa | 4 |
| ID OF CONTENT Ca | ID OF PROGRAM Pb | 4 |
| ID OF CONTENT Cd | ID OF PROGRAM Pb | 13 |

| IDs OF USABLE SET CONTENTS | GAINED POINT COUNT |
|---|---|
| CID01 TO CID29 | 1000 |
| CID80 TO CID99 | 50 |

| RANGE OF SET-CONTENT IDs | APPARATUS ID | SALE POINT CONTENT | SELLING PRICE (¥) | SALE DATE |
|---|---|---|---|---|
| CID01 TO 29 | ID OF TERMINAL211-1 | 1000 | 5000 | 5/20/2004 |
| CID50 TO 79 | ID OF TERMINAL211-1 | 500 | 2500 | 6/10/2004 |
| CID80 TO 99 | ID OF TERMINAL211-1 | 1500 | 7500 | 7/21/2004 |
| CID01 TO 29 | ID OF TERMINAL211-2 | 1000 | 5000 | 6/20/2004 |
| CID40 TO 49 | ID OF TERMINAL211-3 | 500 | 2500 | 6/20/2004 |
| CID80 TO 99 | ID OF TERMINAL211-3 | 1000 | 5000 | 8/10/2004 |

FIG. 21

| MODEL | TERMINAL MANUFACTURER | APPARATUS ID |
|---|---|---|
| MODEL M1-1 | MANUFACTURER M1 | ID OF TERMINAL 211-1 |
| | | ID OF TERMINAL 211-2 |
| MODEL M2-1 | MANUFACTURER M2 | ID OF TERMINAL 211-3 |
| | | ID OF TERMINAL 211-4 |
| ⋮ | | |

| CONTENT PRODUCER | RANGE OF SET-CONTENT IDs |
|---|---|
| LABEL L1 | CID01 TO 29 |
|  | CID50 TO 79 |
| LABEL L2 | CID30 TO 39 |
| LABEL L3 | CID40 TO 49 |
|  | CID80 TO 99 |
| ⋮ | |

| ID OF SET CONTENT | PERIOD | NECESSARY POINT COUNT |
|---|---|---|
| CID01 | 07/06/2004 TO 08/06/2004 | 10 |
| CID01 | 05/07/2004 ~ | 5 |
| CID02 | NO SETTING | 5 |
| CID02-FRINGE01 | 07/10/2004 ~ | 20 |

| APPARATUS ID | ID OF UTILIZED CONTENT | UTILIZATION DATE/TIME | UTILIZED PORTION | UTILIZATION LOCATION | GRADE |
|---|---|---|---|---|---|
| ID OF TERMINAL 211-1 | CID01 | 07/08/2004 AT 19:01 | 0:00 – 1:30 | 43:141 | 4 |
| ID OF TERMINAL 211-2 | CID01 – FRINGE01 | 07/08/2004 AT 21:01 | 0:00 – 1:30 | 35:140 | – |
| ID OF TERMINAL 211-3 | CID40 | 07/08/2004 AT 21:03 | 1:30 – 1:45 | 33:131 | 2 |

| CONTENT ID | UTILIZATION DATE/TIME TYPE | UTILIZED-PORTION TYPE | UTILIZATION-AREA TYPE | GENRE |
|---|---|---|---|---|
| CID01 | MORNING | ALL | RESIDENTIAL STREET | JAZZ |
| CID02 | MORNING AND EVENING | ALL | MOBILE | J-POP |
| CID03 | INDETERMINATE | CHORUS | RESIDENTIAL STREET | CLUB |
| CID04 | NIGHT | INTRODUCTION | INDETERMINATE | CLASSIC |

| APPARATUS ID | UTILIZATION DATE/TIME TYPE | UTILIZED-PORTION TYPE | UTILIZATION-AREA TYPE | GENRE |
|---|---|---|---|---|
| ID OF TERMINAL 211-1 | MORNING | INTRODUCTION | RESIDENTIAL STREET | J-POP |
| ID OF TERMINAL 211-2 | MORNING AND EVENING | ALL | MOBILE | JAZZ |

FIG. 28

| CONTENT ID | CONTENT DATA | |
|---|---|---|
| CID01 | AV DATA | META DATA |
| CID02 | AV DATA | META DATA |
| CID03 | AV DATA | META DATA |
| CID04 | AV DATA | META DATA |
| CID05 | AV DATA | META DATA |

| UTILIZATION-HISTORY ID | ID OF UTILIZED CONTENT | UTILIZATION DATE/TIME | UTILIZED PORTION | UTILIZATION LOCATION | GRADE |
|---|---|---|---|---|---|
| UID01 | CID01 | 07/08/2004 AT 19:01 | 0:00 – 1:30 | 43:141 | 4 |
| UID02 | CID01 – FRINGE01 | 07/08/2004 AT 21:01 | 0:00 – 1:30 | 43:141 | – |
| UID03 | CID03 | 07/08/2004 AT 21:03 | 1:30 – 1:45 | 43:142 | 5 |
| UID04 | CID02 | 07/09/2004 AT 10:03 | 0:00 – 3:45 | 44:142 | – |
| UID05 | CID03 | 07/09/2004 AT 21:03 | 1:30 – 1:45 | 43:141 | 0 |

| FAVORITE TYPE | FAVORITE NAME | CONTENT ID |
|---|---|---|
| GENRE | JAZZ | CID01 |
|  | CLASSIC | CID05 |
| SITUATION | WAKE-UP MUSIC | CID01 |
| TIME BAND | NIGHT TYPE | CID04 |
|  |  | CID05 |

| ID OF SET CONTENT | PURCHASING DATE/TIME | CONSUMED POINT COUNT |
|---|---|---|
| CID01 | 07/06/2004 AT 18:05:04 | 10 |
| CID01-FRINGE01 | 08/07/2004 AT 01:05:04 | 5 |
| CID03 | 07/06/2004 AT 08:30:00 | 5 |
| CID04 | 08/10/2004 AT 08:30:00 | 20 |

F I G. 47

| SET DISCOUNT | PRICE TIME VARIATIONS | SPECIAL CAMPAIGNS |
|---|---|---|
| · IF PURCHASED INDIVIDUALLY, YOU HAVE TO PURCHASE CONTENTS AT 10 POINTS PER CONTENT. IF PURHCASED COLLECTIVELY AS AN ALBUM, HOWEVER, YOU ARE REQUIRED ONLY TO PAY 6 POINTS PER CONTENT.<br>· IF PURCHASED INDIVIDUALLY, YOU HAVE TO PURCHASE CONTENTS AT 10 POINTS PER CONTENT. IF AT LEAST 10 CONTENTS OF THE SAME ARTIST ARE PURCHASED, HOWEVER, YOU ARE REQUIRED ONLY TO PAY 8 POINTS PER CONTENT.<br>· IF AT LEAST 30 CONTENTS PRODUCED BY THE SAME PRODUCER ARE PURCHASED CUMULATIVELY, A RIGHT OF 5 POINTS IS RETURNED BACK TO YOU. | · DURING A PERIOD OF 3 MONTHS AFTER ANNOUNCEMENT OF A CONTENT, THE CONTENT IS TREATED LIKE A NEW ONE, HAVING A VALUE OF 5 POINTS. AFTER THE PERIOD OF 3 MONTHS HAS LAPSED, HOWEVER, THE CONTENT ONLY HAS A VALUE OF 2 POINTS.<br>· 2 WEEKS OF A SELLING SEASON OF A NEW SONG, THE NEW SONG IS WORTH 1 POINT BUT IS RAISED TO 5 POINTS IN ADJUSTMENT TO CD SALES. | · SONGS LIKE CHRISTMAS SONGS, WHICH ARE NOT SOLD DURING AN OFF SEASON, CAN BE LISTENED TO AT A POINT COUNT EQUAL TO HALF THE NORMAL POINT COUNT IN A SALES CAMPAIGN DURING AN OFF SEASON.<br>· A THEME SONG OF A MOVIE IS RAISED BY NECESSARY POINTS IN ADJUSTMENT TO A SEASON OF PUTTING THE MOVIE IN A TV BROADCAST.<br>· AS A TIE-UP WITH HARDWARE MANUFACTURER, THE PRICE OF A CONTENT IS DISCOUNTED BY NECESSARY POINTS WHEN THE CONTENT IS LISTENED TO BY USING PARTICULAR HARDWARE. |

CONTENT PROVIDING SYSTEM, INFORMATION PROCESSING DEVICE AND METHOD, AND PROGRAM

TECHNICAL FIELD

The present invention relates to a content-providing system, an information-processing apparatus, an information-processing method and a program. More particularly, the present invention relates to a content-providing system capable of effectively providing contents, an information-processing apparatus and an information-processing method, which are used in the content-processing system, as well as a program implementing the information-processing method.

BACKGROUND ART

FIG. 1 is a diagram showing a typical configuration of a content-providing system disclosed in Japanese Patent Laid-open No. 2002-359616.

A terminal 1 receives an encrypted content transmitted by a content server 3 by way of a network 2. The header of the received content includes a license identification used for identifying a license required to use the content. The terminal 1 transmits a request for the license to a license server 4 by way of the network 2 on the basis of the license identification. Receiving the request, the license server 4 carries out a fee-charging process before transmitting the license to the terminal 1. The terminal 1 is capable of decrypting the content and reproducing the decrypted content provided that the terminal 1 has the license of using the content.

Conditions for using the license transmitted by the license server 4 to the terminal 1 include a usage time limit limiting a period during which the license is effective.

In the method described above, however, the value of the content is assumed to be a fixed value so that the method described above has a problem that the license cannot be modified in accordance with an actual change in content value with the lapse of time.

In addition, while the license server 4 is capable of knowing a license granted to the terminal 1, the license server 4 is not capable of grasping the state of actual utilization of the content in the terminal 1.

DISCLOSURE OF INVENTION

It is thus an object of the present invention addressing the problems described above to provide a server with a capability of keeping up with changes in content value and grasping the state of actual utilization of the content in a terminal.

A first content-providing system provided by the present invention is a content-providing system including a terminal for utilizing contents and a server connected to the terminal through a network and used for managing the contents. The first content-providing system is characterized in that:

the terminal has:

storage means for storing the contents in advance;

request means for making a request for utilization of predetermined contents pertaining to a range to be purchased by transmission of content IDs identifying the predetermined contents among a plurality of contents stored in the storage means and an electronic point count for purchasing the predetermined contents to the server;

reception means for receiving a table associating the content IDs with the electronic point count and a utilization condition transmitted by the server at the request made by the request means;

utilization-condition storage means for storing the utilization condition and the table, which are received by the reception means; and utilization execution means for executing utilization of the predetermined contents pertaining to the range on the basis of the utilization condition and the table, which have been stored in the utilization-condition storage means; whereas the server has:

utilization-condition transmission means for transmitting the table associating the content IDs with the electronic point count and the utilization condition for utilizing the predetermined contents pertaining to the range as contents, utilization of which is requested by the request means employed in the terminal, to the terminal;

sales-history information storage means for storing sales-history information of the predetermined contents pertaining to the range as information including the content IDs identifying the predetermined contents, utilization of which is requested by the request means employed in the terminal;

collection means for collecting sales records of contents utilized by the terminal on the basis of the sales-history information stored in the sales-history information storage means; and processing execution means for carrying out processing based on the sales records; and in a process to update the electronic point count of the table, the utilization-condition transmission means employed in the server also transmits a content ID, the electronic point count of which is to be updated, and an update of the electronic point count whereas the utilization-condition storage means employed in the terminal updates the table on the basis of the content ID and the update of the electronic point count, which are received from the server.

In accordance with the first invention described above, in the terminal, a request for utilization of predetermined contents pertaining to a range is made by transmission of content IDs identifying the predetermined contents among a plurality of contents stored in advance and an electronic point count for purchasing the predetermined contents to the server. Then, a table associating the content IDs with the electronic point count and a utilization condition transmitted by the server are received. Subsequently, utilization of the predetermined contents pertaining to the range is executed on the basis of the utilization condition and the table.

In the server, on the other hand, the table and the utilization condition are transmitted to the terminal. Then, sales-history information of the predetermined contents pertaining to the range is stored. Subsequently, sales records of contents utilized by the terminal are collected on the basis of the sales-history information. Finally, processing based on the sales records is carried out.

In addition, in a process to update the electronic point count of the table, in the server, a content ID, the electronic point count of which is to be updated, and an update of the electronic point count are transmitted to the terminal. In the terminal, on the other hand, the table is updated on the basis of the content ID and the update of the electronic point count, which are received from the server.

A first information-processing apparatus provided by the present invention is an information-processing apparatus connected to a terminal for using a content through a network. The first information-processing apparatus is characterized in that the first information-processing apparatus includes:

transmission means for transmitting a table associating content IDs of contents with an electronic point count and a utilization condition for utilizing predetermined contents pertaining to a range as contents, utilization of which is requested by the terminal, to the terminal;

sales-history information storage means for storing sales-history information of the predetermined contents pertaining to the range received from the terminal as information including the content IDs identifying the predetermined contents;

collection means for collecting sales records of contents utilized by the terminal on the basis of the sales-history information stored in the sales-history information storage means; and processing execution means for carrying out processing based on the sales records, wherein, in a process to update the electronic point count of the table, the transmission means also transmits a content ID, the electronic point count of which is to be updated, and an update of the electronic point count to the terminal.

In the first information-processing apparatus, the sales-history information stored in the sales-history information storage means may further include an apparatus ID used for identifying the terminal.

The first information-processing apparatus may further have:

acquisition means for acquiring execution-history information representing a history of executions of utilizations of the contents stored in the terminal; and utilization-history information storage means for storing utilization-history information including the execution-history information acquired by the acquisition means. In the first information-processing apparatus, the collection means further collects utilization records of contents utilized by the terminal on the basis of the utilization-history information.

The first information-processing apparatus may further have favorite extraction means for extracting information of contents each serving as a favorite with a user using the terminal on the basis of the utilization-history information stored in the utilization-history information storage means and information on favorites stored in the terminal. In this case, the transmission means transmits information extracted by the favorite extraction means as the information of contents each serving as a favorite with the user using the terminal to the terminal.

A first information-processing method provided by the present invention is characterized in that the first information-processing method includes:

a first transmission step of transmitting a table associating content IDs of contents with an electronic point count and a utilization condition for utilizing predetermined contents pertaining to a range as contents, utilization of which is requested by a terminal, to the terminal;

a sales-history information storage control step of controlling an operation to store sales-history information of the predetermined contents pertaining to the range received from the terminal as information including the content IDs identifying the predetermined contents;

a collection step of collecting sales records of contents utilized by the terminal on the basis of the sales-history information stored in the operation controlled by processing carried out at the sales-history information storage control step;

a processing execution step of carrying out processing based on the sales records; and a second transmission step of transmitting a content ID, the electronic point count of which is to be updated, and an update of the electronic point count to the terminal in a process to update the electronic point count of the table.

A first program provided by the present invention is characterized in that that the first program is a program to be executed by a computer to carry out processing including:

a first transmission step of transmitting a table associating content IDs of contents with an electronic point count and a utilization condition for utilizing predetermined contents pertaining to a range as contents, utilization of which is requested by a terminal, to the terminal;

a sales-history information storage control step of controlling an operation to store sales-history information of the predetermined contents pertaining to the range received from the terminal as information including the content IDs identifying the predetermined contents;

a collection step of collecting sales records of contents utilized by the terminal on the basis of the sales-history information stored in the operation controlled by processing carried out at the sales-history information storage control step;

a processing execution step of carrying out processing based on the sales records; and a second transmission step of transmitting a content ID, the electronic point count of which is to be updated, and an update of the electronic point count to the terminal in a process to update the electronic point count of the table.

In accordance with the second inventions described above, a table associating content IDs of contents with an electronic point count and a utilization condition for utilizing predetermined contents pertaining to a range as contents, utilization of which is requested by a terminal, are transmitted to the terminal. Then, sales records of contents utilized by the terminal are collected on the basis of sales-history information received from the terminal as information including the content IDs identifying the predetermined contents pertaining to the range. Subsequently, processing based on the sales records is carried out. In addition, a content ID, the electronic point count of which is to be updated, and an update of the electronic point count are transmitted to the terminal in a process to update the electronic point count of the table.

A second information-processing apparatus provided by the present invention is an information-processing apparatus connected by a network to a server for providing contents. The second information-processing apparatus is characterized in that the second information-processing apparatus includes:

storage means for storing the contents in advance;

request means for making a request for utilization of predetermined contents pertaining to a range to be purchased by transmission of content IDs identifying the predetermined contents among a plurality of contents stored in the storage means and an electronic point count for purchasing the predetermined contents to the server;

reception means for receiving a table associating the content IDs with the electronic point count and a utilization condition transmitted by the server at the request made by the request means;

utilization-condition storage means for storing the utilization condition and the table, which are received by the reception means; and utilization execution means for executing utilization of the predetermined contents pertaining to the range on the basis of the utilization condition and the table, which are stored in the utilization-condition storage means, wherein, when a content ID, the electronic point count of which is to be updated, and an update of the electronic point count are received from the server, the utilization-condition storage means updates the table on the basis of the received content ID and the received update of the electronic point count.

The second information-processing apparatus may further have ID storage means for storing an apparatus ID used for identifying the second information-processing apparatus. The request means transmits the apparatus ID from the ID storage means along with the content IDs of the predetermined contents pertaining to the range to be purchased and the electronic point count for purchasing the predetermined contents in order to make the request for utilization of the predetermined contents pertaining to the range.

The second information-processing apparatus may further have:

execution-history information storage means for storing execution-history information representing a history of executions of utilizations of the predetermined contents pertaining to the range; and execution-history information transmission means for transmitting the execution-history information stored in the execution-history information storage means to the server.

In the second information-processing apparatus, the reception means further receives information on favorite contents of a user using the second information-processing apparatus from the server as information based on the execution-history information, and the utilization execution means executes utilizations of the predetermined contents pertaining to the range on the basis of the information on favorite contents.

A second information-processing method provided by the present invention is characterized in that the second information-processing method includes:

a request step of making a request for utilization of predetermined contents pertaining to a range to be purchased by transmission of content IDs identifying the predetermined contents among a plurality of contents stored in advance and an electronic point count for purchasing the predetermined contents to the server;

a reception step of receiving a table associating the content IDs with the electronic point count and a utilization condition transmitted by the server at the request made in processing carried out at the request step;

a utilization-condition storage control step of controlling an operation to store the utilization condition and the table, which are received in processing carried out at the reception step, into a utilization-condition storage unit;

a utilization execution step of executing utilization of the contents pertaining to the range on the basis of the utilization condition and the table, which are stored in the operation controlled by processing carried out at the utilization-condition storage step; and an updating step of updating the table stored in the utilization-condition storage unit on the basis of a content ID, the electronic point count of which is to be updated, and an update of the electronic point count when the content ID and the update are received from the server.

A second program provided by the present invention is characterized in that the second program is a program to be executed by a computer to carry out processing including:

a request step of making a request for utilization of predetermined contents pertaining to a range to be purchased by transmission of content IDs identifying the predetermined contents among a plurality of contents stored in advance and an electronic point count for purchasing the predetermined contents to the server;

a reception step of receiving a table associating the content IDs with the electronic point count and a utilization condition transmitted by the server at the request made in processing carried out at the request step;

a utilization-condition storage control step of controlling an operation to store the utilization condition and the table, which are received in processing carried out at the reception step, into a utilization-condition storage unit;

a utilization execution step of executing utilization of the contents on the basis of the utilization condition and the table, which are stored in the operation controlled by processing carried out at the utilization-condition storage step; and an updating step of updating the table stored in the utilization-condition storage unit on the basis of a content ID, the electronic point count of which is to be updated, and an update of the electronic point count when the content ID and the update are received from the server.

In accordance with the third inventions described above, a request for utilization of predetermined contents pertaining to a range to be purchased is made by transmission of content IDs identifying the predetermined contents among a plurality of contents stored in advance and an electronic point count for purchasing the predetermined contents to the server. Then, a table associating the content IDs with the electronic point count and a utilization condition transmitted by the server are received. Subsequently, utilization of the predetermined contents is executed on the basis of the utilization condition and the table. In addition, the table is updated on the basis of a content ID, the electronic point count of which is to be updated and an update of the electronic point count when the content ID and the update are received from the server.

A second content-providing system provided by the present invention is a content-providing system including a terminal and a server. The second content-providing system is characterized in that:

the terminal has:

storage means for storing contents in advance;

ID storage means for storing an apparatus ID of the terminal or a program ID of an application program used for utilizing a content;

request means for making a request for utilization of predetermined contents specified among the contents stored in the storage means by transmission of content IDs identifying the predetermined contents and the apparatus ID or the program ID to the server;

reception means for receiving a utilization condition transmitted by the server at the request made by the request means; and utilization execution means for executing utilization of the predetermined contents on the basis of the utilization condition by execution of the application program, whereas the server has:

utilization-condition transmission means for transmitting a utilization condition for utilizing the predetermined contents, utilization of which is requested by the request means employed in the terminal, to the terminal;

utilization-history information storage means for storing information including the content IDs and the apparatus ID or the program ID, which are received from the request means employed in the terminal, as utilization-history information of the predetermined contents;

collection means for collecting utilization records of contents utilized by the terminal or utilized by execution of the application program on the basis of the utilization-history information stored in the utilization-history information storage means; and processing execution means for carrying out processing based on the utilization records.

In accordance with the fourth invention described above, in the terminal, contents are stored in advance. Then, an apparatus ID of the terminal or a program ID of an application program used for utilizing a content is stored. Subsequently, a request for utilization of predetermined contents is made by transmission of content IDs identifying the predetermined contents and the apparatus ID or the program ID to the server. Then, a utilization condition transmitted by the server at the request is received. Finally, utilization of the predetermined contents is executed on the basis of the utilization condition by execution of the application program.

In the server, on the other hand, a utilization condition for utilizing the predetermined contents, utilization of which is requested by the terminal, is transmitted to the terminal. Then, information including the content IDs and the apparatus ID or the program ID, which are received from the terminal, is stored as utilization-history information of the predetermined contents. Subsequently, utilization records of contents utilized by the terminal or utilized by execution of the application program are collected on the basis of the stored utilization-history information. Finally, processing based on the utilization records is executed.

In the second content-providing system, the storage means of the terminal can be mounted and demounted on and from the terminal.

It is possible to provide the second content-providing system with a configuration in which:

the terminal further has execution-history information storage means for storing execution-history information representing a history of executions of the application program used for utilizing the predetermined contents;

the server further has acquisition means for acquiring the execution-history information stored in the execution-history storage means employed in the terminal;

the utilization-history information storage means employed in the server is used for storing the utilization-history information including the content IDs and the apparatus ID or the program ID, which are received from the request means employed in the terminal, as well as the execution-history information acquired by the acquisition means; and the collection means employed in the server collects utilization records of contents utilized by the terminal or utilized by execution of the application program and execution records of the application program on the basis of the utilization-history information.

It is possible to provide the second content-providing system with another configuration in which:

the server further has acquisition means for acquiring information other than the content IDs as information on the predetermined contents, utilization of which is requested by the request means employed in the terminal, from the terminal;

the utilization-history information storage means employed in the server is used for storing the content IDs and the apparatus ID or the program ID, which are received from the request means employed in the terminal, as well as the information acquired by the acquisition means as the information other than the content IDs; and the collection means employed in the server collects utilization records of contents utilized by the terminal or utilized by execution of the application program on the basis of the utilization-history information.

In the other configuration of the second content-providing system, the information other than the content IDs can be a selling price of the contents or a sale date of the contents.

It is possible to provide the second content-providing system with a further configuration in which:

the terminal further has moving/copying means for moving or copying the contents stored in the storage means or the utilization condition received by the reception means to another terminal;

the server further has acquisition means for acquiring an apparatus ID of the other terminal, to which the contents or the utilization condition is moved or copied by the moving/copying means employed in the terminal, from the terminal;

the utilization-history information storage means employed in the server is used for storing utilization-history information including the content IDs received from the request means employed in the terminal and the apparatus ID received from the request means employed in the terminal or the apparatus ID acquired by the acquisition means; and the collection means employed in the server collects utilization records of contents utilized by the terminal on the basis of the utilization-history information.

It is possible to modify the further configuration of the second content-providing system so that:

the acquisition means employed in the server further acquires time information, at which the moving/copying means employed in the terminal moves or copies the contents or the utilization condition to the other terminal, from the terminal;

the utilization-history information storage means employed in the server is used for storing utilization-history information including the content IDs received from the request means employed in the terminal, the apparatus ID received from the request means employed in the terminal or the apparatus ID acquired by the acquisition means and the time information acquired by the acquisition means; and the collection means employed in the server collects utilization records of contents utilized by the terminal on the basis of the utilization-history information.

It is possible to modify the further configuration of the second content-providing system so that:

the acquisition means employed in the server further acquires an apparatus ID of another terminal, which has moved contents or a utilization condition to the terminal, from the other terminal;

the utilization-history information storage means employed in the server is used for storing utilization-history information including the content IDs received from the request means employed in the terminal and the apparatus ID received from the request means employed in the terminal or the apparatus ID acquired by the acquisition means; and the collection means employed in the server collects utilization records of contents utilized by the terminal on the basis of the utilization-history information.

It is possible to further change the above modified further configuration of the second content-providing system so that:

the acquisition means employed in the server further acquires time information, at which the contents or the utilization condition were moved or copied to the terminal by the other terminal, from the other terminal;

the utilization-history information storage means employed in the server is used for storing utilization-history information including the content IDs received from the request means employed in the terminal, the apparatus ID received from the request means employed in the terminal or the apparatus ID acquired by the acquisition means and the time information acquired by the acquisition means; and the collection means employed in the server collects utilization records of contents utilized by the terminal on the basis of the utilization-history information.

It is possible to provide the second content-providing system with a still further configuration in which:

the server further has detection means for detecting illegal utilization of the contents in the terminal; and the utilization-condition transmission means limits transmission of the utilization condition to the terminal, which has carried out the detected illegal utilization.

A third information-processing apparatus provided by the present invention is characterized in that the third information-processing apparatus includes:

utilization-condition transmission means for transmitting a utilization condition for utilizing predetermined contents, utilization of which is requested by a terminal, to the terminal;

utilization-history information storage means for storing utilization-history information received from the terminal as information including content IDs of the predetermined contents and an apparatus ID of the terminal or a program ID of an application program used for utilizing the predetermined contents;

collection means for collecting utilization records of contents utilized by the terminal or utilized by execution of the application program on the basis of the utilization-history information stored in the utilization-history information storage means; and processing execution means for carrying out processing based on the utilization records.

A third information-processing method provided by the present invention is characterized in that the third information-processing method includes:

a utilization-condition transmission step of transmitting a utilization condition for utilizing predetermined contents, utilization of which is requested by a terminal, to the terminal;

a utilization-history information storage step of storing utilization-history information received from the terminal as information including content IDs of the predetermined contents and an apparatus ID of the terminal or a program ID of an application program used for utilizing the predetermined contents;

a collection step of collecting utilization records of contents utilized by the terminal or utilized by execution of the application program on the basis of the utilization-history information stored in processing carried out at the utilization-history information storage step; and a processing execution step of carrying out processing based on the utilization records.

A third program provided by the present invention is characterized in that the third program is a program to be executed by a computer to carry out processing including:

a utilization-condition transmission control step of controlling an operation to transmit a utilization condition for utilizing predetermined contents, utilization of which is requested by a terminal, to the terminal;

a utilization-history information storage control step of controlling an operation to store utilization-history information received from the terminal as information including content IDs of the predetermined contents and an apparatus ID of the terminal or a program ID of an application program used for utilizing the predetermined contents;

a collection control step of controlling an operation to collect utilization records of contents utilized by the terminal or utilized by execution of the application program on the basis of the utilization-history information stored in processing carried out at the utilization-history information storage control step; and a processing execution control step of controlling an operation to carry out processing based on the utilization records.

In accordance with the fifth inventions described above, a utilization condition for utilizing predetermined contents, utilization of which is requested by a terminal, is transmitted to the terminal. Then, utilization-history information received from the terminal as information including content IDs of the predetermined contents and an apparatus ID of the terminal or a program ID of an application program used for utilizing the predetermined contents is stored. Subsequently, utilization records of contents utilized by the terminal or utilized by execution of the application program are collected on the basis of the stored utilization-history information. Finally, processing based on the utilization records is carried out.

BRIEF DESCRIPTION OF DRAWINGS

FIG. 3 is a diagram showing a typical sales-history table;

FIG. 4 is a diagram showing a typical apparatus-management table;

FIG. 5 is a diagram showing a typical set-content management table;

FIG. 14 is a diagram showing another typical sales-history table;

FIG. 15 is a diagram showing a program-management table;

FIG. 16 is a diagram showing an application-program execution history management table;

FIG. 19 is a diagram showing typical utilization conditions;

FIG. 20 is a diagram showing a typical sales-history table;

FIG. 21 is a diagram showing a typical apparatus-management table;

FIG. 22 is a diagram showing a typical set-content management table;

FIG. 23 is a diagram showing a typical price table;

FIG. 24 is a diagram showing a typical utilization-history collection table;

FIG. 25 is a diagram showing a typical content-utilization table;

FIG. 26 is a diagram showing a typical apparatus-favorite table;

FIG. 28 is a diagram showing a typical table stored in a content database;

FIG. 30 is a diagram showing a typical table stored in a utilization-history database;

FIG. 31 is a diagram showing a typical table stored in a favorite-content database;

FIG. 32 is a diagram showing a typical table stored in a purchasing database;

FIG. 47 is another explanatory diagram referred to in a description of updating prices of contents.

BEST MODES FOR CARRYING OUT THE INVENTION

Embodiments of the present invention are explained by referring to diagrams as follows.

First of all, a first embodiment of the present invention is explained.

Figure 1:
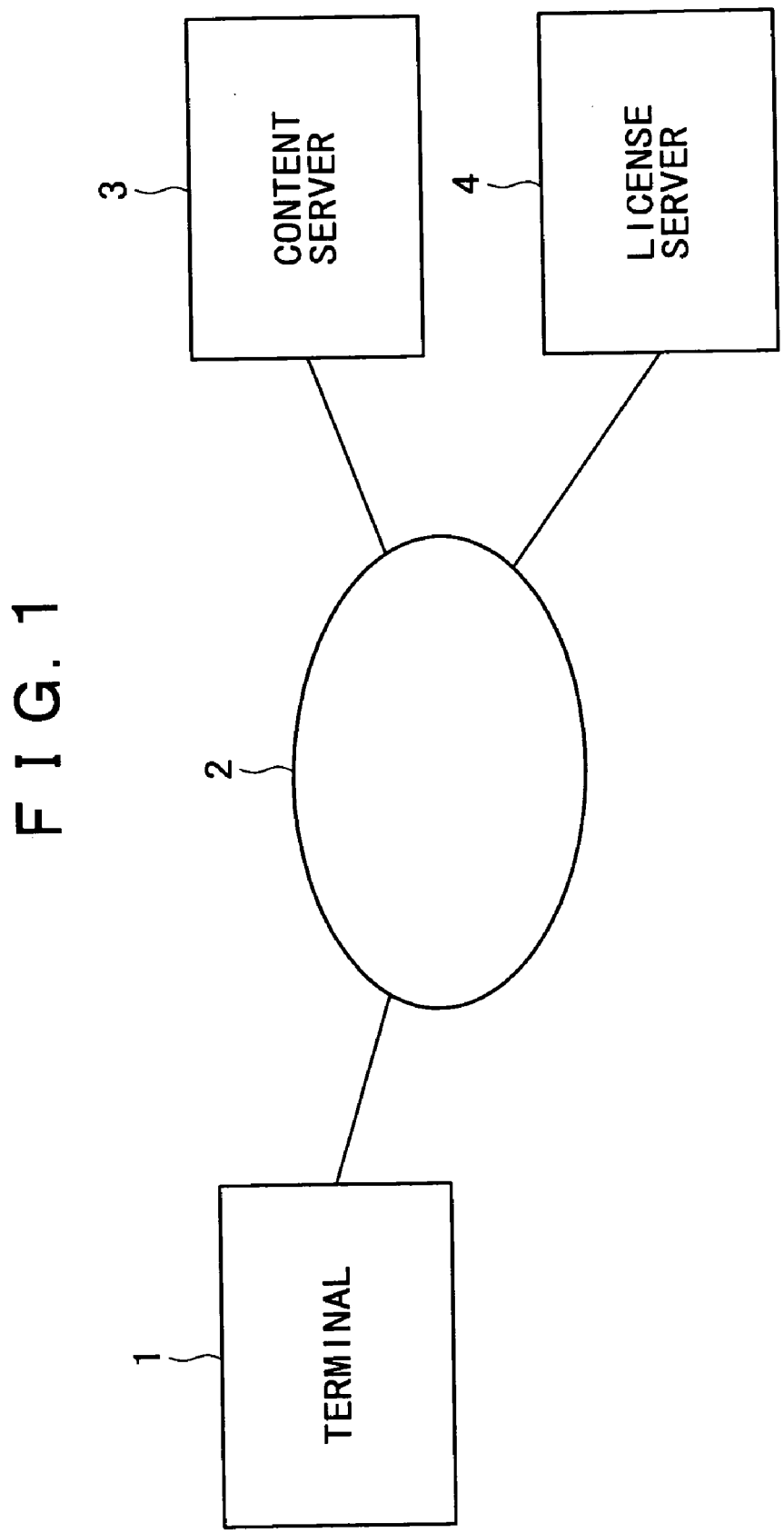
FIG. 1 is a diagram showing a typical configuration of the conventional content-providing system.
Figure 2:
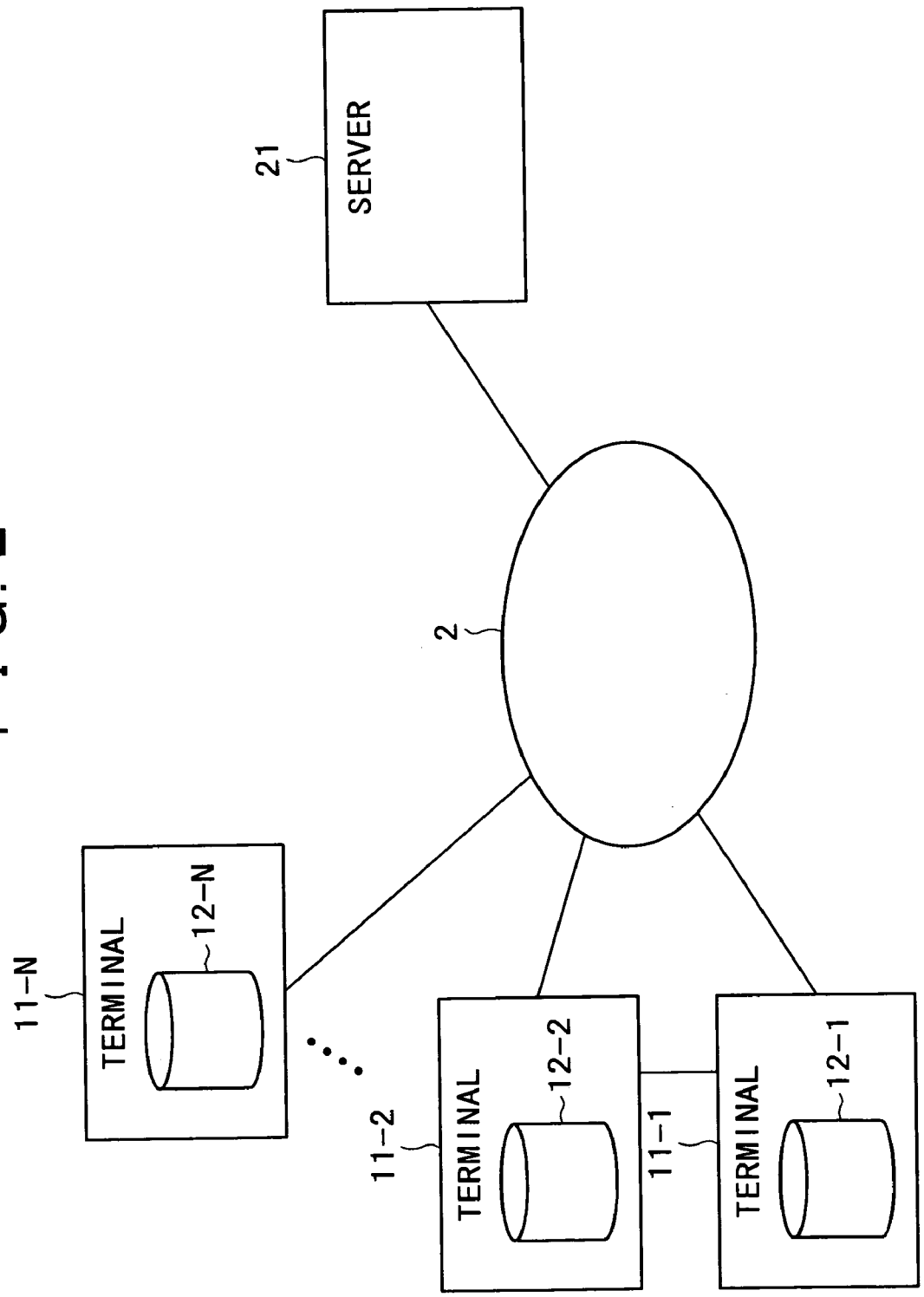
FIG. 2 is a diagram showing a typical configuration of a content-providing system provided by the present invention.

FIG. 2 is a diagram showing a typical configuration of a content-providing system provided by the present invention.

N terminals 11-1 to 11-N having respectively set-content databases 12-1 to 12-N each used for storing predetermined contents each referred to hereafter as a set content are sold in the market. If it is not necessary to distinguish the terminals 11-1 to 11-N from each other, each of them is generically referred to hereafter as a terminal 11. This way of using a generic reference numeral to denote identical components is also applicable to all identical components other than the terminals 11-1 to 11-N. A user purchasing a terminal 11 is capable of utilizing a set content stored in the set-content database 12 of the terminal 11 by operating the terminal 11. A set content is a content stored or set in advance in a terminal 11 purchased by a user. It is to be noted that every terminal 11 is capable of communicating with another terminal 11 directly or through a network 2.

As will be described later in detail, in order to utilize a set content, a terminal 11 transmits an apparatus ID unique to the terminal 11 and the content ID of the set content the user wants to utilize to a server 21 by way of the network 2, notifying the server 21 that the user wants to purchase the set content.

In accordance with a condition transmitted by the server 21 to the terminal 11 in response to the notification to purchase the set content as a required condition for utilizing the set content, the terminal 11 carries out a utilization process of utilizing the set content stored in the set-content database 12. The required condition for utilizing a set content is referred to hereafter as a utilization condition. An example of the utilization process of utilizing a set content is a process to reproduce the set content.

Receiving the notification to purchase the set content as a request to purchase the set content from the terminal 11, the server 21 transmits the required utilization condition for utilizing the set content to the terminal 11 as described above.

At that time, the server 21 catalogs information on the set content in a sales-history table 21A shown in FIG. 3. The information on the set content includes an apparatus ID assigned to the purchased terminal 11 containing a set content identified by the set ID, a content ID assigned to the set content, the selling price of the set content and the sale date of the set content. In addition, with predetermined timings, the server 21 collects sales or utilization records of the set content for each manufacturer of the terminal 11 or each content producer of the set content.

The server 21 also has an apparatus-management table 21B like one shown in FIG. 4 and a set-content management table 21C like one shown in FIG. 5. The apparatus-management table 21B is a table associating every manufacturer of terminals 11, the model number of the terminals 11 and the apparatus IDs assigned to the terminals 11 with each other. The set-content management table 21C is a table associating each content producer producing contents with content IDs assigned to the contents. Thus, by utilizing the sales-history table 21A shown in FIG. 3, the apparatus-management table 21B shown in FIG. 4 and the set-content management table 21C shown in FIG. 5, sales records of the set content can be collected from each manufacturer of the terminal 11 or each content producer of the set content.

In accordance with the sales-history table 21A shown in FIG. 3, 3 set contents Ca, Cb and Cc have been purchased as set contents in the terminal 11-1, the set content Ca has been purchased as a set content in the terminal 11-2 whereas the set terminal Ca and a set terminal Cd have been purchased as set contents in the terminal 11-3.

That is to say, in this case, sales records are collected for example as records indicating that 4 set contents have been sold as set contents in the terminals 11-1 and 11-2 manufactured by a terminal manufacturer M1 and 1 set content has been sold as a set content in the terminals 11-3 and 11-4 manufactured by a terminal manufacturer M2. In addition, a total of 4 copies of the set contents Ca and Cb produced by a content producer named Label L1 has been sold, a total of 1 copy of the set content Cc produced by a content producer named Label L2 has been sold and a total of 1 copy of the set contents Cd and Ce produced by a content producer named Label L3 has been sold.

In effect, according to the present invention, set contents are provided to the user of the terminal 11 as set contents stored in the set-content database 12 so that it is not necessary to download set contents from the server 21. Thus, a set content can be utilized more immediately by the time it takes to download the set content, and the system management enterprise is capable of reducing expenses such as the cost to maintain the network 2.

Figure 6:
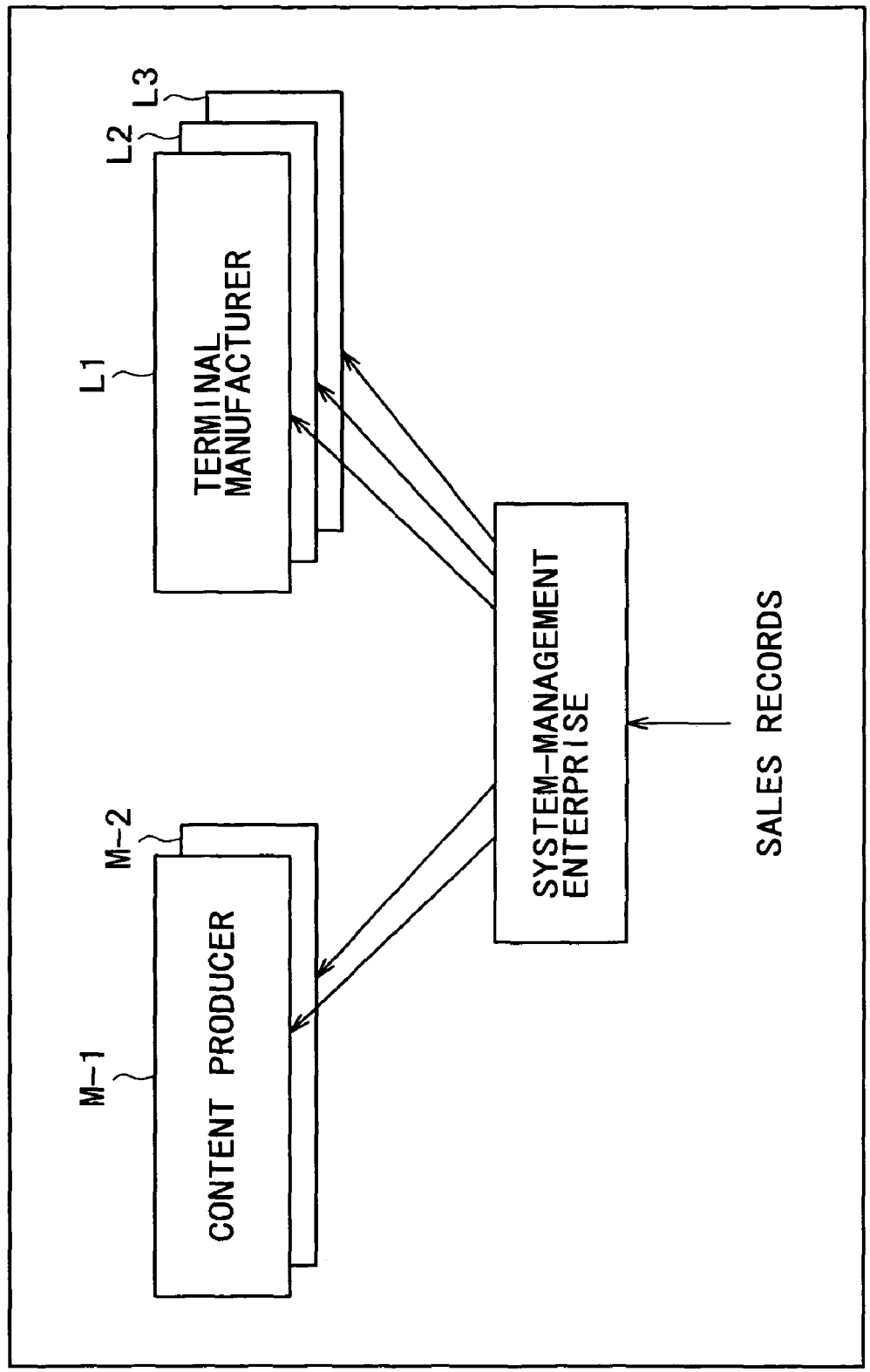
FIG. 6 is an explanatory diagram referred to in describing a feedback based on sales records as a feedback to terminal manufacturers and content producers.

In addition, since the server 21 collects sales records of set contents for each manufacturer of terminals or each content producer of the set contents as described above, on the basis of the sales records, this content-providing system can be operated to request each manufacturer of terminals and each content producer of set contents to pay money dependent typically on the number of sold set contents as shown in FIG. 6. The money to be paid for a set content includes a fee corresponding to a copyright of the set content. In addition, this content-providing system can be operated to promote participations by manufacturers of terminals and content producers of set contents in the content-providing system.

It is to be noted that the sales records may include selling prices and sale dates.

Figure 7:
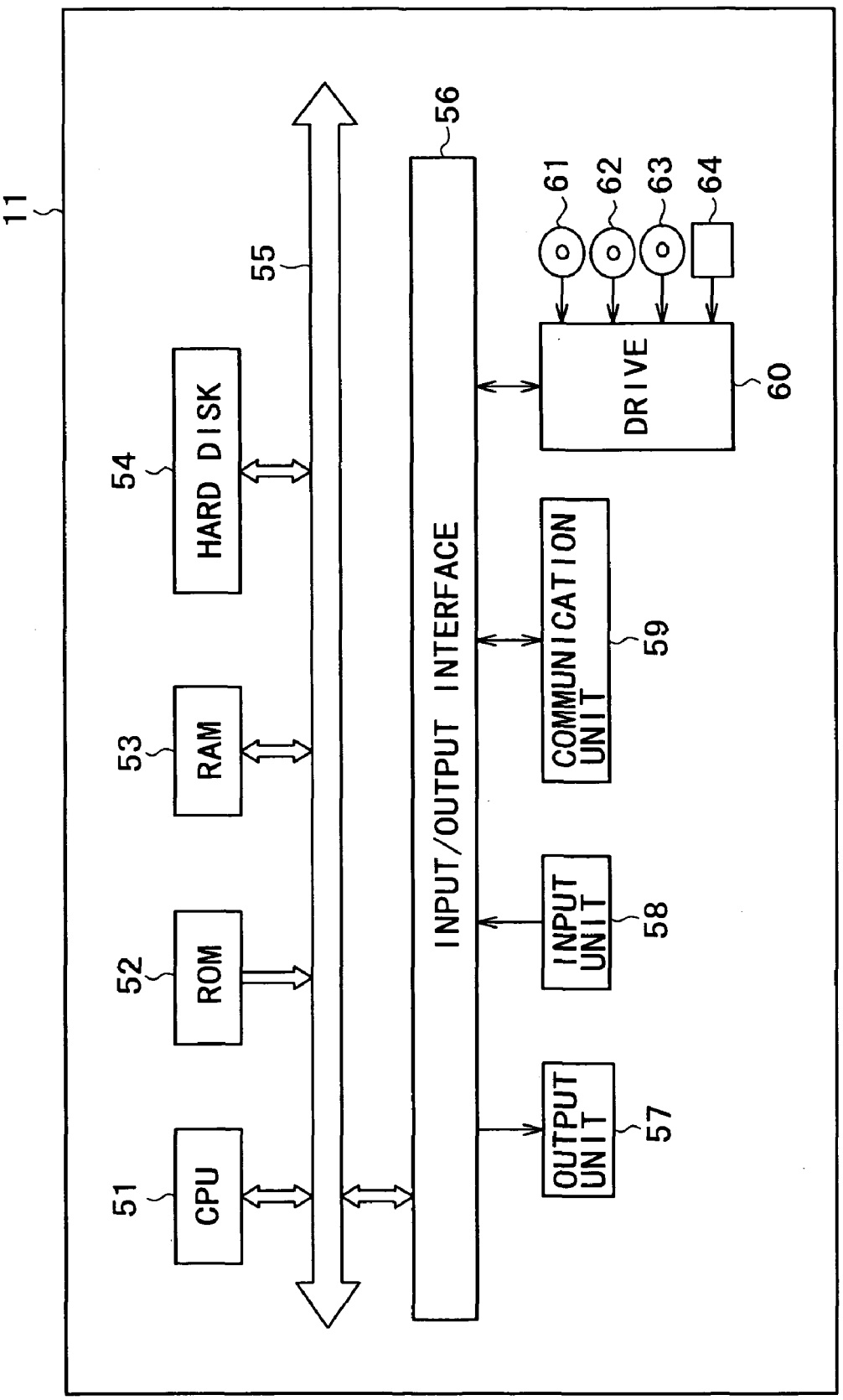
FIG. 7 is a block diagram showing a typical configuration of a terminal employed in the content-providing system shown in FIG. 2.

FIG. 7 is a diagram showing a typical configuration of the terminal 11. As shown in the figure, a CPU (Central Processing Unit) 51 is connected to an input/output interface 56 by a bus 55. When the CPU 51 receives a command from an input unit 58 comprising a keyboard and a mouse by way of the input/output interface 56, the CPU 51 loads a program corresponding to the command from a recording medium into a RAM (Random Access Memory) 53 and executes the program. The recording medium can be a ROM (Read Only Memory) 52, a hard disk 54 or recording media mounted on a drive 60. The recording media can be a magnetic disk 61, an optical disk 62, a magneto-optical disk 63 or a semiconductor memory 64. If necessary, the CPU 51 further outputs a result of program execution to an output unit 58 such as an LCD (Liquid Crystal Display) unit by way of the input/output interface 56.

The ROM 52 is also used for storing the apparatus ID of the terminal 11 whereas the hard disk 54 is also used for storing the set-content database 12 including set contents even though the set-content database 12 itself is not shown in FIG. 7. It is to be noted that a set content is stored in the set-content database 12 in an encrypted state.

A communication unit 59 is connected to the Internet 2 as a component for communicating with the server 21.

Figure 8:
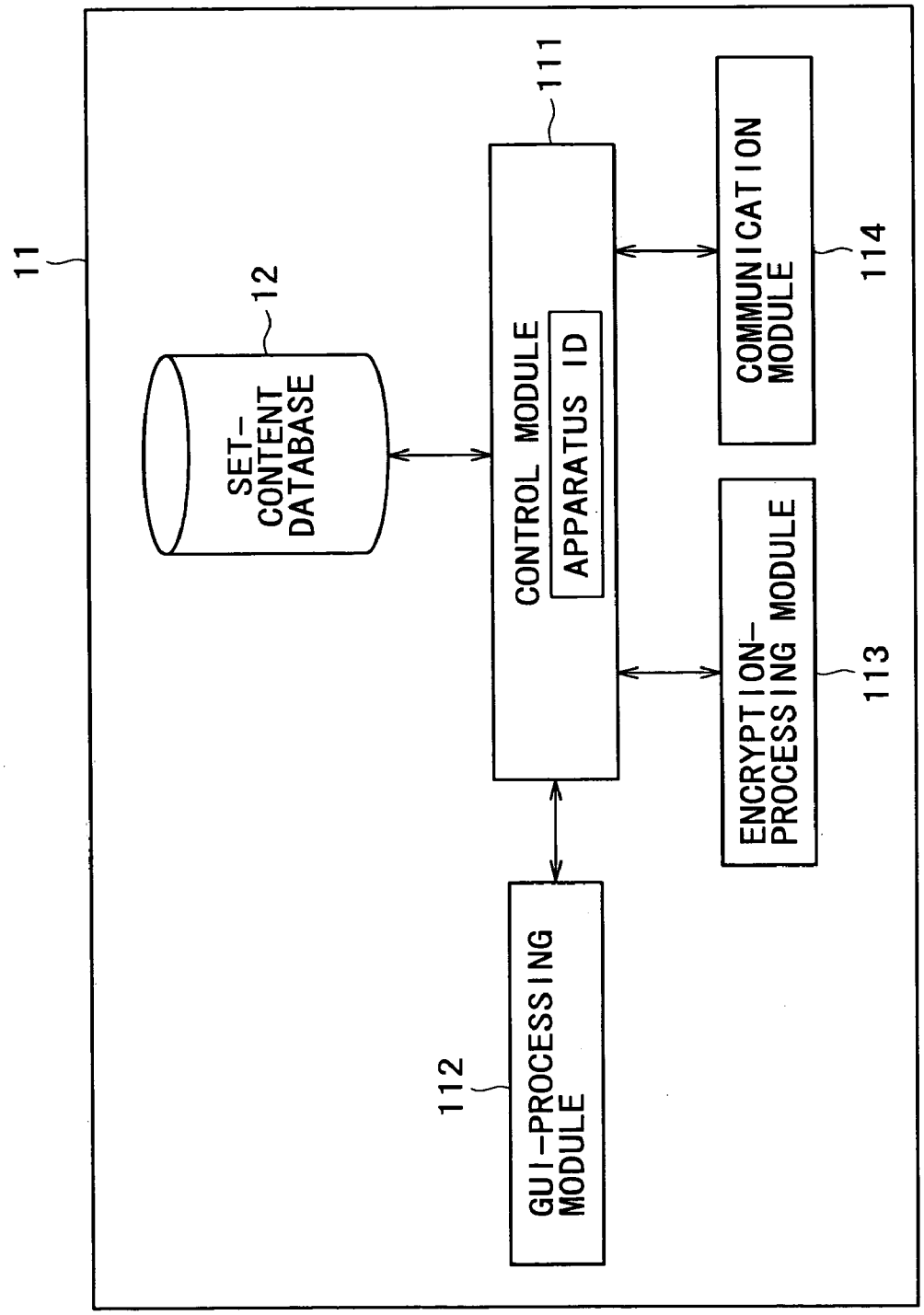
FIG. 8 is a block diagram showing a typical functional configuration of the terminal employed in the content-providing system shown in FIG. 2.

FIG. 8 is a typical functional configuration of the terminal 11.

A GUI-processing module 112 is a module implemented by the components ranging from the CPU 51 to the RAM 53, the output unit 57 and the input unit 58. The GUI-processing module 112 displays a predetermined GUI and informs a control module 111 of an operation carried out by the user for the GUI.

An encryption-processing module 113 is a module implemented by the components ranging from the CPU 51 to the RAM 53. The encryption-processing module 113 encrypts authentication data used for establishing a communication with the server 21. The authentication data includes the apparatus ID and a signature. By using a decryption key received from the control module 111, the encryption-processing module 113 also decrypts a set content received from the set-content database 12 by way of the control module 111.

A communication module 114 is a module implemented by the components ranging from the CPU 51 to the RAM 53 and the communication unit 59. The communication module 114 carries out a process of mutual authentication with the server 21 by using the authentication data in order to establish a path of communication with the server 21 to serve as a communication path for communicating information with a high degree of security protection. The communication module 114 communicates with the server 21 through the established communication path.

The control module 111 is a module implemented by the components ranging from the CPU 51 to the RAM 53. The control module 111 controls the other modules.

Figure 9:
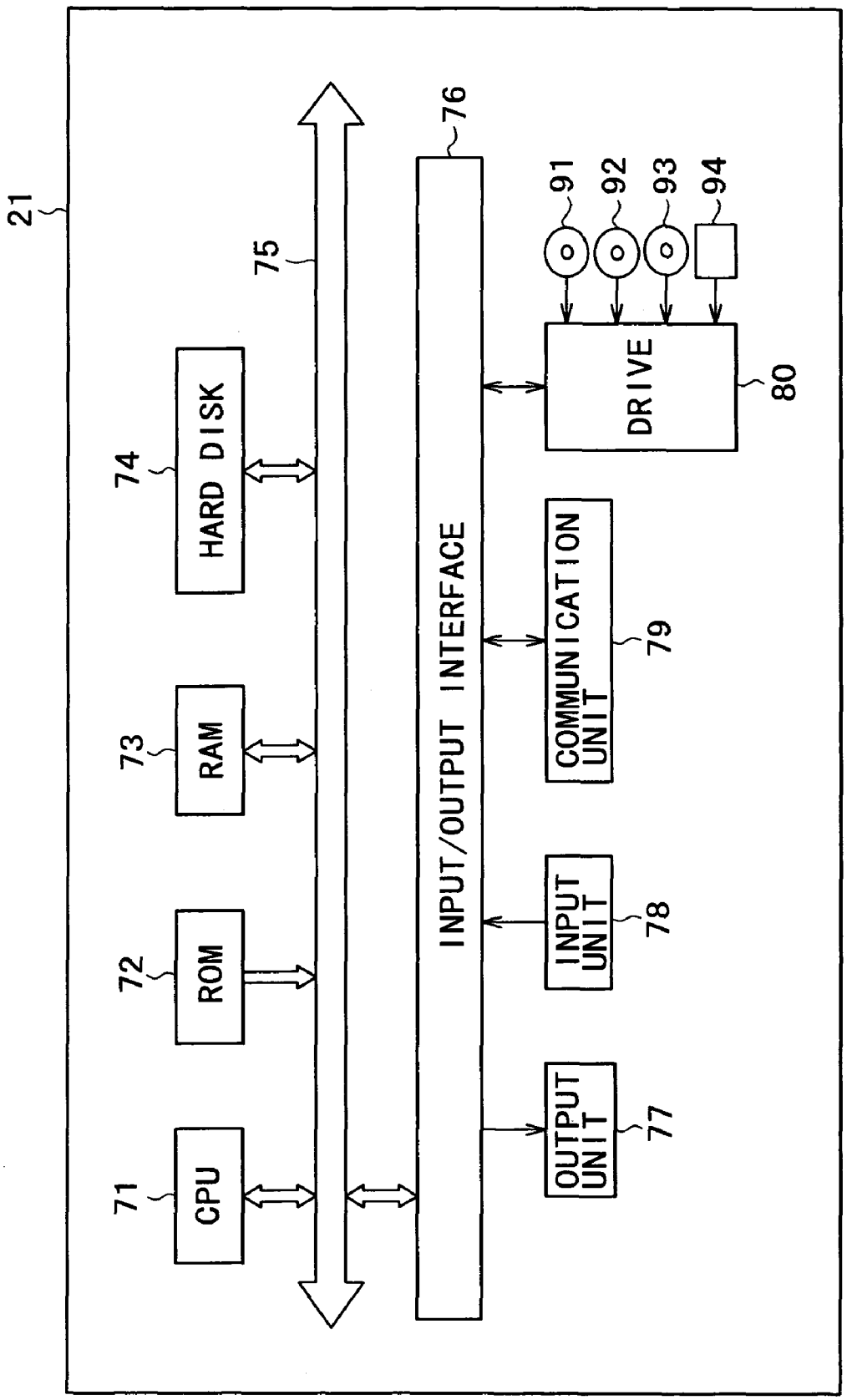
FIG. 9 is a block diagram showing a typical configuration of a server employed in the content-providing system shown in FIG. 2.

FIG. 9 is a diagram showing a typical configuration of the server 21. Since the configuration of the server 21 is basically the same as the configuration of the terminal 11, the detailed explanation is not repeated. In the case of the server 21, however, a hard disk 74 is used for storing also the sales-history table 21A shown in FIG. 3, the apparatus-management table 21B shown in FIG. 4 and the set-content management table 21C shown in FIG. 5 even though the sales-history table 21A, the apparatus-management table 21B and the set-content management table 21C are not shown in FIG. 9. In addition, the hard disk 74 is used also for storing a necessary utilization condition for utilizing each set content.

Figure 10:
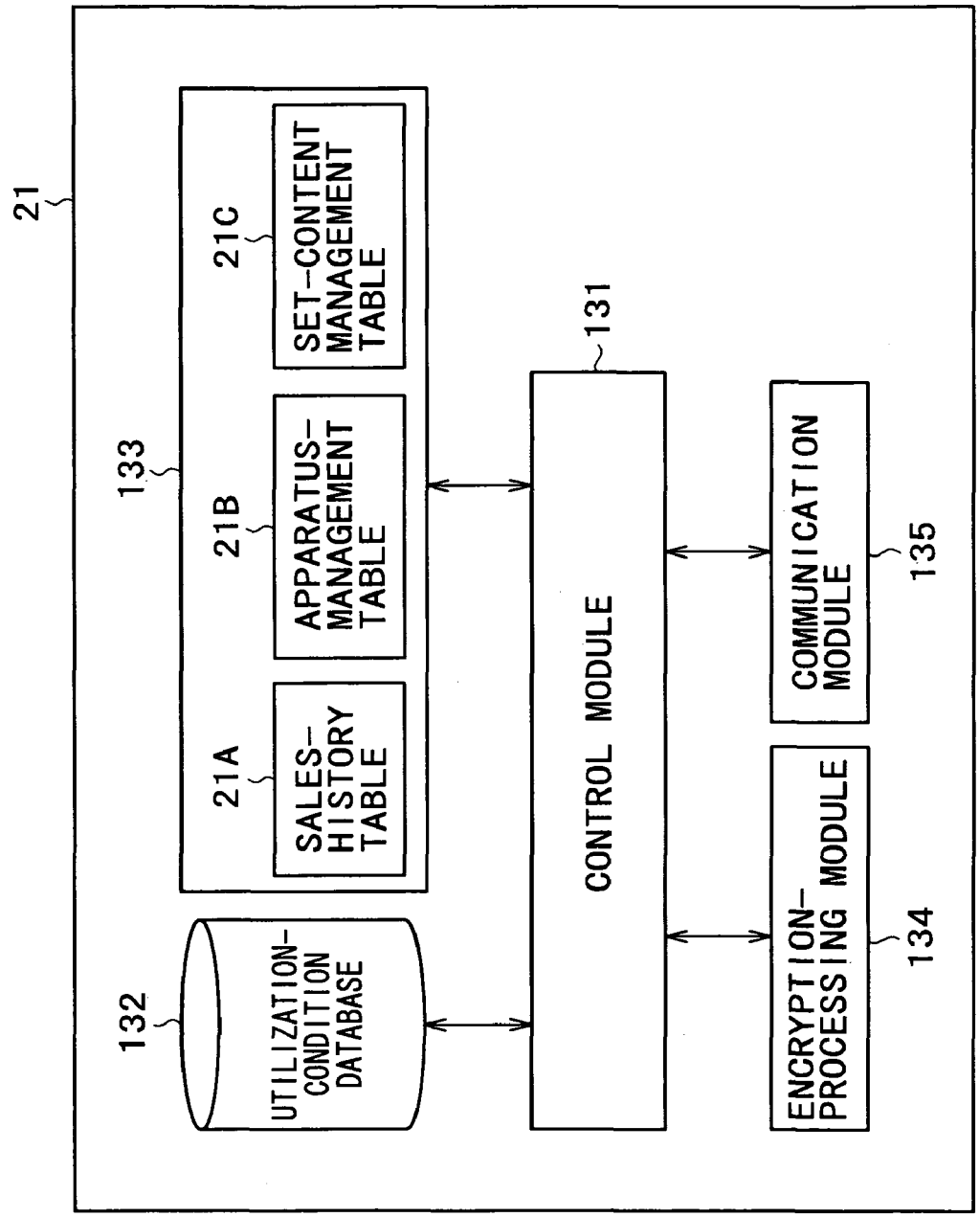
FIG. 10 is a block diagram showing a typical functional configuration of the server employed in the content-providing system shown in FIG. 2.

FIG. 10 is a diagram showing a typical functional configuration of the server 21.

A utilization-condition database 132 is stored in the hard disk 74. The utilization-condition database 132 is used for storing a necessary utilization condition for utilizing each set content stored in the set-content database 12 employed in the terminal 11. The utilization condition includes a selling price, the number of reproductions, a copy permit and a decryption key. A management-data storage unit 133 is also stored in the hard disk 74. The management-data storage unit 133 is used for storing also the sales-history table 21A shown in FIG. 3, the apparatus-management table 21B shown in FIG. 4 and the set-content management table 21C shown in FIG. 5.

An encryption-processing module 134 is a module implemented by the components ranging from the CPU 71 to the RAM 73. The encryption-processing module 134 encrypts information such as a utilization condition to be transmitted to the terminal 11.

A communication module 135 is a module implemented by the components ranging from the CPU 71 to the RAM 73 and the communication unit 79. The communication module 135 carries out a process of mutual authentication with the terminal 11 in order to establish a path of communication with the terminal 11 to serve as a communication path for communicating information with a high degree of security protection. The communication module 135 communicates with the terminal 11 through the established communication path.

A control module 131 is a module implemented by the components ranging from the CPU 71 to the RAM 73. The control module 131 controls the other modules.

Figure 11:
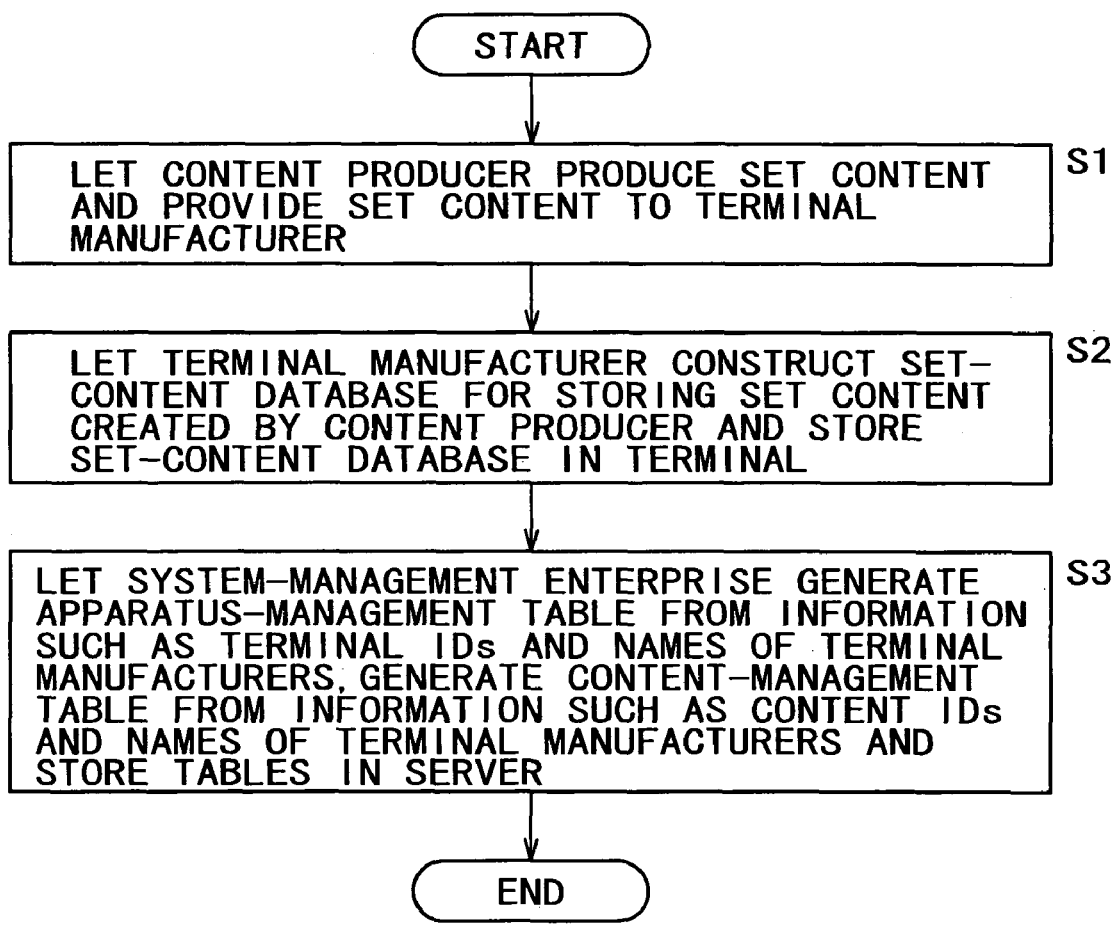
FIG. 11 shows an explanatory flowchart representing processing to generate a set-content database, an apparatus-management table and a set-content management table.

By referring to a flowchart shown in FIG. 11, the following description explains processing carried out by the terminal manufacturer, the content producer and the system-management enterprise, which are shown in FIG. 6, to create the set-content database 12 in the terminal 11 as well as the apparatus-management table 21B and the set-content management table 21C in the server 21.

First of all, at a step S1, the content producer produces a set content and provides the set content to the terminal manufacturer. Then, at the next step S2, the terminal manufacturer issues an apparatus ID for a terminal 11 and writes the apparatus ID into the ROM 52. The terminal manufacturer also constructs a set-content database 12 for storing the set content provided by the content producer and stores the set-content database 12 in the hard disk 54.

Then, at the next step S3, the system-management enterprise generates an apparatus-management table 21B shown in FIG. 4 as a table showing information such as terminal IDs issued by terminal manufacturers and apparatus IDs assigned to terminals 11, names of the terminal manufacturers and models of the terminals 11. The system-management enterprise also generates a set-content management table 21C shown in FIG. 5 as a table showing information such as content IDs issued by content producers and assigned to set contents supplied to terminal manufacturers and names of the terminal manufacturers. The system-management enterprise then stores the apparatus-management table 21B and the set-content management table 21C in the hard disk 74 employed in the server 21.

As described above, the set-content database 12 of the terminal 11 is constructed and the apparatus-management table 21B as well as the set-content management table 21C are generated and stored in the server 21.

Figure 12:
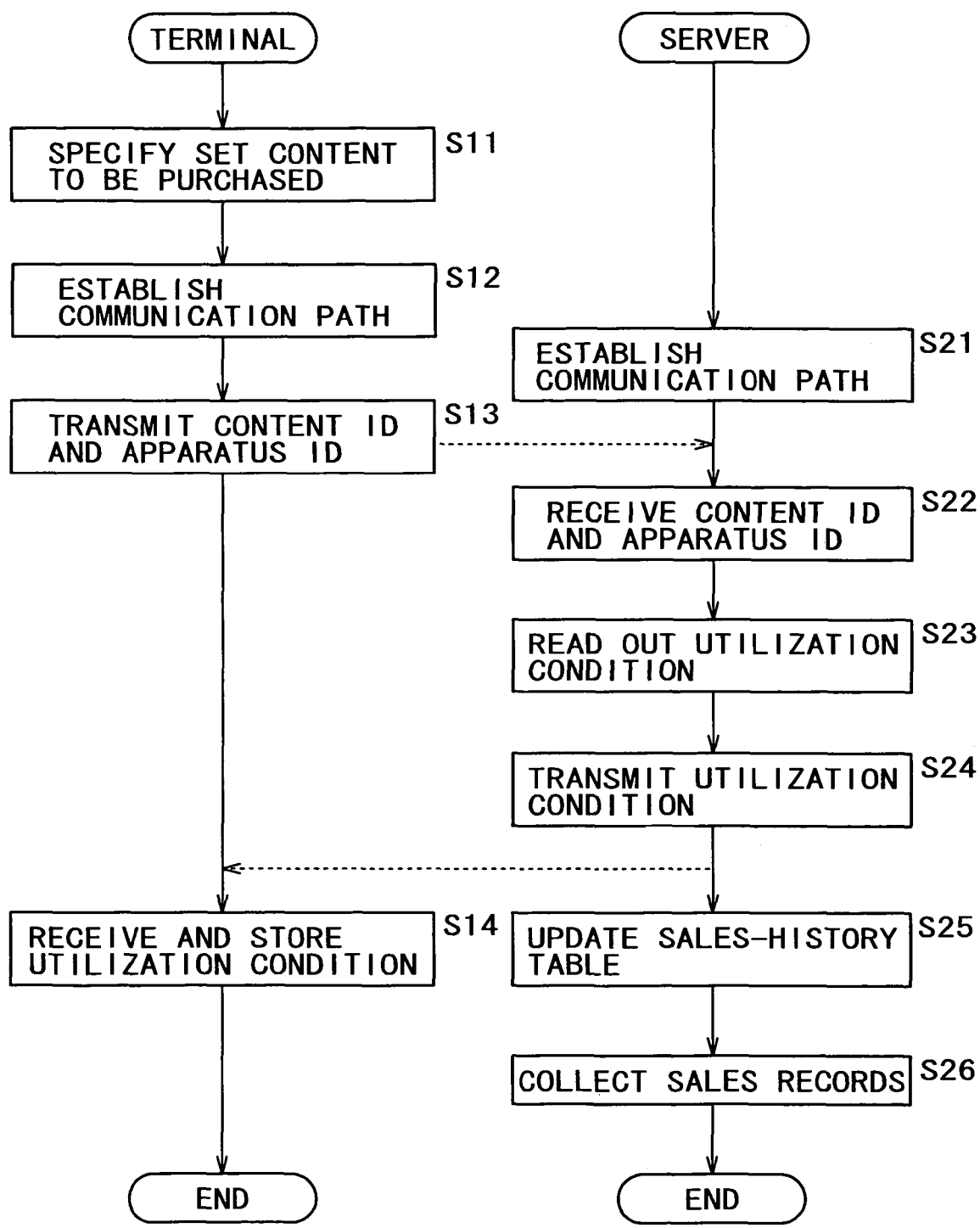
FIG. 12 shows an explanatory flowchart representing processing to sell set contents and processing to collect sales records.

Next, a process of selling set contents and a process to collect sales records of the set contents are explained by referring to a flowchart shown in FIG. 12.

First of all, at a step S11, when the user operates a GUI displayed on the output unit 58 employed in the terminal 11 as a screen used for specifying a set content to be purchased (or utilized) to specify a desired set content, the GUI-processing module 112 supplies the content IDs of the specified set content to the control module 111.

Then, at the next step S12, the control module 111 controls the encryption-processing module 113 to generate authentication data by encryption of information such as the apparatus ID and a signature. Subsequently, the control module 111 controls the communication module 114 to establish a path of communication with the server 21 on the basis of the authentication data.

As the path of communication with the server 21 is established, at the next step S13, the control module 111 controls the encryption-processing module 113 to encrypt the content ID of the set content specified at the step S11 and the apparatus ID of the terminal 11. The control module 111 also controls the communication module 114 to transmit the encrypted apparatus ID and the encrypted content ID to the server 21.

In the mean time, at a step S21, the communication module 135 of the server 21 carries out a process to establish the path of communication with the terminal 11 to serve as a communication path for communicating information with a high degree of security protection as a counterpart of the process carried out by the terminal 11 at the step S12. In this way, a communication path for communicating information with a high degree of security protection is established. The content ID of a set content and the apparatus ID of the terminal 11, which are transmitted by the terminal 11 at the step S13, are received by the communication module 135 of the server 21 at a step S12.

Then, at the next step S23, the control module 131 of the server 21 controls the encryption-processing module 134 to decrypt the encrypted content ID and the apparatus ID received at the step S22, and reads out a utilization condition of the set content identified by the content ID from the utilization-condition database 132.

Then, at the next step S24, the control module 131 of the server 21 controls the encryption-processing module 134 to encrypt the utilization condition read out from the utilization-condition database 132 at the step S23, and controls the communication module 135 to transmit the encrypted utilization condition to the terminal 11.

At a step S14, the control module 111 of the terminal 11 receives the encrypted utilization condition from the server 21 through the communication module 114, controls the encryption-processing module 113 to decrypt the encrypted utilization condition and stores the utilization condition in the hard disk 54. As a result, the set content specified (purchased) at the step S11 can be utilized.

After the utilization condition is transmitted to the terminal 11, at a step S25, the control module 131 of the server 21 updates the sales-history table 21A stored in the management-data storage unit 133 as a table shown in FIG. 3 by cataloging new information in the sales-history table 21A. The new information includes the apparatus ID of the terminal 11, the content ID of the purchased set content, the selling price of the set content and the sale date of the set content.

Then, at the next step S26 corresponding to a predetermined timing, the control module 131 of the server 21 collects sales records of set contents for each manufacturer of terminals 11 or each content producer of set contents by utilizing the sales-history table 21A, the apparatus-management table 21B and the set-content management table 21C, which are stored in the management-data storage unit 133 as tables shown in FIGS. 3, 4 and 5 respectively. The control module 131 of the server 21 typically stores the collected sales records in a memory. On the basis of the collected sales records, the system-management enterprise provides feedbacks to each terminal manufacturer and each content producer as explained earlier by referring to FIG. 6.

As described above, set contents are sold and sales records for the set contents are collected.

It is to be noted that the above description is based on the assumption that the set-content database 12 is stored in the hard disk 54 of the terminal 11. However, the set-content database 12 can also be stored in removable recording media such as any one of the magnetic disk 61, the optical disk 62, the magneto-optical disk 63 and the semiconductor memory 64, which are shown in FIG. 7.

Figure 13:
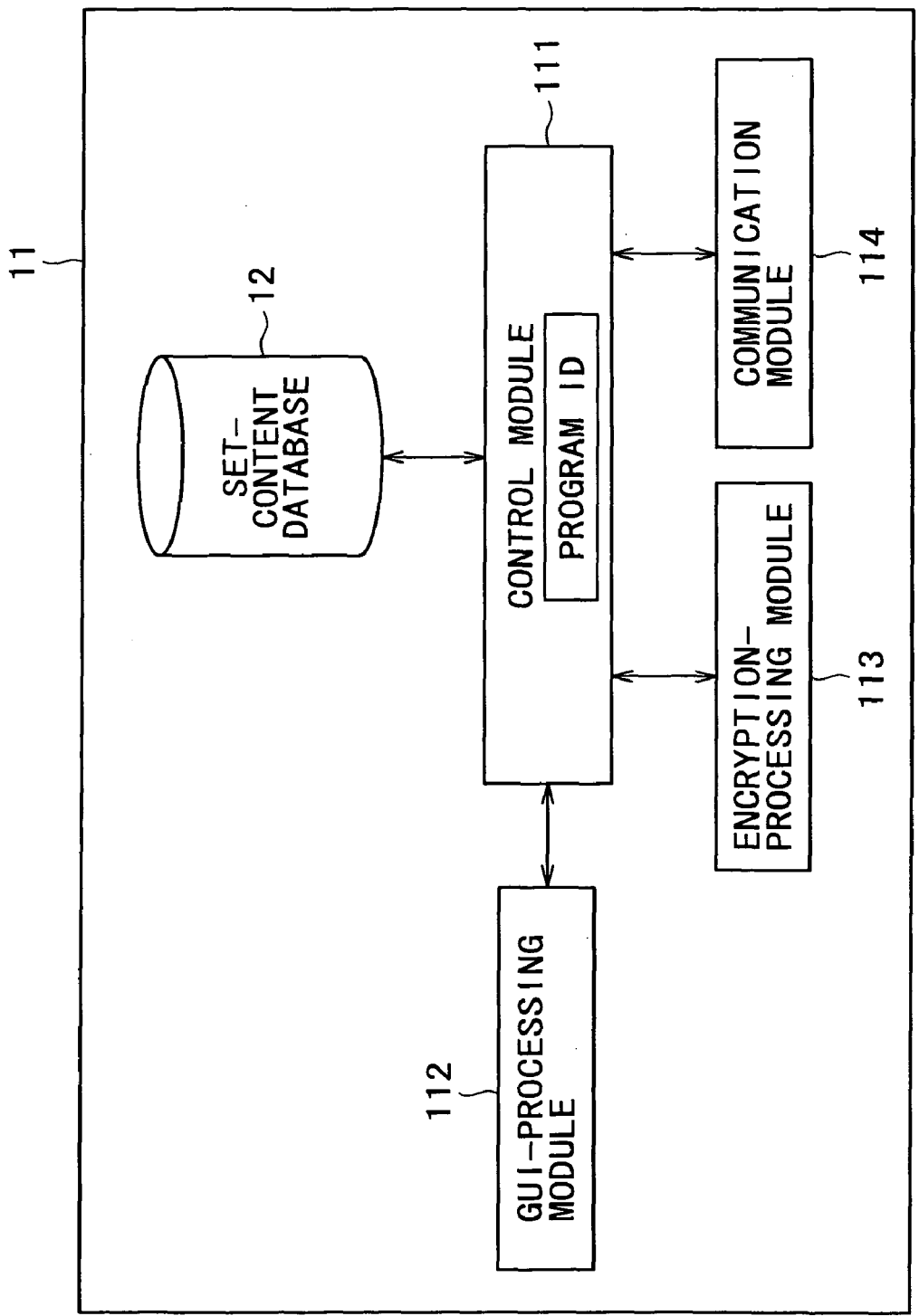
FIG. 13 is a block diagram showing another typical functional configuration of the terminal employed in the content-providing system shown in FIG. 2.

In addition, in the above description, sales records of set contents are collected for each manufacturer of terminals 11 or each content producer of set contents. However, sales records of set contents can also be collected for example for every program development enterprise developing application programs for utilizing set contents. An example of the application programs is the program of the encryption-processing module 113. In this case, a program ID unique to the encryption-processing module 113 is stored in the terminal 11 as shown in FIG. 13. In addition, a sales-history table 21D shown in FIG. 14 and a program-management table 21E shown in FIG. 15 are provided in the server 21 in place of the sales-history table 21A shown in FIG. 3 and the apparatus-management table 21B shown in FIG. 4 respectively. As for the processing represented by the flowchart shown in FIG. 12, a program ID is used to replace the apparatus ID.

On the top of that, the terminal 11 stores a history of the execution of application programs for utilizing contents. An example of the history is the number or reproductions. The history of the application-program execution can be properly reported to the server 21. The server 21 manages application-program execution histories by using an application-program execution history management table 21F shown in FIG. 16.

Furthermore, the terminal 11 can also be connected to another terminal 11 directly or through the network 2 so that a set content and/or its utilization condition can be transferred from the set-content database 12 of its own to the other terminal 11 to allow the set content and/or its utilization condition to be moved or copied from the terminal 11 to the other. In this case, the terminal 11 serving as the movement source or the copy source transmits the content ID of the moved or copied set content and the apparatus ID of the other terminal 11 serving as the movement target or the copy target to the server 21 to inform the server 21 that the set content and/or its utilization condition have been moved or copied to the other terminal 11. As a result, the utilization of the set content in the other terminal 11 can be included in sales records. It is to be noted that, with a predetermined timing, the other terminal 11 serving as the movement or copy destination of the moved or copied set content can also transmit the content ID of the moved or copied set content and the apparatus ID of the terminal 11 serving as the movement or copy source of the moved or copied set content to the server 21 to inform the server 21 that the set content and/or its utilization condition have been moved or copied from the terminal 11.

Moreover, the terminal 11 may also store a date and a time, on and at which a set content and/or its utilization condition are transferred, and transmit the date and the time to the server 21. As a result, the server 21 is capable of utilizing the information representing dates and times in collection of sales records.

In addition, the server 21 is also capable of invalidating the use of a set content in a terminal 11 carrying out an illegal operation. The terminal 11 carrying out an illegal operation includes a terminal 11 serving as a movement or copy target of a set content and/or its utilization condition. To put it concretely, the server 21 stores the apparatus ID of a terminal 11 carrying out an illegal operation and, if a request to purchase a set content by specifying an apparatus ID matching the stored apparatus ID is received, the utilization condition of the set content is not transmitted to the terminal 11 making the request.

Next, a second embodiment of the present invention is explained.

Figure 17:
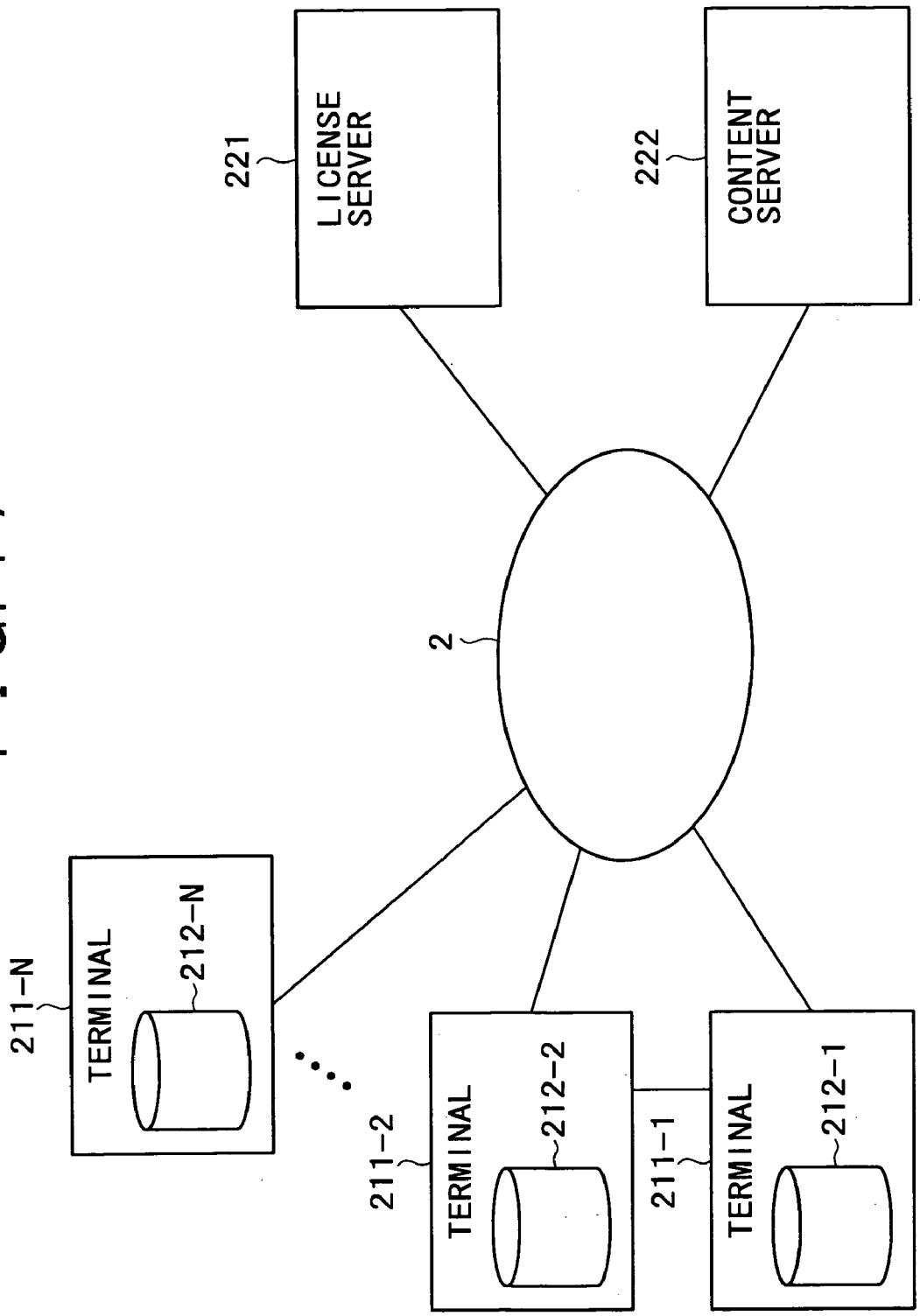
FIG. 17 is a diagram showing another typical configuration of the content-providing system provided by the present invention.

FIG. 17 is a diagram showing a typical configuration of a content-providing system provided by the present invention.

N terminals 211-1 to 211-N having respectively set-content databases 212-1 to 212-N each used for storing predetermined contents each referred to hereafter as a set content are sold in the market. If it is not necessary to distinguish the terminals 211-1 to 211-N from each other, each of them is generically referred to hereafter as a terminal 211. This way of using a generic reference numeral to denote identical components is applicable to all identical components other than the terminals 211-1 to 211-N. A user purchasing a terminal 211 is capable of utilizing a set content stored in the set-content database 212 of the terminal 211 by operating the terminal 211. A set content is a content stored or set in advance in a terminal 211 purchased by a user. It is to be noted that every terminal 211 is capable of communicating with another terminal 211 directly or through the network 2.

The terminal 211 is connected to the network 2 by being mounted on a cradle not shown in the figure. Thus, when the terminal 211 is dismounted from the cradle, the user can operate the terminal 211 in an offline mode.

As will be described later in detail, in order to utilize a set content, the terminal 211 transmits an apparatus ID unique to the terminal 211, the content ID of the set content the user wants to utilize and an electronic point, which is a point count for purchasing the license of the set content, to a license server 221 by way of the network 2 as a request to purchase the set content or to purchase the license of the set content.

After receiving a utilization condition and a necessary point count from the license server 221, the terminal 211 carries out a utilization process such as a reproduction process for the set content, which has been stored in advance in the set-content database 212, in accordance with the utilization condition and the necessary point count. Transmitted by the license server 221 in response to the request to purchase the license, the utilization condition is a condition for utilizing the set content.

As described above, the license server 221 transmits the utilization condition and the necessary point count to the terminal 211 in response to the request received from the terminal 211 as a request to purchase the set content or the license of the set content. In this embodiment, the point count or the electronic point count is used in place of a fee in processing such as a process to purchase a license.

A content server 222 is a server operated by a content producer to provide a terminal 211 with set contents stored in the set-content database 212 embedded in a terminal 211. In accordance with the state of utilization of set contents in a terminal 211, the content server 222 provides the terminal 211 with a favorite set content for the user owning or using a terminal 211 by way of the terminal 211. The content server 222 is also capable of adding a set content to the set-content database 212 of a terminal 211. In this case, the content server 222 supplies the set content to the terminal 211 by way of the network 2.

The license server 221 is operated by a system-management enterprise like the one shown in FIG. 6. By the same token, the content server 222 is operated by a system-management enterprise like the one shown in FIG. 6. That is to say, since the license server 221 collects sales records of set contents from each manufacturer of terminals or each content producer (or each content server 222) of the set contents, on the basis of the sales records, this content-providing system can be operated to request each manufacturer of terminals and each content producer of set contents to pay money dependent typically on the number of sold set contents as shown in FIG. 6. The money to be paid for a set content includes a fee corresponding to a copyright of the set content. In addition, this content-providing system can be operated to promote participations by manufacturers of terminals and content producers of set contents in the content-providing system.

Next, the license server 221 shown in FIG. 17 is explained.

Figure 18:
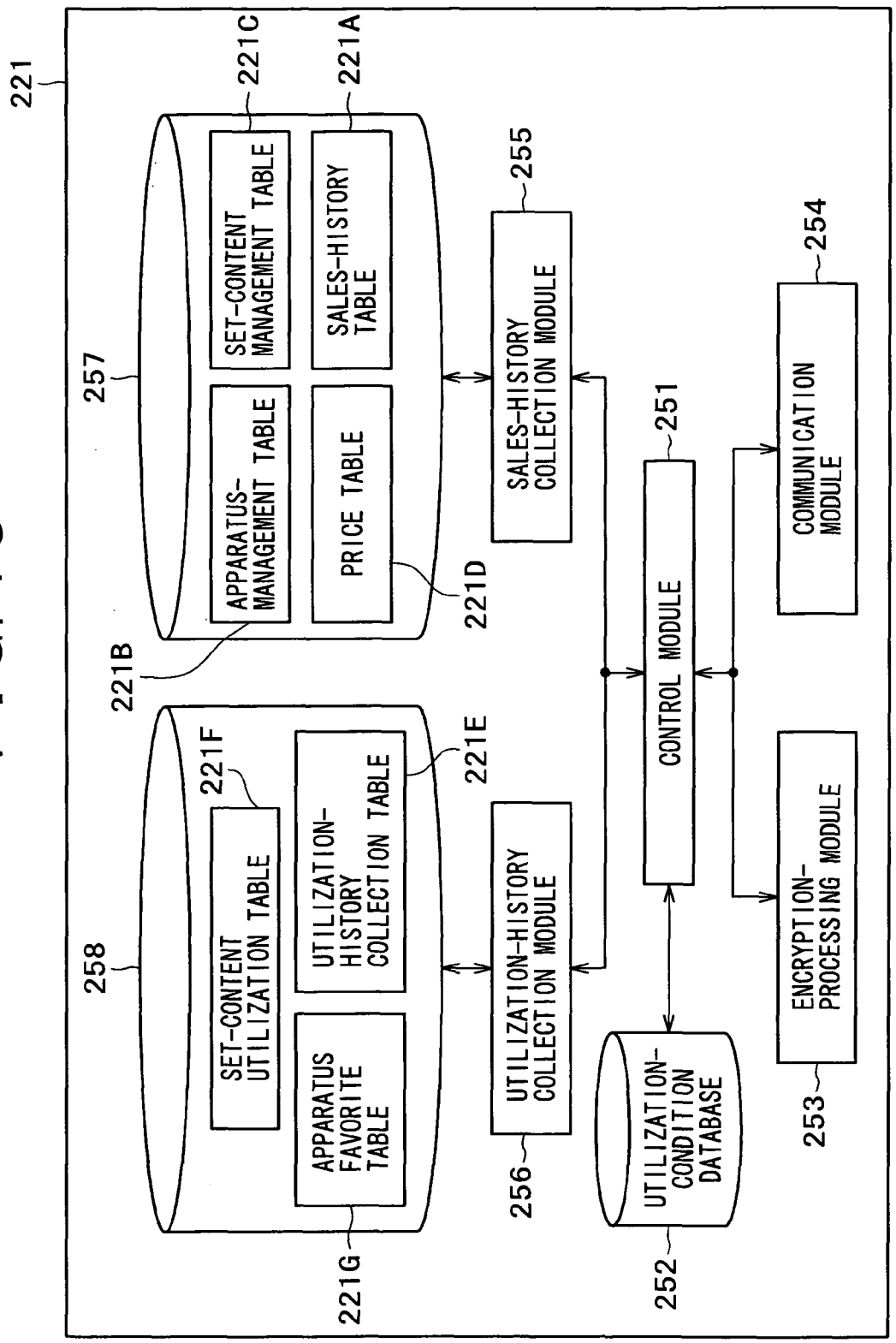
FIG. 18 is a block diagram showing a typical functional configuration of a license server employed in the content-providing system shown in FIG. 17.

Since a typical configuration of the license server 221 is similar to the one shown in the block diagram of FIG. 9, its description is not repeated. However, a typical functional configuration is explained by referring to FIG. 18.

A control module 251 of the license server 221 is a module implemented by the components ranging from the CPU 71 to the RAM 73. The control module 251 is connected to a utilization-condition database 252, an encryption-processing module 253, a communication module 254, a sales-history collection module 255 and a utilization-history collection module 256. The control module 251 controls the utilization-condition database 252, the encryption-processing module 253, the communication module 254, the sales-history collection module 255 and the utilization-history collection module 256. The utilization-condition database 252 is constructed in the hard disk 74 shown in FIG. 9 and used for storing utilization conditions for utilizing set contents stored in the set-content database 212 of the terminal 211. A utilization condition of a set content that can be utilized in the terminal 211 typically includes the content ID of the set content, a gained point count and a decryption key of the content. Typically, the utilization conditions are stored in the utilization-condition database 252 in a tabular format like one shown in FIG. 19.

In the tabular format shown in the figure, a usable set-content ID is a range of content IDs of usable contents whereas a gained point count is an electronic point, which is a point count usable at the time a set content indicated by a content ID in the range is used. For example, on the first row of the table shown in FIG. 19, the range of usable content IDs is a range from CID01 to CID29 assigned to usable set contents whereas the gained point count for this range is set at 1,000. On the second row of the table shown in FIG. 19, on the other hand, the range of usable content IDs is a range from CID80 to CID99 assigned to usable set contents whereas the gained point count for this range is set at 50. The character string CID in a content ID is an abbreviation of the phrase "content ID." It is to be noted that a decryption key can be added to the table shown in FIG. 19 as a key associated with every content ID.

Refer back to FIG. 18. The encryption-processing module 253 is a module implemented by the components ranging from the CPU 71 to the RAM 73, which are shown in FIG. 9. In accordance with control executed by the control module 251, the encryption-processing module 253 encrypts and decrypts various kinds of data. For example, the encryption-processing module 253 encrypts data to be stored in databases 257 and 258. The data to be stored in databases 257 and 258 includes a sales-history table 221A, an apparatus-management table 221B, a set-content management table 221C, a price table 221D, a utilization-history collection table 221E, a set-content utilization table 221F and an apparatus-favorite table 221G. In addition, the encryption-processing module 253 also encrypts and decrypts data read out from the databases 257 and 258. The data read out from databases 257 and 258 includes the sales-history table 221A, the apparatus-management table 221B, the set-content management table 221C, the price table 221D, the utilization-history collection table 221E, the set-content utilization table 221F and the apparatus-favorite table 221G.

The communication module 254 is a module implemented by the components ranging from the CPU 71 to the RAM 73 and the communication unit 79, which are shown in FIG. 9. The communication module 254 carries out a process of mutual authentication with the terminal 211 by using authentication data in order to establish the path of communication with the terminal 211 to serve as a communication path for communicating information with a high degree of security protection. The communication module 254 communicates with the license server 221 through the established communication path. In addition, the communication module 254 also communicates with the content server 222.

The sales-history collection module 255 is a module implemented by the components ranging from the CPU 71 to the RAM 73, which are shown in FIG. 9. The sales-history collection module 255 collects information on histories of licenses sold to terminals 211 and stores the collected information in the database 257 constructed in the hard disk 74 shown in FIG. 9. The database 257 is a database for storing the sales-history table 221A, the apparatus-management table 221B, the set-content management table 221C and the price table 221D. Concrete examples of the sales-history table 221A, the apparatus-management table 221B, the set-content management table 221C and the price table 221D are explained by referring to FIGS. 20 to 23 respectively as follows.

FIG. 20 is an explanatory diagram showing a typical sales-history table 221A. Every row of the sales-history table 221A shows a range of set-content IDs, an apparatus ID, a sale point count, a selling price and a sale date. The range of set-content IDs is IDs of set contents covered by a license sold by the server 221 to a terminal 211. The range of set-content IDs indicates that points indicated by the sale point count have been sold to a terminal 211 identified by the apparatus ID at the selling price on the sale date. It is to be noted that the range of set-content IDs is a range of content IDs associated with the license permitting actual utilization of particular set contents. Thus, the range of set-content IDs does not indicate set contents set in advance in the terminal 211.

In particular, in the case of the first row of the sales-history table 221A shown in FIG. 20, for CID01 to CID29, the apparatus ID is set at the ID of the terminal 211-1, the sale point count is set at 1,000, the selling price is set at 5,000 yen and the sale date is set at May 20, 2004 or May 20, 2004. That is to say, in accordance with the sales-history table 221A, the license server 221 has sold a license of set contents each indicated by a content ID included in the range of set-content IDs from 01 to 29 with a point count of 1,000 for the sold license at a selling price of 5,000 yen for the point count or 5 yen per point on a sale date of May 20, 2004.

In other words, the license server 221 sets information on sold set contents in the sales-history table 221A shown in FIG. 20. The information on sold set contents includes the apparatus ID of a terminal 211 purchasing the set contents, the content IDs of the set contents purchased by the terminal 211, the sale point count of the set contents, the selling price of the set contents and the sale date of the set contents. In addition, with a predetermined timing, the license server 221 collects sales or utilization records of the set contents from each manufacturer of terminals 211 or each content producer of the set contents.

FIG. 21 is an explanatory diagram showing a typical apparatus-management table 221B. Every row of the apparatus-management table 221B shows the model of terminals 221, the manufacturer of the terminals 211 and apparatus IDs of the terminals 211. In particular, in the case of the first row of the apparatus-management table 221B shown in FIG. 21, the model of terminal 211-1 is M1-1, the name of the manufacturer of the terminal 211-1 is M1 and the apparatus ID is the ID of the terminal 211-1. That is to say, in accordance with the apparatus management table 211B, the name of the manufacturer of the terminal 211-1 and the model of the terminal 211-1 are specified.

In other words, on every row of the apparatus-management table 221B, the license server 221 catalogs pieces of information such as the model of terminals 211, the name the manufacturer of the terminals 211 and apparatus IDs of the terminals 211 by associating the pieces of information with each other as shown in FIG. 21.

FIG. 22 is an explanatory diagram showing a typical set-content management table 221C. Every row of the set-content management table 221C shows the name of a content producer and a range of content IDs. In particular, in the case of the first row of the set-content management table 221C shown in FIG. 22, the name of a content producer is Label L1 and the range of content IDs consists of content IDs CID01 to CID29 identifying set contents produced by Label L1. That is to say, the set-content management table 221C shows content IDs each identifying a set content produced by each Label.

In other words, on every row of the set-content management table 221C, the license server 221 catalogs pieces of information such as a range of content IDs and the name of the content producers producing set contents identified by the content IDs by associating the pieces of contents with each other as shown in FIG. 22.

FIG. 23 is an explanatory diagram showing a typical price table 221D. Every row of the price table 221D shows the content ID of a set content, a time period and a necessary point count. That is to say, a set content identified by the content ID can be utilized during the time period by using a point count indicated by the necessary point count. In particular, in the case of the first row of the price table 221D shown in FIG. 23, a set content indicated by content ID CID01 requires 10 points for utilization during a time period from Jul. 6, 2004 to Aug. 6, 2004. That is to say, the price table 221D indicates how many points are required in order to utilize a set content identified by the content ID during a predetermined time period.

In other words, on every row of the price table 221D, the license server 221 catalogs the content ID of a set content, a time period and a necessary point count by associating the content ID of the set content, the time period and the necessary point count with each other as shown in FIG. 23.

By using the sales-history table 221A, the apparatus-management table 221B, the set-content management table 221C and the price table 221D, which are shown in FIGS. 20 to 23 respectively, the license server 221 collects sales records of set contents for each manufacturer of terminals 211 or each content producer of the set contents.

In accordance with sales-history table 221A shown in FIG. 20, the terminal 211-1 has purchased 1,000 points of a range of content IDs CID01 to CID29, 500 points of a range of content IDs CID50 to CID79 and 1,500 points of a range of content IDs CID80 to CID99. The terminal 211-2 has purchased 1,000 points of a range of content IDs CID01 to CID29. The terminal 211-3 has purchased 500 points of a range of content IDs CID40 to CID49 and 1,000 points of a range of content IDs CID80 to CID99.

That is to say, in this case, a total of 4,000 (=1,000+500+1,500+1,000) points has been sold to the terminals 211-1 and 211-2 manufactured by M1 as cataloged in the apparatus-management table 221B shown in FIG. 21, and a total of 1,500 (=500+1,000) points has been sold to the terminals 211-3 and 211-4 manufactured by M2 as cataloged in the apparatus-management table 221B shown in FIG. 21. The set-content management table 221C shown in FIG. 22 indicates that set contents produced by Label L1 as set contents identified by set IDs CID01 to CID29 and set contents identified by set IDs CID50 to CID79, a total of 2,500 (=1,000+500+1,000) points has been sold. For set contents produced by Label L2 as set contents identified by set IDs CID30 to CID39, a total of 0 points has been sold. For set contents produced by Label L3 as set contents identified by set IDs CID40 to CID49 and set contents identified by set IDs CID80 to CID99, a total of 3,000 (=1,500+500+1,000) points has been sold. The price of each content ID is cataloged in the price table 221D shown in FIG. 23.

Refer back to FIG. 18. The utilization-history collection module 256 is a module implemented by the components ranging from the CPU 71 to the RAM 73, which are shown in FIG. 9. The utilization-history collection module 256 collects information on a history of set contents utilized by each terminal 211 and stores the collected information in the database 258 constructed in the hard disk 74 shown in FIG. 9 as described earlier. The database 258 is used for storing the utilization-history collection table 221E, the set-content utilization table 221F and the apparatus-favorite table 221G. Concrete examples of the utilization-history collection table 221E, the set-content utilization table 221F and the apparatus-favorite table 221G are explained by referring to FIGS. 24, 25 and 26 respectively as follows.

FIG. 24 is a diagram showing a typical utilization-history collection table 221E. Every column of the utilization-history collection table 221E shows an apparatus ID identifying a terminal 211, the content ID of a set content utilized in the terminal 211, a utilization date and time of the set content, a utilized portion of the set content, a utilization location of the set content and a grade of the set content. That is to say, the utilization-history collection table 221E shows which set content has been used in the terminal 211 as well as when and where the set content has been used. The utilization-history collection table 221E also shows a grade given by the user to the set content. In addition, the utilization-history collection table 221E also displays a utilized portion of the set content identified by the content ID and a utilization location of the set content. An example of the utilized portion is 1 phrase of the set content. Typically found by a GPS (Global Positioning System), the utilization location represents the longitude and latitude of the location at which the set content was used. The grade is an evaluation indicator set by the user as a number for evaluating the set content.

In particular, in the case of the first row of the utilization-history collection table 221E shown in FIG. 24, the terminal 211-1 utilized a portion included in a set content identified by a content ID CID01 as a portion from 0:00 (0 minutes and 0 seconds) to 1:30 (1 minute and 30 seconds) at 19:01 on Jul. 8, 2004 at a location of 43:141 (a north latitude of 43 and a longitude of 141), and the user gave a grade of 4 to the set content. It is to be noted that FRINGE01 shown on the second row is an ID assigned to a fringe in a file of a set content identified by the content ID CID01. Examples of the fringe are a lyric and a jacket. In the following description, a word appended to a content ID as in the case with FRINGE01 can be interpreted as an ID assigned to a fringe.

In other words, the license server 221 catalogs information on a set content on every row of the utilization-history collection table 221E shown in FIG. 24. The information on a set content includes the apparatus ID of a terminal 211 using the set content, the date and the time on and at which the set content was utilized, a portion included in the set content as a portion actually utilized, a location at which the set content was utilized and a grade given to the set content.

FIG. 25 is a diagram showing a typical set-content utilization table 221F. Every column of the set-content utilization table 221F shows a content ID, a utilization date/time type, a utilized-portion type, a utilization-area type and a genre. Information shown on each column of the set-content utilization table 221F is described in detail as follows. The utilization date/time type indicates the type of a time at which the set content identified by the content ID is utilized. The utilized-portion type indicates the type of a portion included in the set content as a portion actually utilized. The utilization-area type is the type of an area in which the set content is utilized. The genre is the genre of the set content. The genre is described in meta data included in the set content. Details of the data structure of a set content will be described later by referring to FIG. 28.

In particular, in the case of the first row of the set-content utilization table 221F shown in FIG. 25, the entire set content identified by the content ID of CID01 is reproduced in a morning on a residential street. The genre of the set content is jazz.

In other words, the license server 221 catalogs information on a set content on every row of the set-content utilization table 221F shown in FIG. 25. The information on a set content includes a content ID, a utilization date/time type, a utilized-portion type, a utilization-area type and a genre.

FIG. 26 is a diagram showing a typical apparatus-favorite table 221G. Every column of the apparatus-favorite table 221G shows an apparatus ID, a favorite utilization date/time type, a utilized-portion type, a utilization-area type and a genre. Information shown on each column of the apparatus-favorite table 221G is described in detail as follows. The favorite utilization date/time type indicates a favorite time at which set content are utilized in the terminal identified by the apparatus ID. The utilized-portion type indicates the type of a portion included in each set content as a portion actually utilized. The utilization-area type is the type of an area in which the set contents are utilized. The genre is a favorite genre for the terminal.

In particular, in the case of the first row of the apparatus-favorite table 221G shown in FIG. 26, for a terminal 211-1 identified by the cataloged apparatus ID assigned to the terminal 211-1, the favorite utilized-portion type is introductory portions of set contents, the favorite utilization date/time type is mornings, the favorite utilization location type is residential streets and the favorite genre type is J-POP.

In other words, the license server 221 catalogs information on favorites for the terminal identified by the apparatus ID in the apparatus-favorite table 221G shown in FIG. 26. The information on favorites includes the apparatus ID, a favorite utilization date/time type, a utilized-portion type, a utilization-area type and a genre.

By using the utilization-history collection table 221E, the set-content utilization table 221F and the apparatus-favorite table 221G, which are shown in FIGS. 24 to 26 respectively, the license server 221 collects utilization histories of set contents and a utilization history (or favorites) for each terminal 211.

To put it in detail, on the basis of the utilization-history collection table 221E shown in FIG. 24, a utilization date/time, a utilized-portion type and a utilization-area type, which are associated with every content ID as shown in FIG. 25, are collected. In addition, on the basis of the data of set contents, genres are collected. Furthermore, on the basis of the utilization-history collection table 221E shown in FIG. 24, a favorite utilization date/time, a utilized-portion type and a utilization-area type, which are associated with every terminal, are collected. In addition, on the basis of the data of set contents, genres are collected.

Since the license server 221 collects sales records of set contents and their utilization histories from each manufacturer of terminals 211 or each content producer of the set contents, this content-providing system can be operated to request each manufacturer of terminals and each content producer of set contents to pay money dependent typically on the number of sold set contents as shown in FIG. 6. The money to be paid for a set content includes a fee corresponding to a copyright of the set content. In addition, this content-providing system can be operated to promote participations by manufacturers of terminals and content producers of set contents in the content-providing system.

Next, the content server 222 shown in FIG. 17 is explained.

Since a typical configuration of the content server 222 is similar to the configuration of the license server 21 explained earlier by referring to FIG. 9, the description of the configuration is not repeated. The following description refers to FIG. 9 as the configuration of the content server 222.

Figure 27:
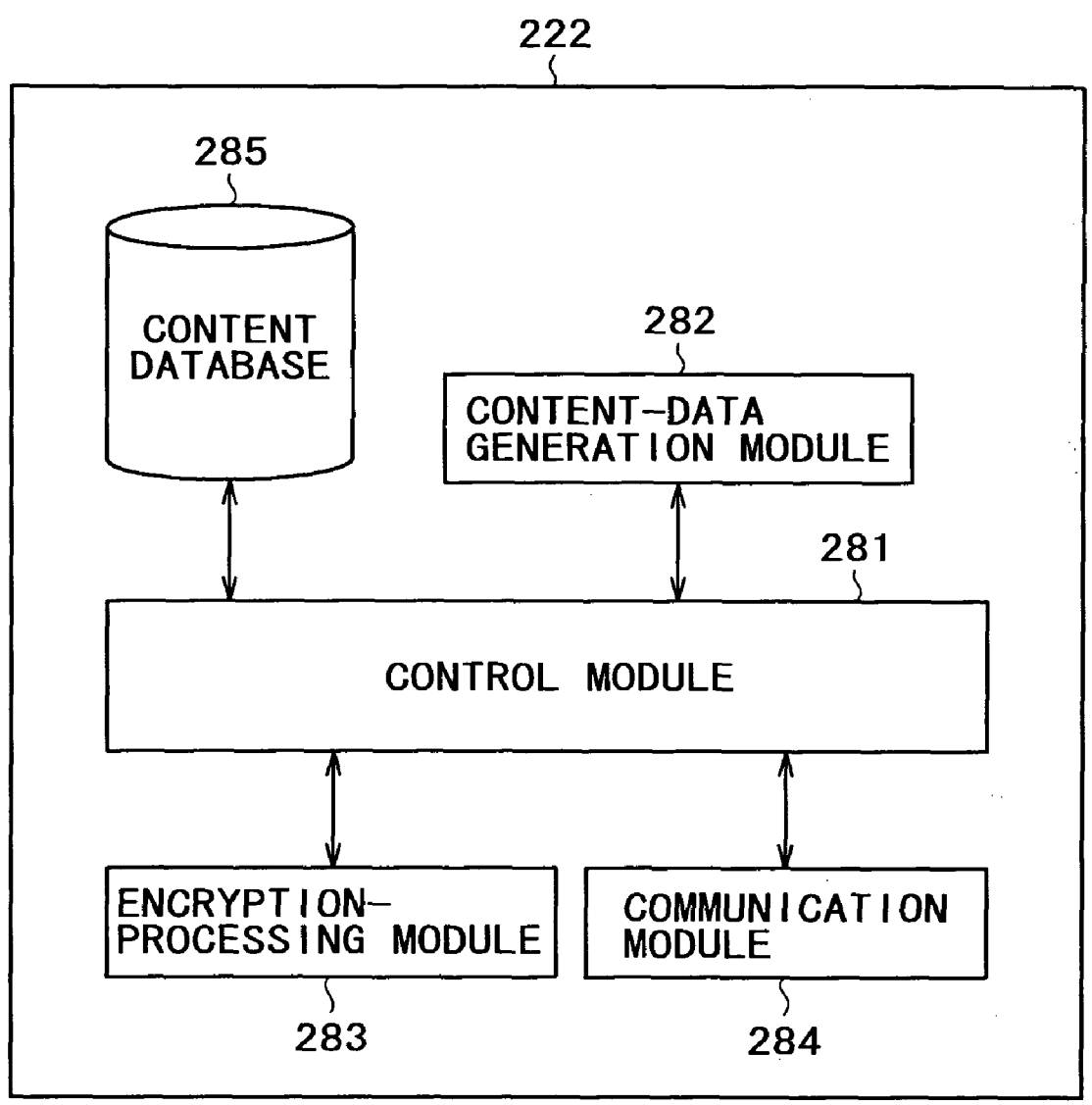
FIG. 27 is a block diagram showing a typical functional configuration of a content server employed in the content-providing system shown in FIG. 17.

FIG. 27 is a block diagram showing a typical functional configuration of the content server 222. In the typical functional configuration shown in FIG. 27, a control module 281 of the content server 222 is connected to a content-data generation module 282, an encryption-processing module 283, a communication module 284 and a content database 285. The control module 281 is a module implemented by the components ranging from the CPU 71 to the RAM 73, which are shown in FIG. 9. The control module 281 controls the content-data generation module 282, the encryption-processing module 283, the communication module 284 and the content database 285.

The content-data generation module 282 is a module implemented by the components ranging from the CPU 71 to the RAM 73, which are shown in FIG. 9. The content-data generation module 282 generates content data. Since the content server 222 is operated by a content producer as described above, the content-data generation module 282 generates content data to be supplied to a terminal 211 on the basis of content data received from a content producer. An example of the content data received from a content producer is data of a music CD (Compact Disk) album. In this embodiment, at the time the user purchases a terminal 211, set contents have already stored in the set-content database 212 of the terminal 211. Thus, the content-data generation module 282 generates only additional content data to be added to the set contents already stored in the set-content database 212. An example of the additional content data is the data of a new song. When the content-data generation module 282 generates additional content data, the content-data generation module 282 assigns a content ID to the content data as an ID for identifying the content data.

The encryption-processing module 283 is a module implemented by the components ranging from the CPU 71 to the RAM 73, which are shown in FIG. 9. The encryption-processing module 283 encrypts various kinds of data. For example, the encryption-processing module 283 encrypts content data generated by the content-data generation module 282. The control module 281 stores the encrypted content data in the content database 285. Typical data stored in the content database 285 is explained by referring to FIG. 28 as follows.

Pieces of content data are stored in the content database 285 by associating each of the pieces of content data with a content ID assigned to the piece of content data. Each piece of content data comprises AV (Audio Visual) data and meta data.

In particular, in the case of the first row in the content database 285, for example, a content ID CID01 is associated with content data comprising AV data and meta data. The content data is actually encrypted content data. The meta data includes the content genre like the ones described earlier by referring to FIGS. 25 and 26. However, such content data cannot be reproduced by the terminal 211 unless a license is granted by the license server 221 to the terminal 211. That is to say, even though the terminal 211 includes the set-content database 212 embedded therein, the terminal 211 is not capable of reproducing a content from the set-content database 212 unless a license is granted by the license server 221 to the terminal 211. Thus, illegal utilization of a content can be avoided.

Next, the terminal 211 shown in FIG. 17 is explained.

Since a typical configuration of the terminal 211 is similar to the configuration of the terminal 11 explained earlier by referring to FIG. 7, the description of the configuration is not repeated. A typical functional configuration of the terminal 211 is explained by referring to FIG. 29 as follows.

A control module 311 of the terminal 211 is connected to a GUI-processing module 312, an encryption-processing module 313, a communication module 314, a clock module 315, a position-information acquisition module 316, a purchasing-process module 317, a utilization-condition database 331, a utilization-history database 332, a favorite-content database 333 and a set-content database 212. The purchasing process module 317 is connected to a purchasing database 341 and a price database 342.

The control module 311 is a module implemented by the components ranging from the CPU 51 to the RAM 53, which are shown in FIG. 7. The control module 311 controls the GUI-processing module 312, the encryption-processing module 313, the communication module 314, the clock module 315, the position-information acquisition module 316 and the purchasing process module 317, which are connected to the control module 311, in order to store and read out data into and from the utilization-condition database 331, the utilization-history database 332, the favorite-content database 333 and the set-content database 212.

The GUI-processing module 312 is a module implemented by the components ranging from the CPU 51 to the RAM 53, the output unit 57 and the input unit 58, which are shown in FIG. 7. The GUI-processing module 312 displays a GUI on the output unit 57 shown in FIG. 7 and reports an operation carried out by the user on the GUI to the control module 311.

The encryption-processing module 313 is a module implemented by the components ranging from the CPU 51 to the RAM 53. The encryption-processing module 313 encrypts authentication data for establishing a communication with the license server 221. The authentication data includes the apparatus ID and/or a signature. The encryption-processing module 313 also uses a decryption key received from the control module 311 to decrypt a set content received from the set-content database 212 by way of the control module 312.

The communication module 314 is a module implemented by the components ranging from the CPU 51 to the RAM 53 and the communication unit 59. The communication module 314 carries out a process of mutual authentication with the license server 221 by using the authentication data in order to establish the path of communication with the license server 221 to serve as a communication path for communicating information with a high degree of security protection. The communication module 314 communicates with the license server 221 through the established communication path. In addition, the communication module 314 also communicates similarly with the content server 222. It is to be noted that, in actuality, the communication module 314 does not have to be embedded in the terminal 211. That is to say, it is possible to provide a configuration in which a communication can be carried out through the network 2 if the terminal 211 is mounted on a cradle or the like not shown in the figure. Even without the communication module 314, the terminal 211 is capable of purchasing and reproducing a set content in an offline mode.

Constructed in the hard disk 54 shown in FIG. 7, the set-content database 212 is used for storing set contents described above in a format like the one shown in FIG. 28. That is to say, every piece of content data is associated with a content ID and the content data is encrypted. Given a license received from the license server 221, the content can be reproduced.

Constructed in the hard disk 54 shown in FIG. 7, the utilization-condition database 331 is used for storing necessary utilization conditions for utilizing set contents stored in the set-content database 212. A utilization condition includes the ID of a usable set content, a gained point count and a decryption key. When the terminal 211 receives a license from the license server 221, the terminal 211 acquires a utilization condition from the license server 221 and stores the utilization condition in the utilization-condition database 331. That is to say, the utilization condition stored in the utilization-condition database 331 is created by referring to the table shown in FIG. 19.

Constructed in the hard disk 54 shown in FIG. 7, the price database 342 is used for storing a table similar to the price table 221D explained earlier by referring to FIG. 23. That is to say, when the terminal 211 receives a license from the license server 221, the terminal 211 acquires a price table from the license server 221 and stores the table in the price database 342. In other words, the price table stored in the price database 342 is created in a format shown in FIG. 23.

The control module 311 controls operations to store and read out data into and from the set-content database 212, the utilization-condition database 331, the utilization-history database 332 and the favorite-content database 333. Concrete examples of the tables stored in the utilization-history database 332 and the favorite-content database 333 are explained by referring to FIGS. 30 and 31 respectively.

FIG. 30 is an explanatory diagram showing a typical table stored in the utilization-history database 332. Each row of the table stored in the utilization-history database 332 shows a utilization history ID, the ID of a utilized content, a utilization date/time, a utilized portion, a utilization location and a grade, which are associated with each other. The utilization history ID is an ID for discriminate the utilization history when the contents are utilized in the terminal 211. It is to be noted that, since the utilization date/time, the utilized portion, the utilization location and the grade are the same as their respective counterparts explained earlier by referring to FIG. 24, their descriptions are mot repeated.

In particular, in the case of the first row of the table shown in FIG. 30, for a utilization history ID of UID01, a portion included in a content identified by a content ID CID01 as a portion from 0:00 (0 minutes and 0 seconds) to 1:30 (1 minute and 30 seconds) was utilized at 19:01 on Jul. 8, 2004 at a location of 43:141 (a north latitude of 43 and a longitude of 141), and the user gave a grade of 4 to the content. That is to say, a utilization history of a content in the terminal 211 can be collected. The utilization history includes a utilized portion of the content, a location at which the content was utilized and a grade given to the content.

FIG. 31 is an explanatory diagram showing a typical table stored in the favorite-content database 333. The table stored in the favorite-content database 333 comprises columns of a favorite type, a favorite name and a content ID. The favorite type can be a genre, a situation or a time slot. The genre is set on the basis of meta data. The situation is set in accordance with the utilization date/time described earlier by referring to FIG. 30.

In the case of the genre favorite type, the favorite name of the content identified by the ID CID01 is jazz as shown on the first row of the table of FIG. 31. For the situation favorite type, the favorite name of the content identified by the ID CID01 is a wake-up music. On the basis of the utilization history like the one shown in FIG. 30, a table is stored in the favorite-content database 333 and favorites of the user owning the terminal 211 can be collected.

Figure 29:
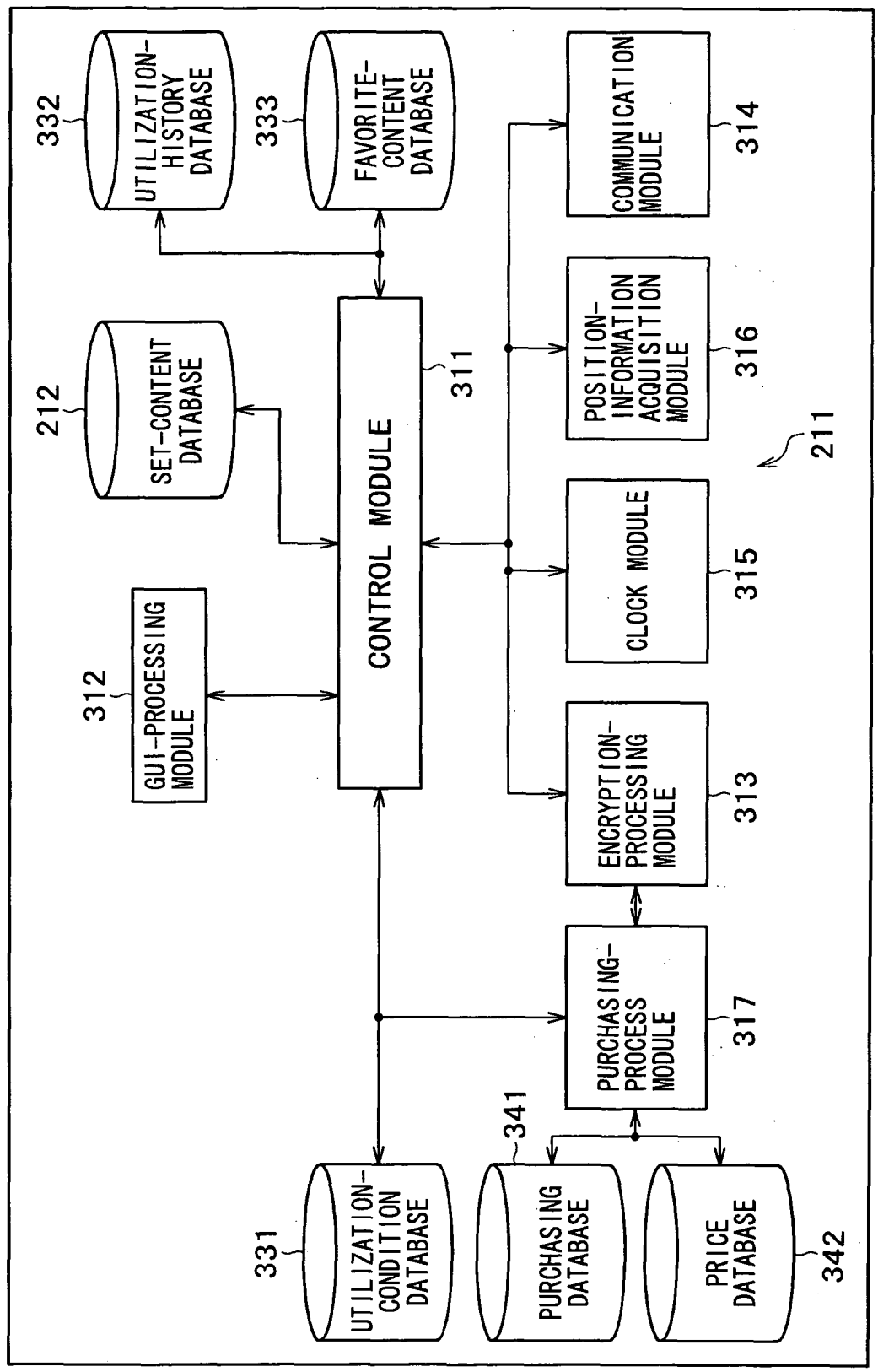
FIG. 29 is a block diagram showing a typical configuration of a terminal employed in the content-providing system shown in FIG. 17.

FIG. 32 is an explanatory diagram showing a typical table stored in the purchasing database 341 shown in FIG. 29. Every row of the table stored in the purchasing database 341 shows the ID of a set content, a purchasing date/time and a consumption point count. The consumption point count is set on the basis of a content ID and a time period, which are cataloged in the price database 342 shown in FIG. 23. In particular, in the case of the first row of the table shown in FIG. 32, a content identified by a content ID CID01 was utilized at 18:05:04 on Jul. 6, 2004 and, thus, the consumption point count is set at 10 on the basis of the necessary point count of 10 shown in FIG. 23. As described above, on the basis of the table stored in the purchasing database 341, data of a content purchased by using the terminal 211 can be collected.

Figure 33:
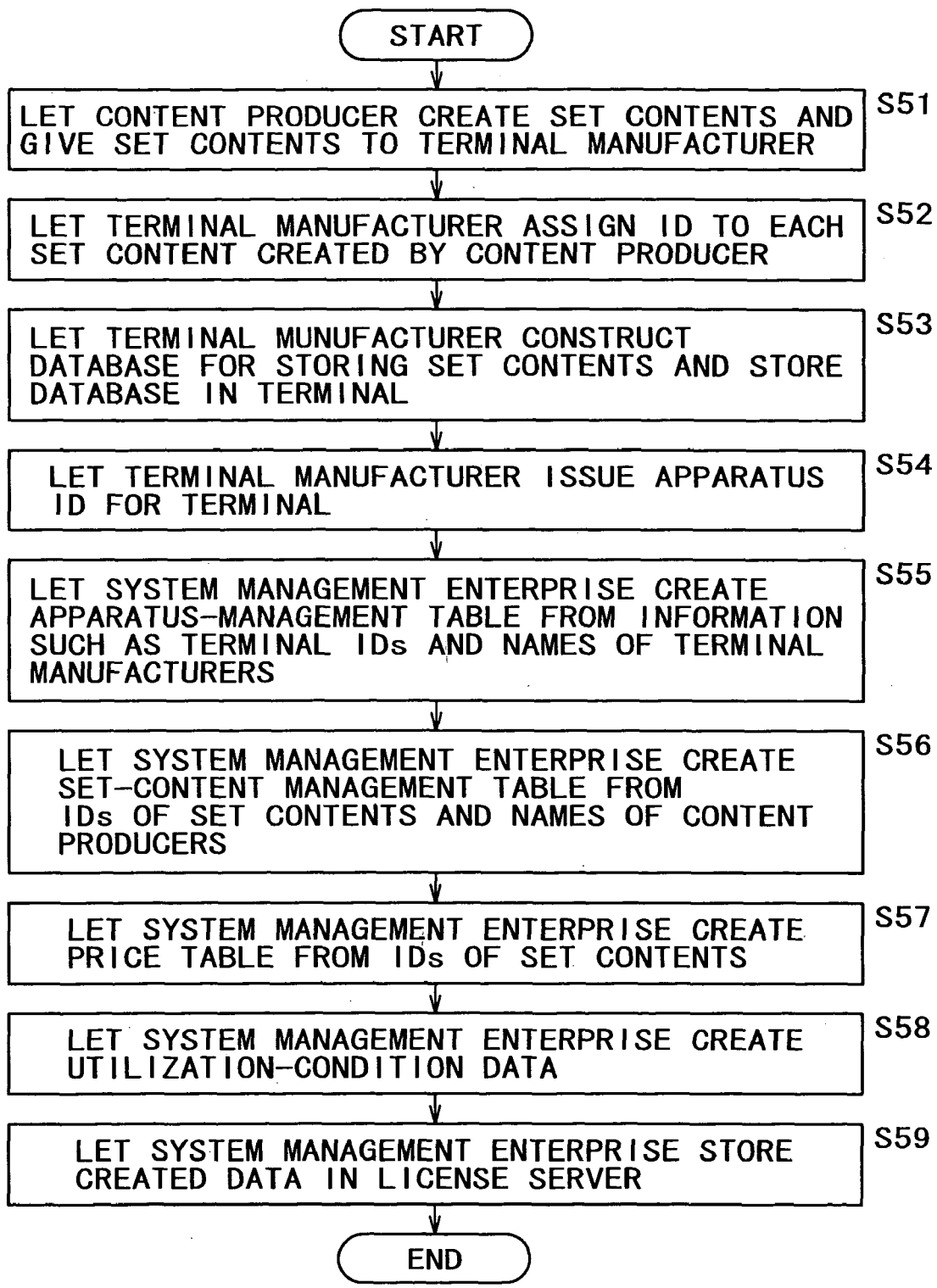
FIG. 33 shows an explanatory flowchart representing processing to generate a set-content database, an apparatus-management table, a set-content management table, a price table and a utilization-condition database.

By referring to a flowchart shown in FIG. 33, the following description explains processing carried out by a terminal manufacturer, a content producer (actually, for example, the content server 222) and a system-management enterprise shown in FIG. 6 to generate a set-content database 212 of a terminal 211, an apparatus-management table 221B of the license server 21 or the terminal 211, a set-content management table 221C, a price table 221D (or a price database 342) and a utilization-condition database 252 (or a utilization-condition database 331).

First of all, at a step S51, the content producer creates set contents and gives the set contents to the terminal manufacturer. It is to be noted that the content producer can also create a set content by utilizing the content-data generation module 282 of the content server 222 operated by the content producer itself.

Then, at the next step S52, the terminal manufacturer assigns an ID to every set content created and supplied by the content producer. As shown in FIG. 28, for example, a CID is assigned to each content data as an ID that can be used for identifying the content data.

Subsequently, at the next step S53, the terminal manufacturer constructs a database 212 for storing set contents and stores the database in the hard disk 54 of the terminal 211.

Then, at the next step S54, the terminal manufacturer issues an apparatus ID for the terminal 211.

Subsequently, at the next step S55, the system management enterprise creates an apparatus-management table 211B shown in FIG. 21 as a table showing apparatus IDs of terminals 211 and names of terminal manufacturers.

Then, at the next step S56, the system management enterprise creates a set-content management table 221C shown in FIG. 22 as a table showing the IDs of set contents and names of content producers. The IDs of the set contents were assigned to their respective set contents at the step S52.

Subsequently, at the next S57, the system management enterprise creates a price table 221D shown in FIG. 23 with IDs of set contents.

Then, at the next step S58, the system management enterprise creates utilization-condition data of the utilization-condition database 252 shown in FIG. 19.

Subsequently, at the next step S59, the system management enterprise stores the created pieces of data in the license server 221. For example, the system management enterprises stores the apparatus-management table 221B, the set-content management table 221C, the price table 221D and the utilization-condition database 252 into the hard disk 74 employed in the license server 221. It is to be noted that, at that time, the utilization-condition database and the price table can be stored in the license server 221 as single data. By combining them into single data, it is not necessary to acquire the price table and utilization-history data separately in a process to be described later. After the execution of the step S59 is completed, the processing is ended.

In this way, the set-content database 212 is constructed and stored in the terminal 211 whereas the apparatus-management table 221B, the set-content management table 221C, the price table 221D and the utilization-condition database 252 are generated and stored in the license server 221.

Next, concrete flows of processing carried out by the terminal 211, the license server 221 and the content server 222, which are described above, are explained.

Figure 34:
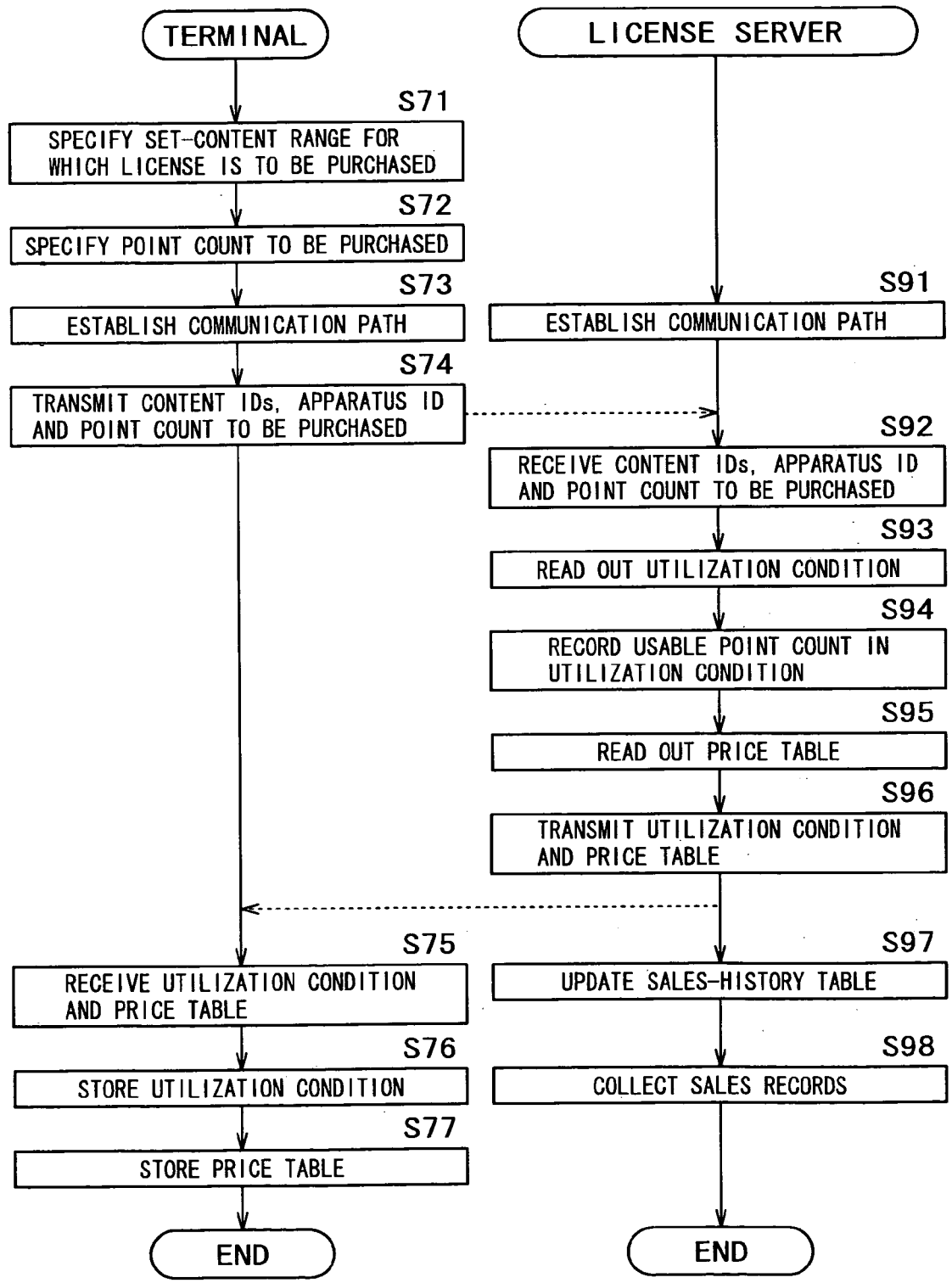
FIG. 34 shows an explanatory flowchart representing processing to sell a license of set contents.

First of all, processes carried out by the terminal 211 and the license server 221 to respectively purchase and sell a license of a set content are explained by referring to a flowchart shown in FIG. 34. It is to be noted that these processes are carried out for a case in which the terminal 211 and the license server 221 are connected to each other by the network 2.

First of all, at a step S71, the user operates a GUI displayed on the output unit 58 employed in the terminal 211 to specify a set content for which a license is to be purchased. If the user specifies a range of set contents, the GUI-processing module 312 supplies content IDs of the specified set-content range to the control module 311.

Then, at the next step S72, the user operates a GUI displayed on the output unit 58 employed in the terminal 211 to specify a point count to be purchased. When the user specifies a predetermined point count, the GUI-processing module 312 supplies the specified point count to the control module 311 as a point count to be purchased.

Subsequently, at the next step S73, the control module 311 controls the encryption-processing module 313 to generate authentication data by encryption of information such as the apparatus ID and a signature. In addition, the control module 311 also controls the communication module 314 to establish a path of communication with the license server 221 on the basis of the authentication data.

After the path of communication with the license server 221 is established, at the next step S74, the control module 311 controls the encryption-processing module 313 to encrypt content IDs of the set-content range specified at the step S71, the apparatus ID of the terminal 211 and a point count specified at the step S72 as a point count to be purchased. Subsequently, the control module 311 controls the communication module 314 to transmit the encrypted content IDs, the encrypted apparatus ID and the encrypted point count to the license server 221.

In the mean time, at a step S91, as a counterpart process of the process carried out by the terminal 211 in the processing carried out at the step S73, the communication module 254 of the license server 221 carries out processing to establish the path of communication with the terminal 211 to serve as a communication path for communicating information with a high degree of security protection. In this way, the communication path is established. When the terminal 211 transmits the content IDs, the apparatus ID of the terminal 211 and the point count to be purchased in the processing carried out at the step S74 to the license server 221 through the communication path, the communication module 254 of the license server 221 receives the content IDs, the apparatus ID of the terminal 211 and the point count to be purchased at a step S92.

Then, at the next step S93, the control module 251 of the license server 221 controls the encryption-processing module 253 to decrypt the content IDs and the apparatus ID of the terminal 211, which were received at the step S92. Subsequently, the control module 251 reads out the utilization condition of a range of set contents identified by the content IDs from the utilization-condition database 252 shown in FIG. 19. At that time, a gained point count has not been set in the utilization-condition database 252.

Then, at the next step S94, the control module 251 of the license server 221 records a usable point count in the utilization condition. For example, a point count received in the processing carried out at the step S92 as the point count to be purchased is set as a usable point count corresponding to the IDs of usable set contents as shown in FIG. 19 to generate utilization-condition data.

Subsequently, at the next step S95, the control module 251 of the license server 221 reads out the price table 221D corresponding to the content IDs from the database 257. Assume for example that content IDs CID01 to CID29 were specified. In this case, as the price table 221D, a price table showing a period of time and a necessary point count, which are associated with each of the content IDs CID01 to CID29, is read out from the database 257.

Then, at the next step S96, the control module 251 of the license server 221 controls the encryption-processing module 253 to encrypt the utilization condition generated at the step S94 and the price table 221D read out at the step S95. Subsequently, the control module 251 of the license server 221 controls the communication module 254 to transmit the encrypted utilization condition and the encrypted price table 221D to the terminal 211.

At a step S75, the control module 311 of the terminal 211 receives the utilization condition and the price table 221D, which were transmitted by the license server 221 through the communication module 314.

Then, at the next step S76, the control module 311 catalogs the utilization condition in the utilization-condition database 331 stored in the hard disk 54.

Finally, at the next step S77, the control module 311 catalogs the price table 221D after being decrypted in the price database 342 stored in the hard disk 54. After the execution of the step S77 is completed, the processing in the terminal 211 is ended. In this way, a license of the set contents specified or purchased at the step S71 can be purchased from the license server 221 so that the terminal 211 is capable of utilizing these contents.

After the utilization condition and the price table 221D are transmitted to the terminal 211, at a step S97, the control module 251 of the license server 221 controls the sales-history collection module 255 to update the sales-history table 221A stored in the database 257 in the format shown in FIG. 20 by cataloging information such as a range of content IDs each identifying a purchased set content, the apparatus ID of the terminal 211, the purchased point count as the sale point count, the selling price and the sale date in the sales-history table 221A. It is to be noted that, while the selling price and the purchased point count are cataloged at the same time in this case, it is also possible to provide a configuration in which only the purchased point count is cataloged at the present time whereas the selling price is cataloged upon price adjustment made on a later day.

Finally, at the next step S98, with a proper timing, the control module 251 of the license server 221 collects sales records of set contents for each terminal manufacturer or each content producer of the set contents by utilizing the sales-history table 221A, the apparatus-management table 221B, set-content management table 221C and the price table 221D, which are stored in the table 257 as tables shown in FIGS. 20, 21, 22 and 23 respectively. The control module 251 then stores the collected sales records typically in a memory. On the basis of the collected sales records, the system-management enterprise provides feedbacks to each terminal manufacturer and each content producer as explained earlier by referring to FIG. 6.

In this way, set contents or a license of the set contents are sold and sales records of the sold set contents are collected.

It is to be noted that, while a utilization condition and an electronic point count are transmitted at the same time in the processing represented by the flowchart shown in FIG. 34, a range of IDs each identifying a set content to be purchased and the electronic point count can also be transmitted separately from each other. In addition, as another alternative, the electronic point count is included in advance typically in the header of content data stored in the set-content database 212 of the terminal 211.

In accordance with the processing represented by the flowchart shown in FIG. 34, the terminal 211 is capable of purchasing a license of set contents from the license server 221. In order to actually reproduce the set contents after this processing in the terminal 211, the set contents need to be purchased on the basis of a point count of the license purchased in the processing represented by the flowchart shown in FIG. 34. That is to say, in the processing represented by the flowchart shown in FIG. 34, an electronic point count for reproducing the set contents is purchased and points are consumed from the electronic point count each time a set content is reproduced. By referring to a flowchart shown in FIGS. 35 and 36, the following description explains processing carried out by the terminal 211 shown in FIG. 29 to purchase set contents after the processing represented by the flowchart shown in FIG. 34. It is to be noted that the terminal 211 starts the processing described below when a command to reproduce a set content is received from the user owning the terminal 211.

First of all, at a step S111, the control module 311 shown in FIG. 29 acquires the ID of a set content specified in a reproduction command. Assume for example that the terminal 211 purchased set contents identified by a range of content IDs CID01 to CID 29 in the processing represented by the flowchart shown in FIG. 34 at 1,000 points. In this case, the set contents in the purchased range can be specified in the reproduction command as contents to be reproduced within the purchased point count. Let the user of the terminal 211 enter a reproduction command specifying the content ID CID01 specifying one of the set contents. In this case, the control module 311 of the terminal 211 acquires the content ID CID01 specifying the set content.

Then, at the next step S112, the purchasing-process module 317 controls the encryption-processing module 313 to decrypt the price database 342. This is because the license server 221 transmits an encrypted price table to the terminal 211 at the step S96 of the flowchart shown in FIG. 34 and the terminal 211 stores the price table in the price database 342 at the step S75 of the same flowchart.

Subsequently, at the next step S113, the purchasing-process module 317 acquires the necessary point count for the content ID from the price database 342. Assume for example that the user of the terminal 211 has entered a reproduction command specifying the content ID CID01 specifying the set content at the step S111. In this case, the purchasing process module 317 obtains a point count of 10 as is obvious from the price table 221D stored in the price database 342 in the format shown in FIG. 23.

Then, at the next step S114, the purchasing-process module 317 controls the encryption-processing module 313 to decrypt the purchasing database 341 and the utilization-condition database 331. This is because data stored in the purchasing database 341 and the utilization-condition database 331 is also encrypted data received from the license server 221.

Subsequently, at the next step S115, the purchasing-process module 317 computes a post-reproduction utilization point, which is a utilization point count resulting after reproduction of the set content as requested by the reproduction command received at the step S111, on the basis of the table stored in the purchasing database 341 in the format shown in FIG. 32 and the utilization condition stored in the utilization-condition database 331. In the case of the example shown in FIG. 19, the utilization condition corresponds to a range of IDs CID01 to CID29 each identifying a usable set content and a gained point count of 1,000 for the set contents. For example, the purchasing process module 317 first adds a point count acquired in the processing carried out at the step S113 to a sum of consumption point counts of contents purchased as shown in the purchasing data of FIG. 32. The point count acquired in the processing carried out at the step S113 is 10 and the sum of consumption point counts of contents purchased as shown in the purchasing data of FIG. 32 is 40. Thus, the purchasing process module 317 first adds 10 to 40. Then, the purchasing process module 317 subtracts the result of this addition from the point count of the license purchased in the processing represented by the flowchart shown in FIG. 34 to find the post-reproduction utilization point count mentioned above. Thus, since the point count of the license purchased in the processing represented by the flowchart shown in FIG. 34 is 1,000 as described above, in this case, the purchasing process module 317 finds the value of an expression (1,000−(40+10)), which is 950, as the post-reproduction utilization point count.

Then, at the next step S116, the purchasing-process module 317 controls the encryption-processing module 313 to encrypt the utilization point count.

Subsequently, at the next step S117, the purchasing-process module 317 stores the encrypted utilization point count in the utilization point count database 341. In the case of this example, encrypted data indicating that a set content identified by the content ID CID01 has been purchased (or consumed) at 10 points is cataloged as shown in FIG. 32. At that time, the purchasing data/time is also cataloged. Thus, by carrying the pieces of processing of the steps S116 and S117, the data to be stored in the purchasing database 341 is encrypted for the purpose of protection.

Then, at the next step S118, the purchasing-process module 317 informs the control module 311 that utilization of the content is permitted.

Finally, at the next step S119, the control module 311 starts the utilization of the content. To be more specific, the control module 311 starts the utilization of the set content, the reproduction of which was requested by the reproduction command in the processing carried out at the step S111. Details of the processing to start reproduction of a set command are explained by referring to a flowchart shown in FIGS. 37 and 38.

Figure 35:
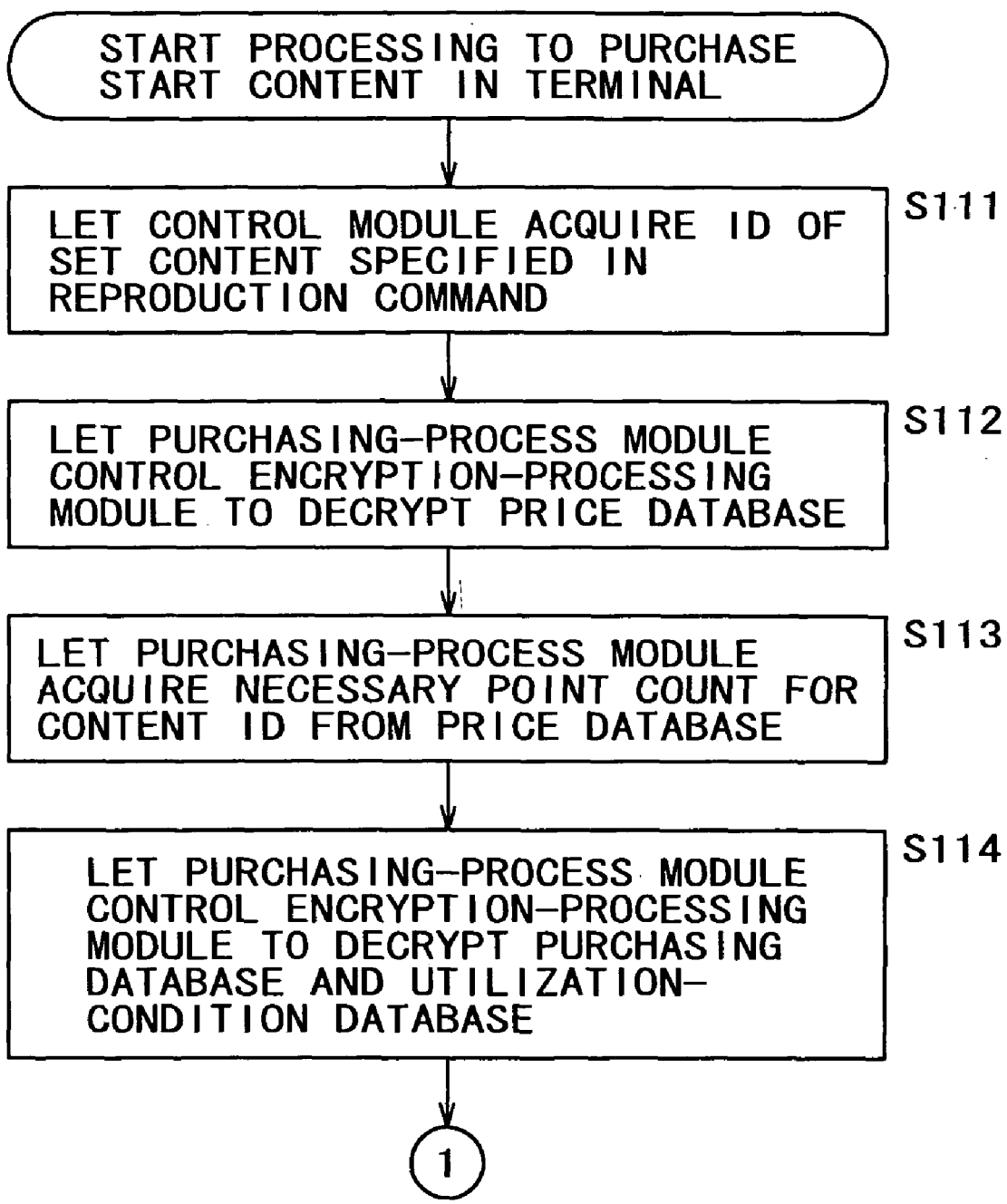
FIG. 35 shows an explanatory flowchart representing processing to purchase set contents in a terminal.
Figure 36:
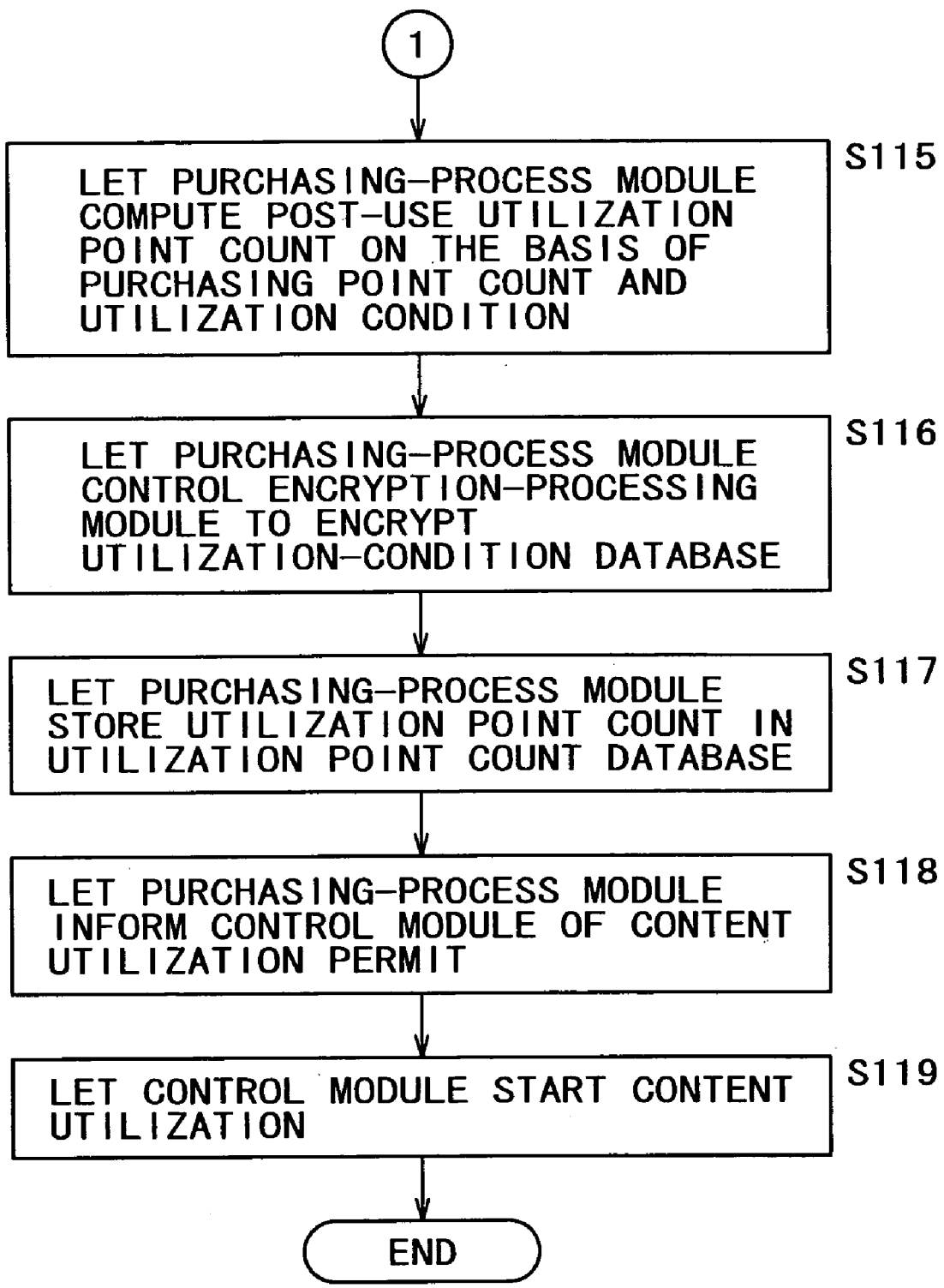
FIG. 36 shows an explanatory continuation flowchart representing the processing to purchase set contents in a terminal.

By carrying out the processing represented by the flowchart shown in FIGS. 35 and 36, a set content can be reproduced in an offline mode on the basis of a license purchased in the processing represented by the flowchart shown in FIG. 34. That is to say, the terminal 211 is capable of purchasing and reproducing a set content on the basis of a point count in an offline mode.

Figure 37:
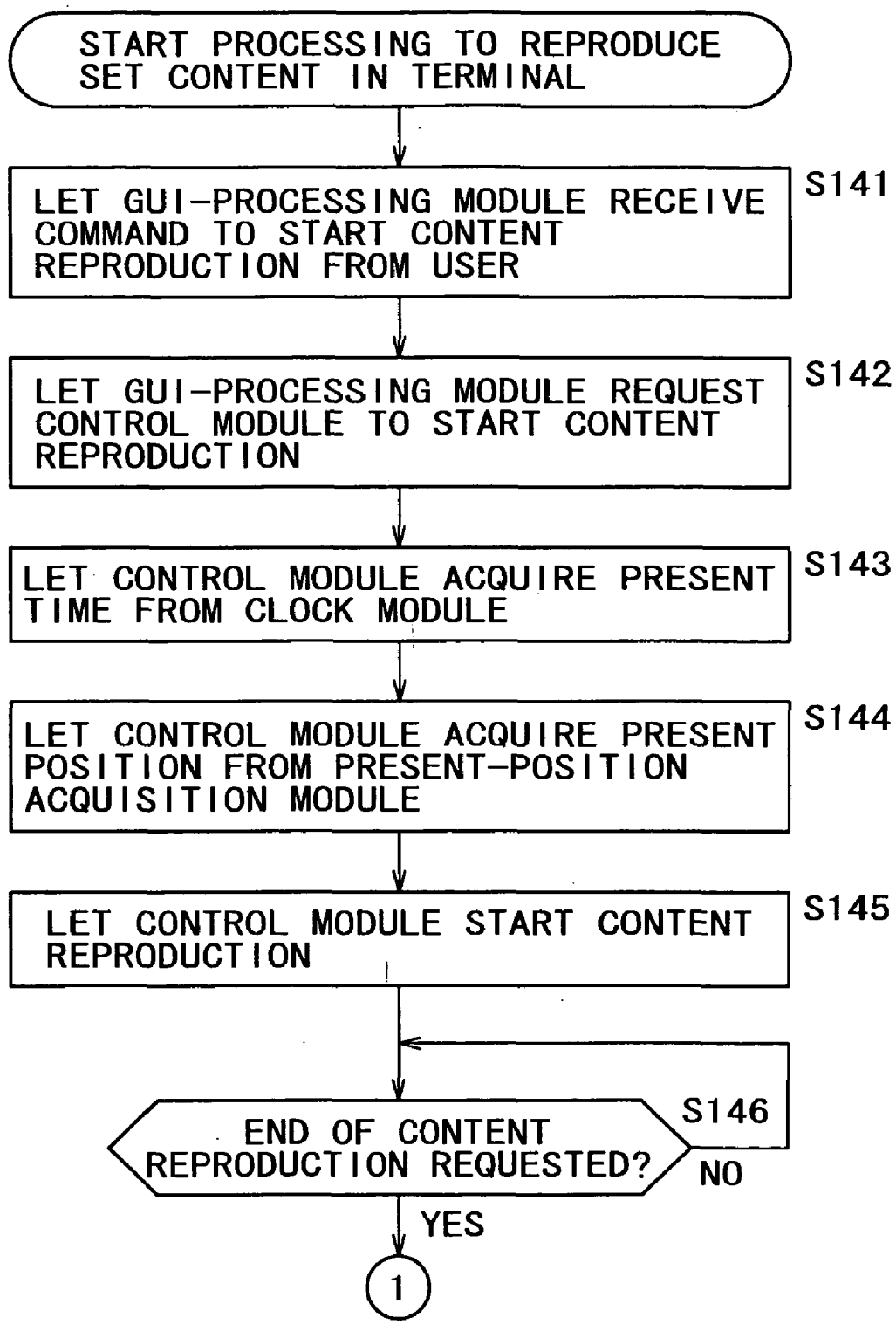
FIG. 37 shows an explanatory flowchart representing processing to reproduce a set content in a terminal.
Figure 38:
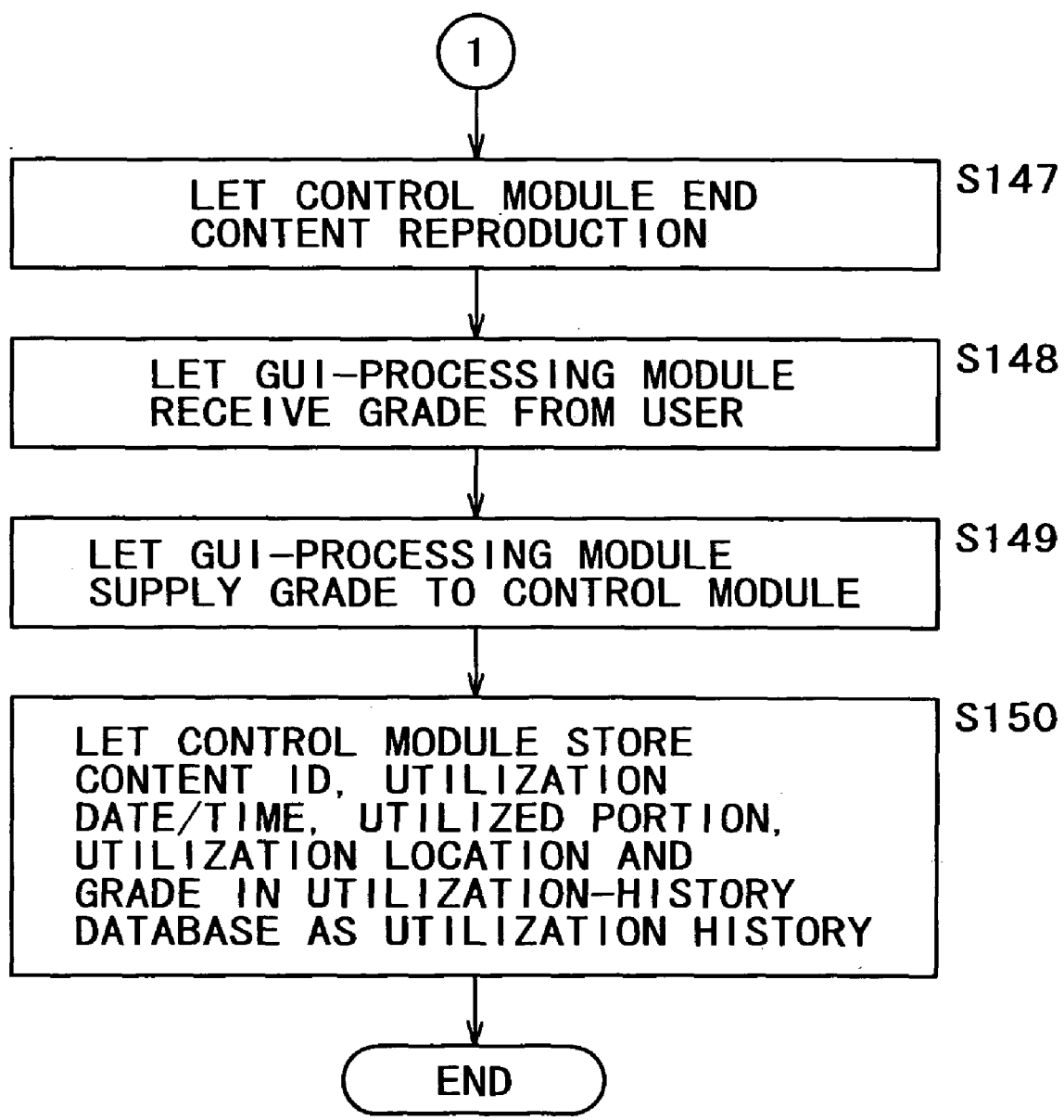
FIG. 38 shows an explanatory continuation flowchart representing the processing to reproduce a set content in a terminal.

By referring to the flowchart shown in FIGS. 37 and 38, the following description explains details of the processing carried out at the step S119 of the flowchart shown in FIG. 36 to start reproduction of a set content, that is, processing carried out in the terminal 211 to reproduce a set command.

First of all, at a step S141, the GUI-processing module 312 receives a command to start reproduction of a set content from the user.

Then, at the next step S142, the GUI-processing module 312 requests the control module 311 to start reproduction of the set content.

Subsequently, at the next step S143, the control module 311 acquires information on the present time from the clock module 315. An example of the acquired information on the present time is Jul. 8, 2004 at 19:01.

Then, at the next step S144, the control module 311 acquires information on the present position from the present-position acquisition module 316. An example of the acquired information on the present position is 43:141.

Subsequently, at the next step S145, the control module 311 starts the reproduction of the set content. The set content, the reproduction of which is started, is a content identified by a content ID purchased in the processing represented by the flowchart shown in FIGS. 35 and 36.

Then, at the next step S146, on the basis of a command received from the GUI-processing module 312, the control module 311 determines whether or not the user has made a request for an end of the content reproduction. If a result of the determination indicates that the user has not made a request for an end (a termination) of the content reproduction, the reproduction of the set content is continued in a state of waiting for the user to make such a request.

If the determination result obtained at the step S146 indicates that the user has made a request for an end of the content reproduction, on the other hand, the flow of the processing goes on to a step S147 at which the control module 311 ends the reproduction of the set content.

Subsequently, at the next step S148, the GUI-processing module 312 receives a grade from the user. If the user gives a grade of 4 to the set content, for example, the GUI-processing module 312 receives an integer input of 4 as the grade.

Then, at the next step S149, the GUI-processing module 312 informs the control module 311 of the grade. In this case, the GUI-processing module 312 supplies the grade of 4 to the control module 311.

Subsequently, at the next step S150, the control module 311 stores the content ID, the utilization date/time, the utilized portion, the utilization location and the grade in the utilization-history database 332 as a record in the utilization history. As shown in the utilization record stored on the first row of the table of FIG. 30, for example, the content ID is CID01, which is the ID of a set content requested as a purchased content in the processing represented by the flowchart shown in FIGS. 35 and 36, the utilization date/time is Jul. 8, 2004 at 19:01 obtained at the step S143, the utilized portion is a period of time between the processing carried out at the step S145 and the processing carried out at the step S146 to end the reproduction of the set content, the utilization position is the present position acquired in the processing carried out at the step S144 and the grade is a grade received in the processing carried out at the step S148. Such utilization records are stored sequentially for usable history IDs (UIDs) as shown in FIG. 30. After the execution of this step is completed, the processing is ended.

By carrying out the processing represented by the flowchart shown in FIGS. 37 and 38, a set content can be reproduced and a utilization record (or a reproduction record) of the set content can be cataloged in the utilization history.

In this way, in the terminal 211, the license of a set content is first purchased and the content is actually purchased on the basis of a stored point count and reproduced in an offline mode. Later on, when the terminal 211 is mounted on typically a cradle shown in none of the figures in a state of being capable of communicating with the license server 221, the utilization history of set contents in the terminal 211 put in an online mode is transmitted to the license server 221. Processing to transmit the utilization history of set contents from the terminal 211 to the license server 221 is explained by referring to a flowchart shown in FIG. 39. It is to be noted that the processing to transmit the utilization history of set contents from the terminal 211 to the license server 221 is started when the terminal 211 is put in a state of being capable of communicating with the license server 221 after executions of the pieces of processing explained earlier by referring to FIGS. 24 to 38 have been completed. As an alternative, the processing to transmit the utilization history of set contents from the terminal 211 to the license server 221 can also be started after a fixed period of time has lapsed since the end of processing to update a price as will be described later by referring to a flowchart shown in FIG. 45.

First of all, at a step S161, the control module 311 of the terminal 211 starts a delivery of a utilization history stored in the utilization-history database 332 of the terminal 211 in the format shown in FIG. 30 to the license server 221.

Then, at the next step S162, the control module 311 controls the encryption-processing module 313 to generate authentication data by encryption of information such as the apparatus ID and the signature. The control module 311 also controls the communication module 314 to establish a path of communication with the license server 221 on the basis of the authentication data.

After the path of communication with the license server 221 is established, at the next step S163, the control module 331 controls the encryption-processing module 313 to transmit the apparatus ID and the utilization history table shown in FIG. 30 to the license server 221.

In the mean time, at a step S181, as a counterpart of the processing carried out by the terminal 211 at the step S162, the communication module 254 of the license server 221 carries out processing to establish the path of communication with the terminal 211 to serve as a communication path for communicating information with a high degree of security protection. With such a path of communication established in this way, at a step S182, the communication module 254 of the license server 221 receives the apparatus ID and the utilization history, which are transmitted by the terminal 211 at the step S163.

Then, at the next step S183, the control module 251 of the license server 221 controls the utilization-history collection module 256 to update the program-management table 221E stored in the database 258 in the format shown in FIG. 24 by newly cataloging the apparatus ID and the utilization history table, which were received at the step S182, in the utilization-history collection table 221E. The structure of the utilization history table is shown in FIG. 30.

Subsequently, at the next step S184, the control module 251 controls the utilization-history collection module 256 to update the set-content utilization table 221F stored in the database 258. The set-content utilization table 221F is updated on the basis of the utilization history received in the processing carried out at the step S182.

Then, at the next step S185, the control module 251 controls the utilization-history collection module 256 to update the apparatus-favorite table 221G shown in FIG. 26 on the basis of the apparatus ID and the utilization history.

Subsequently, at the next step S186, the control module 331 controls the communication module 254 to transmit a notice of completion of the processing to update data to the terminal 211 by way of the communication module 254

At a step S186, the communication module 314 of the terminal 211 receives the completion notice transmitted by the license server 221 in the processing carried out at the step S186, and ends the processing.

Figure 39:
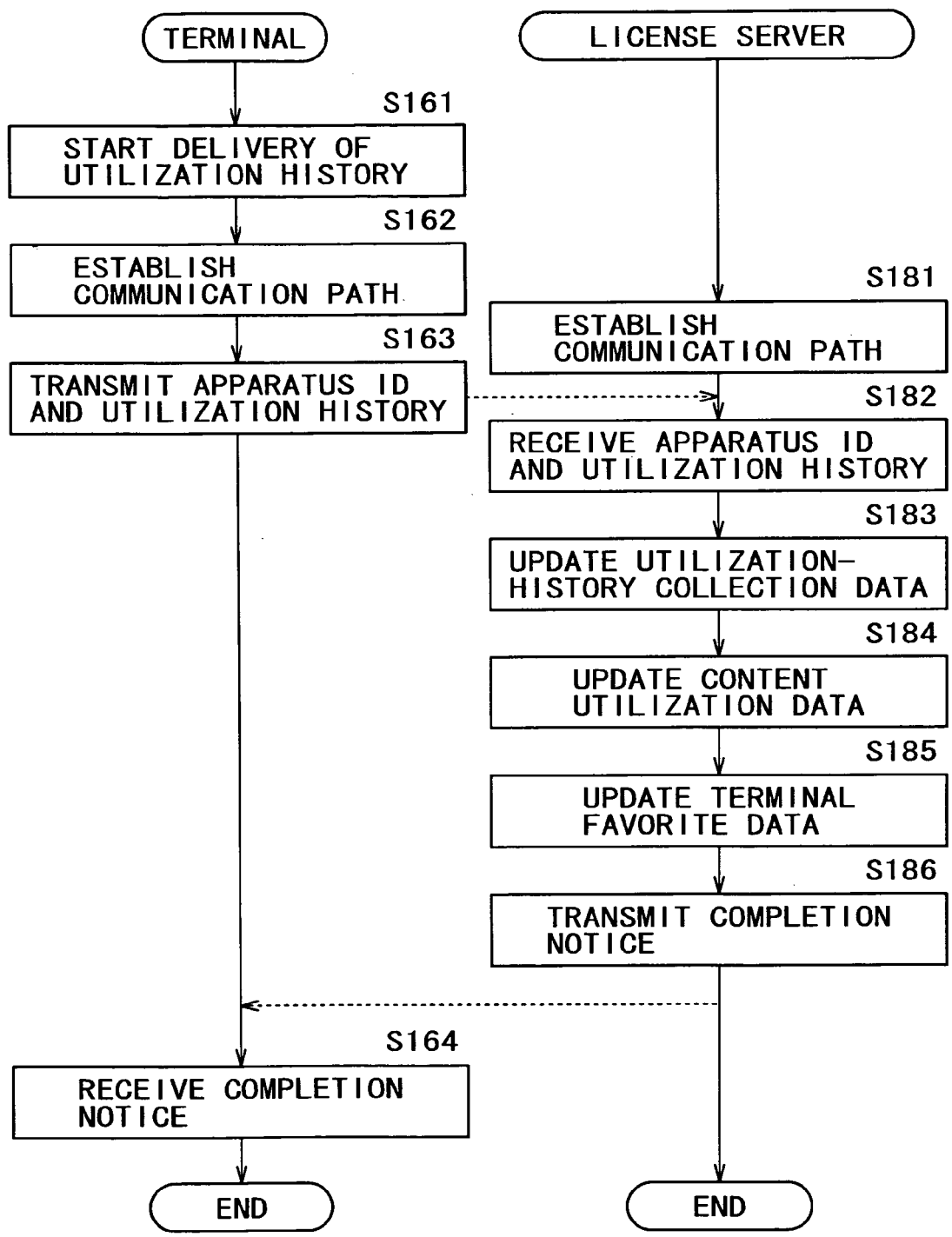
FIG. 39 shows an explanatory flowchart representing processing to deliver a utilization history.

In the processing represented by the flowchart shown in FIG. 39, a utilization history is transmitted from the terminal 211 to the license server 221. Thus, even if a set content is utilized in the terminal 211 in an offline mode, the license server 221 is capable of grasping the utilization of the set content.

As described above, in the apparatus-favorite table 221G of the license server 221, a terminal favorite is cataloged for each apparatus ID. Thus, on the basis of the apparatus-favorite table 221G, the license server 221 is capable of distributing contents to each terminal 211 identified by an apparatus ID in accordance with favorites with the user owning the terminal 211. Typical processing to distribute favorite contents as such is explained by referring to a flowchart shown in FIG. 40.

Figure 40:
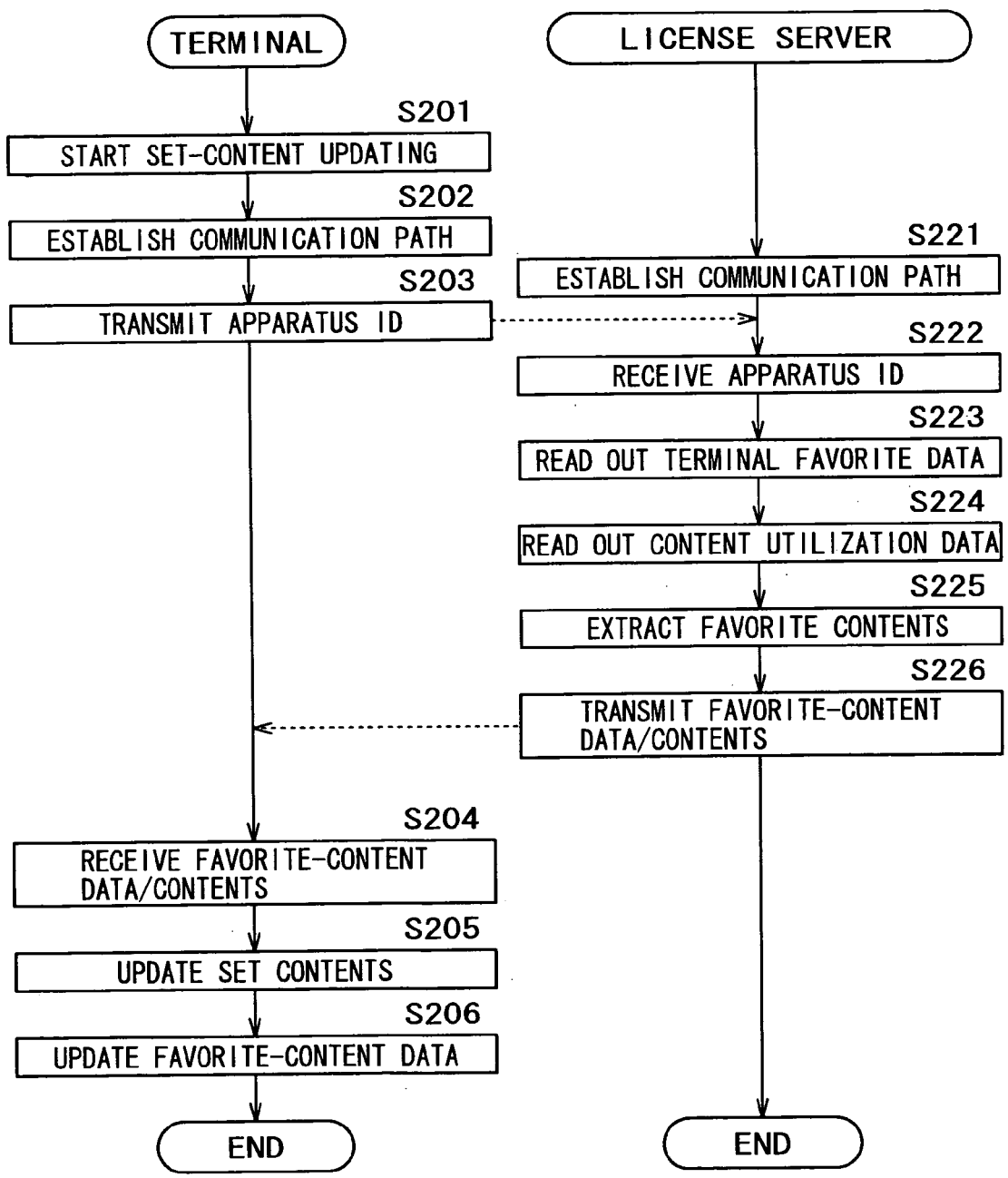
FIG. 40 shows an explanatory flowchart representing processing to transmit favorite-content data.

FIG. 40 shows a flowchart referred to in explanation of the processing to distribute favorite contents. It is to be noted that, much like the processing represented by the flowchart shown in FIG. 39, the processing to distribute favorite contents is started when the terminal 211 is put in an online state of being capable of communicating with the license server 221 or after a fixed period of time has lapsed since the end of processing to update a price.

First of all, at a step S201, the control module 311 of the terminal 211 starts a process to update data stored in the set-content database 212 in the format shown in FIG. 28.

Then, at the next step S202, the control module 311 controls the encryption-processing module 313 to generate authentication data by encryption of information such as the apparatus ID and the signature. The control module 311 also controls the communication module 314 to establish a path of communication with the license server 221 on the basis of the authentication data.

After the path of communication with the license server 221 is established, at the next step S203, the control module 331 controls the encryption-processing module 313 to transmit the encrypted apparatus ID to the license server 221.

In the mean time, at a step S221, as a counterpart of the processing carried out by the terminal 211 at the step S202, the communication module 254 of the license server 221 carries out processing to establish the path of communication with the terminal 211 to serve as a communication path for communicating information with a high degree of security protection. With such a path of communication established in this way, the apparatus ID transmitted by the terminal 211 at the step S203 is received by the communication module 254 of the license server 221 at a step S222.

Subsequently, at the next step S223, the control module 251 of the license server 221 controls the utilization-history collection module 256 to read out terminal favorite data associated with the apparatus ID received in the processing carried out at the step S222 from the apparatus-favorite table 221G stored in the database 258 in the format shown in FIG. 26. Assume for example that the apparatus ID is the ID of the terminal 211-1. In this case, data is read out from the first row of the typical apparatus-favorite table 221G shown in FIG. 26. As is obvious from the figure, the data indicates that the favorite utilization date/time type is mornings, the favorite utilized-portion type is introductions, the favorite utilization area type is residential streets and the favorite genre is J-POP.

Then, at the next step S224, the control module 251 controls the utilization-history collection module 256 to read out utilization data of the set content from the set-content utilization table 221F stored in the database 258 in the format shown in FIG. 25.

Subsequently, at the next step S225, the control module 251 controls the utilization-history collection module 256 to carry out processing to extract favorite contents on the basis of the terminal favorite data read out from the apparatus-favorite table 221G in the processing carried out at the step S223 and the utilization data read out from the set-content utilization table 221F in the processing carried out at the step S224. For example, the utilization-history collection module 256 extracts a content from the set-content utilization table 221F as a content used frequently at the favorite utilization date/time recorded in the apparatus-favorite table 221G. The utilization-history collection module 256 also extracts a content from the set-content utilization table 221F as a content with its utilized portion recorded in the apparatus-favorite table 221G as a portion utilized frequently. In addition, the utilization-history collection module 256 also extracts a content from the set-content utilization table 221F as a content used frequently in the same area as the favorite utilization area recorded in the apparatus-favorite table 221G. Moreover, the utilization-history collection module 256 also extracts a content from the set-content utilization table 221F as a content of the same genre as the favorite genre recorded in the apparatus-favorite table 221G. That is to say, the utilization-history collection module 256 is capable of extracting favorite contents peculiar to the terminal 211 from the set-content utilization table 221F shown in FIG. 25 on the basis of the apparatus-favorite table 221G shown in FIG. 26 and the apparatus ID received from the terminal 211. Then, the utilization-history collection module 256 generates favorite-content data like the one shown in FIG. 31 on the basis of the extracted favorite contents. In the case of this example, the favorite-content data is generated for the terminal 211-1.

Subsequently, at the next step S226, the control module 251 transmits favorite-content data like the one shown in FIG. 31 to the terminal 211 by way of the communication module 254. At that time, only contents included in the favorite-content data but not stored in advance in the terminal 211, that is, only contents other than contents stored in the set-content database 212 of the terminal 211 in advance, are properly selected by the license server 221 as contents to be transmitted to the terminal 211. In this embodiment, content data is not stored in the license server 221 but stored in the content server 222. Thus, the license server 221 issues a command to the content server 222 to transmit predetermined contents, that is, contents identified by content IDs included in the favorite-content data but not stored in advance in the terminal 211 or contents other than contents stored in the terminal 211 in advance to the terminal 211. In accordance with this command, the content server 222 reads out the predetermined contents from the content database 285 and transmits the contents to the terminal 211 by way of the network 2.

In this way, in the processing carried out at the step S226, the license server 221 and the content server 222 transmit favorite-content data and content data respectively to the terminal 211.

As a step S204, the communication module 314 of the terminal 211 receives the favorite-content data shown in FIG. 31 and the content data transmitted by the license server 221 and the content server 222 respectively in the processing carried out at the step S226.

Then, at the next step S205, the control module 311 of the terminal 211 updates the set-content database 212 by cataloging the content data received from the license server 221 in the set-content database 212.

Finally, at the next step S206 the control module 311 updates the favorite-content database 333 by cataloging the favorite-content data in the favorite-content database 333 before ending the processing.

By carrying out the processing represented by the flowchart shown in FIG. 40, the license server 221 is capable of extracting favorite-content data peculiar to the terminal 211 on the basis of the content utilization and the favorite data peculiar to the terminal 211. Thus, the license server 221 is capable of supplying contents to the terminal 211 as updates of set contents. It is to be noted that, if contents included in the favorite-content data to be transmitted at the step S226 are contents already stored in the set-content database 212 employed in the terminal 211, these contents are not transmitted in the processing carried out at the step S226. That is to say, in this case, only the favorite-content data is transmitted to the terminal 211.

After the processing represented by the flowchart shown in FIG. 40 is carried out, the terminal 211 is capable of reproducing a favorite content. Processing carried out by the terminal 211 to reproduce a favorite content is explained by referring to a flowchart shown in FIGS. 41 and 42 as follows.

It is to be noted that this processing is carried out after the processing represented by the flowchart shown in FIG. 40, that is, only if favorite-content data has been stored in the favorite-content database 333 of the terminal 211, and started when the user issues a command to reproduce a favorite content.

First of all, at a step S251, the GUI-processing module 312 receives a command to search for a content from user.

Then, at the next step S252, the GUI-processing module 312 requests the control module 311 to search for the content.

Subsequently, at the next step S253, the control module 311 acquires a list of contents from the favorite-content database 333. For example, the control module 331 acquires a table associating content IDs with favorite types and favorite names as shown in FIG. 31.

Then, at the next step S254, the control module 311 acquires a list of contents from the utilization-history database 332. For example, the control module 331 acquires a table associating utilization history IDs and content IDs with utilization dates/times, utilized portions, utilization locations and grades as shown in FIG. 30.

Subsequently, at the next step S255, the control module 331 supplies the content lists acquired in the pieces of processing carried out at the steps S253 and 254 to the GUI-processing module 312 as a list of favorite contents.

Then, at the next step S256, the GUI-processing module 312 displays the list of favorite contents. For example, the GUI-processing module 312 displays the list of favorite contents on the output unit 57. The user can then select a content to be reproduced from the favorite-content list displayed on the output unit 57.

Subsequently, at the next step S257, the GUI-processing module 312 receives a content selection from the user as an input indicating a content to be reproduced.

Then, at the next step S258, the GUI-processing module 312 informs the control module 331 of an ID identifying the selected content.

At the next step S259, the control module 331 reads out the selected content identified by the ID supplied by the GUI-processing module 312 from the set-content database 212 and starts reproduction of the content.

Figure 41:
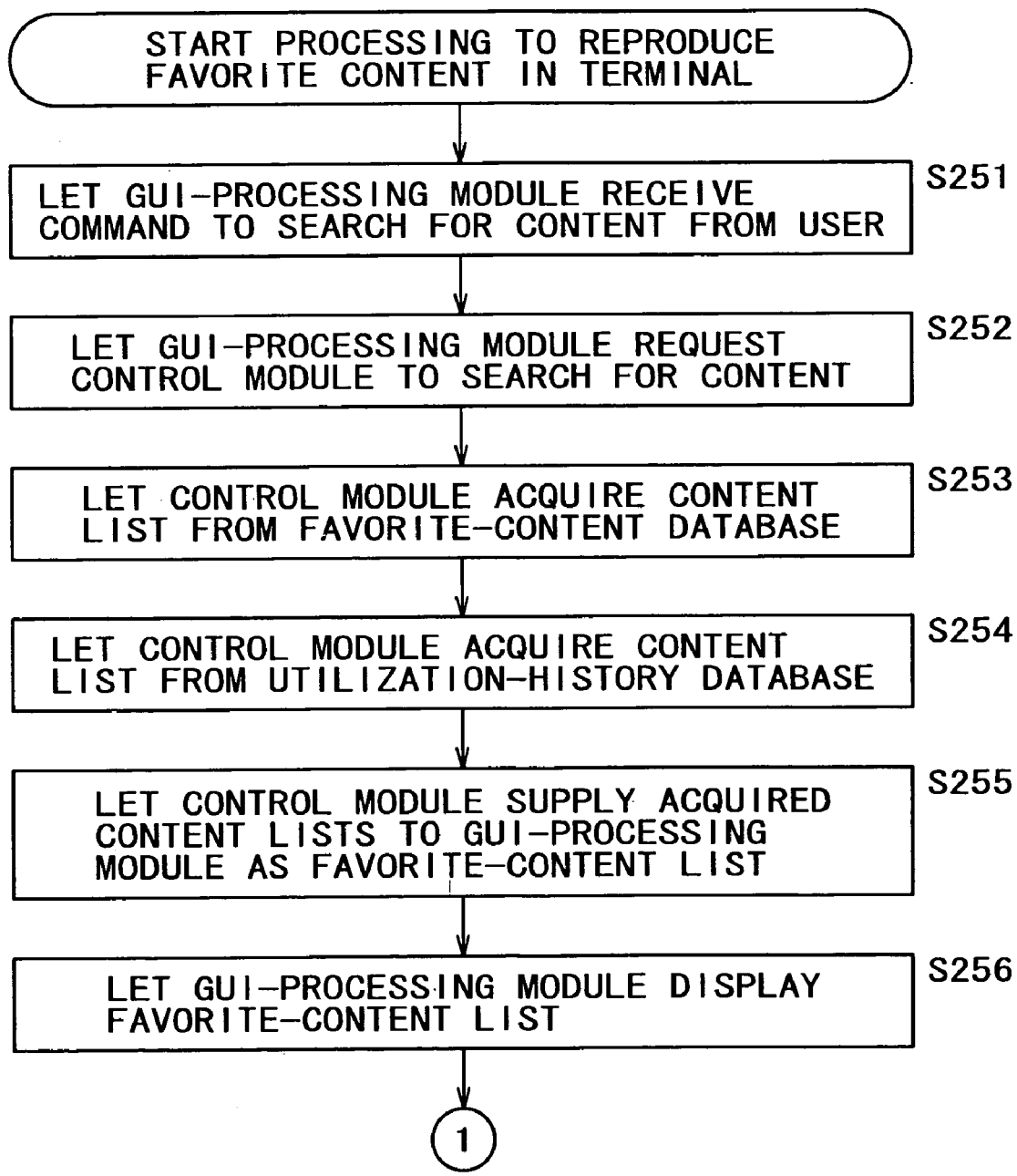
FIG. 41 shows an explanatory flowchart representing processing to reproduce a favorite content in a terminal.
Figure 42:
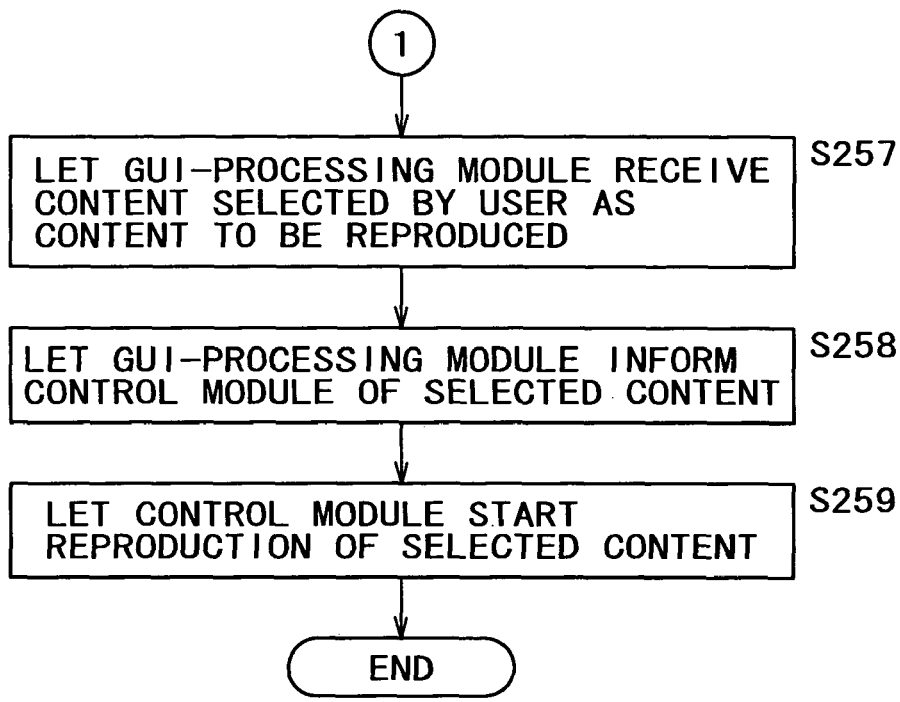
FIG. 42 shows an explanatory continuation flowchart representing the processing to reproduce a favorite content in a terminal.

In the processing represented by the flowchart shown in FIGS. 41 and 42, the user owning the terminal 211 can select a content based on the favorite with the user. Thus, the user is capable of reproducing a favorite content immediately.

It is to be noted that, after the processing represented by the flowchart shown in FIGS. 41 and 42 is carried out, the processing of the step S146 and subsequent steps in the flowchart shown in FIG. 37 can be performed.

Next, a process to update the price of a content is explained. In general, the price of a content changes with the lapse of time. By referring to a flowchart shown in FIG. 43, the following description explains processing carried out by the content producer and the system management enterprise, which are shown in FIG. 6, to accompany a change in content price. It is to be noted that the processing is carried out when the price of a predetermined content (or a predetermined set content) is changed.

First of all, at a step S271, the content producer determines a change in content price and reports the change to the system management enterprise.

Then, at the next step S272, the system management enterprise changes a price included in the price table as the price of a content whose price is to be changed. Finally, at the next step S273, the system management enterprise informs the license server 221 of the changed price as a price update.

Figure 44:
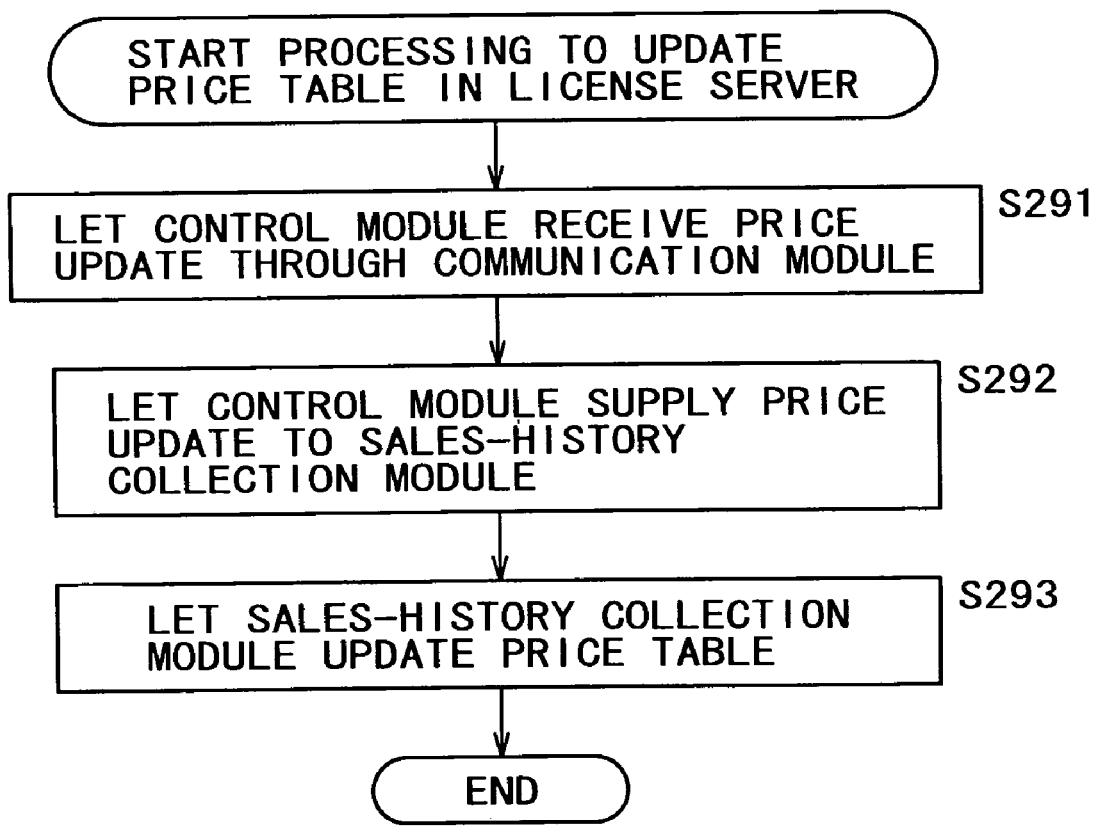
FIG. 44 shows an explanatory flowchart representing processing to update a price table in the license server.

By referring to a flowchart shown in FIG. 44, the following description explains processing carried out by the license server 221 to update the price table in accordance with a notification received from the system management enterprise at the step S273.

First of all, at a step S291, the control module 251 of the license server 221 receives a price update from the system management enterprise through the communication module 254. An example of the price update is a necessary point count of 3 for a content identified by a content ID CID02.

Then, at the next step S292, the control module 251 supplies the price update to the sales-history collection module 255.

Finally, at the next step S293, the sales-history collection module 255 updates the price table on the basis of the price update. If the price update is a necessary point count of 3 for a content identified by a content ID CID02, for example, the sales-history collection module 255 updates the third row of the price table shown in FIG. 23 by changing the necessary point count for the content ID CID02 from 5 to 3.

By carrying out the processing represented by the flowchart shown in FIG. 44, the license server 221 is capable of updating the price table.

Next, processing carried out by the license server 221 and the terminal 211 to update the price table is explained by referring to a flowchart shown in FIG. 45 as follows. It is to be noted that the execution of this processing is started after the terminal 211 has been put in a state of being capable of communicating with the license server 221.

First of all, at a step S311, the control module 311 of the terminal 211 starts price updating.

Then, at the next step S312, the control module 311 controls the encryption-processing module 313 to generate authentication data by encryption of information such as the apparatus ID and the signature. The control module 311 also controls the communication module 314 to establish a path of communication with the license server 221 on the basis of the authentication data.

After path of communication with the license server 221 is established, at the next the S313, the control module 331 controls the encryption-processing module 313 to transmit the encrypted apparatus ID to the license server 221.

In the mean time, at a step S331, as a counterpart of the processing carried out by the terminal 211 at the step S312, the communication module 254 of the license server 221 carries out processing to establish the path of communication with the terminal 211 to serve as a communication path for communicating information with a high degree of security protection. With such a path of communication established in this way, the apparatus ID transmitted by the terminal 211 at the step S313 is received by the communication module 254 of the license server 221 at a step S332.

Then, at the next step S333, the control module 251 of the license server 221 controls the utilization-history collection module 256 to read out a price update from the price table 221D stored in the database 258 in the format shown in FIG. 23. That is to say, the utilization-history collection module 256 reads out a price update necessary for the terminal 211 identified by the apparatus ID from the price table 221D. In other words, data for updating a price table stored in the terminal 211 or the price table updated in the processing represented by the flowchart shown in FIG. 44 as described earlier is read out as a price update. For example, a point count of 3 is read out as a price update necessary for a content identified by the content ID CID02 from the third row of the price table 221D shown in FIG. 23.

Subsequently, at the next step S334, the control module 251 transmits the price update to the terminal 211 by way of the communication module 254.

At a step S314, the communication module 314 of the terminal 211 receives the price update transmitted by the license server 221 in the processing carried out at the step S334.

Subsequently, at the next step S315, the control module 311 of the terminal 211 controls the purchasing process module 317 to catalog the price update in the price database 342 to update the price table stored in the price database 342.

Finally, at the next step S316, the control module 311 of the terminal 211 controls the purchasing process module 317 to update a table stored in the purchasing database 341 in the format shown in FIG. 32. For example, the purchasing process module 317 updates the table shown in FIG. 32 by replacing a price with a price modified at a purchasing time. This is because, since the effective period of the price table has a time limit, a price has been modified within the period. Assume for example that, as a result of the processing to update the price table, a point count necessary for a content identified by the content ID CID04 was changed to 10 as of Aug. 1, 2004. In this case, the consumption point count on the fourth row of the table stored in the purchasing database 341 shown in FIG. 32 is also updated to 10.

Figure 45:
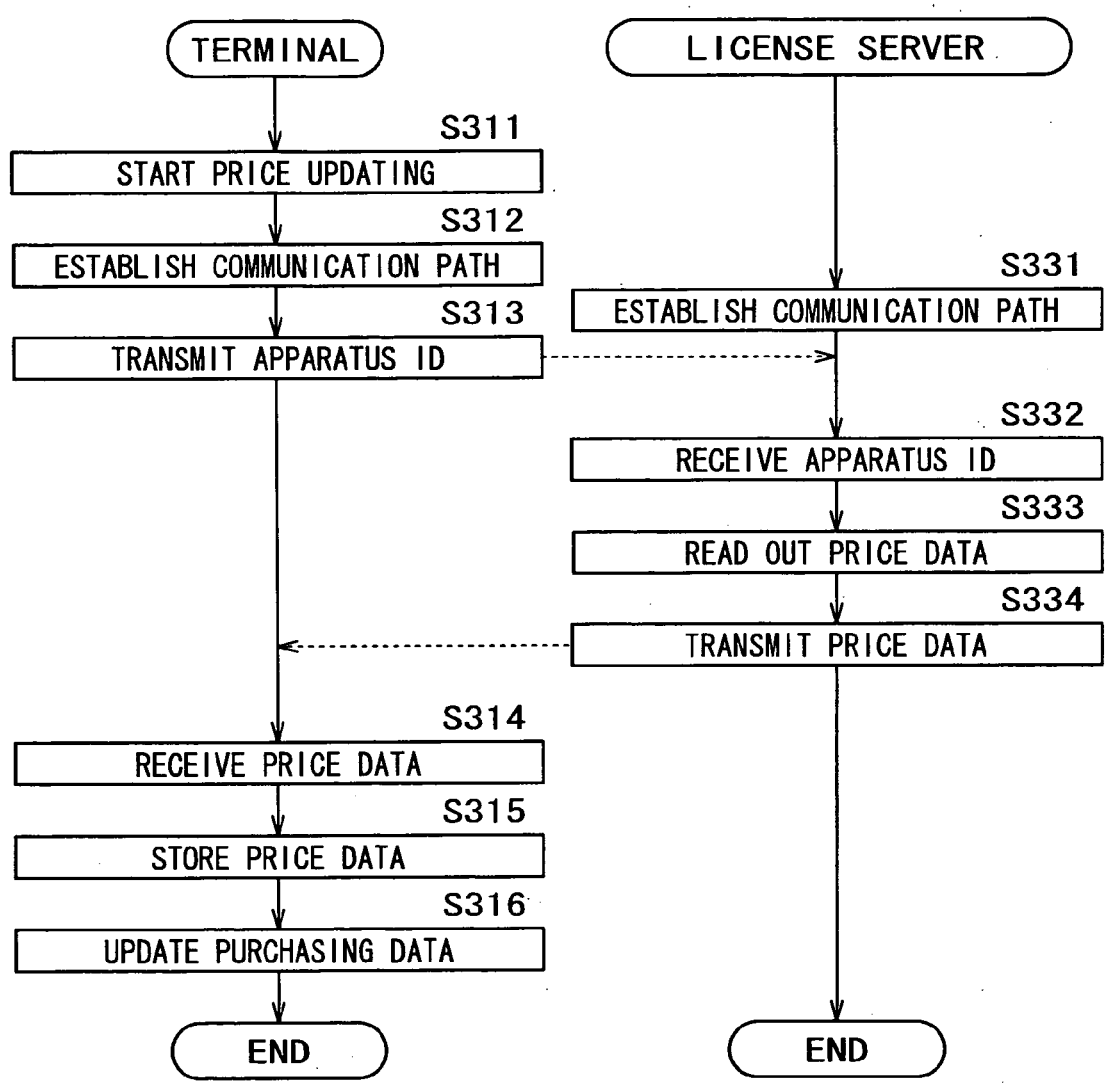
FIG. 45 shows an explanatory flowchart representing processing to update price data.

Thus, by carrying out the processing represented by the flowchart shown in FIG. 45, the license server 221 is capable of updating the price table stored in the terminal 211.

Figure 43:
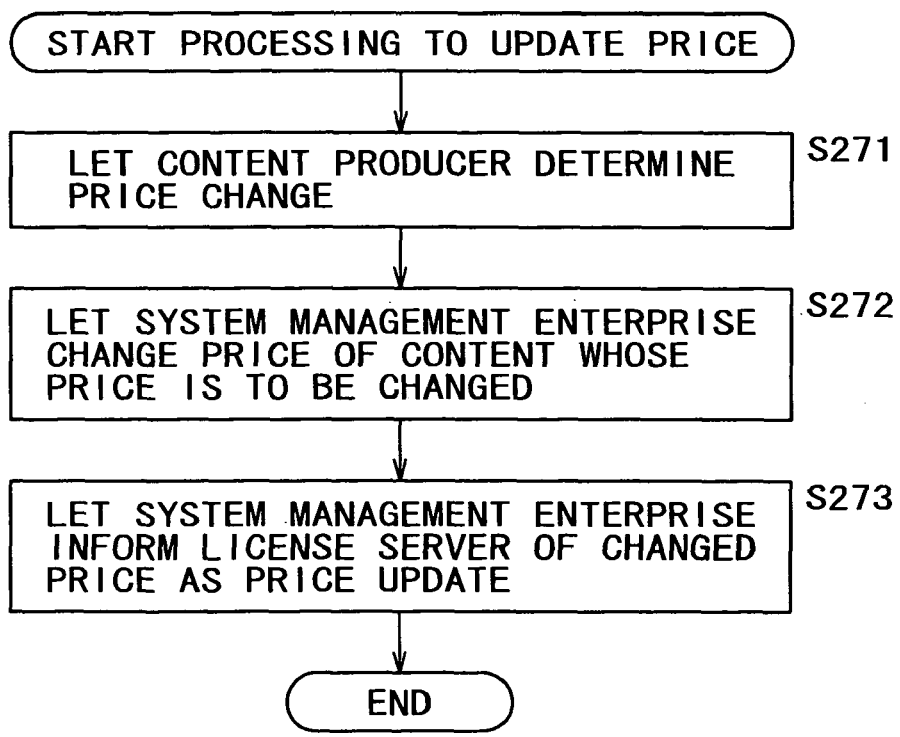
FIG. 43 shows an explanatory flowchart representing processing to update a price.

In the processing represented by the flowcharts shown in FIG. 43 to 45, a price or a price table is updated. Thus, it is possible to keep up with changes in content price.

Next, typical operations to set prices of contents are explained by referring to FIGS. 46 and 47 as follows.

Figure 46:
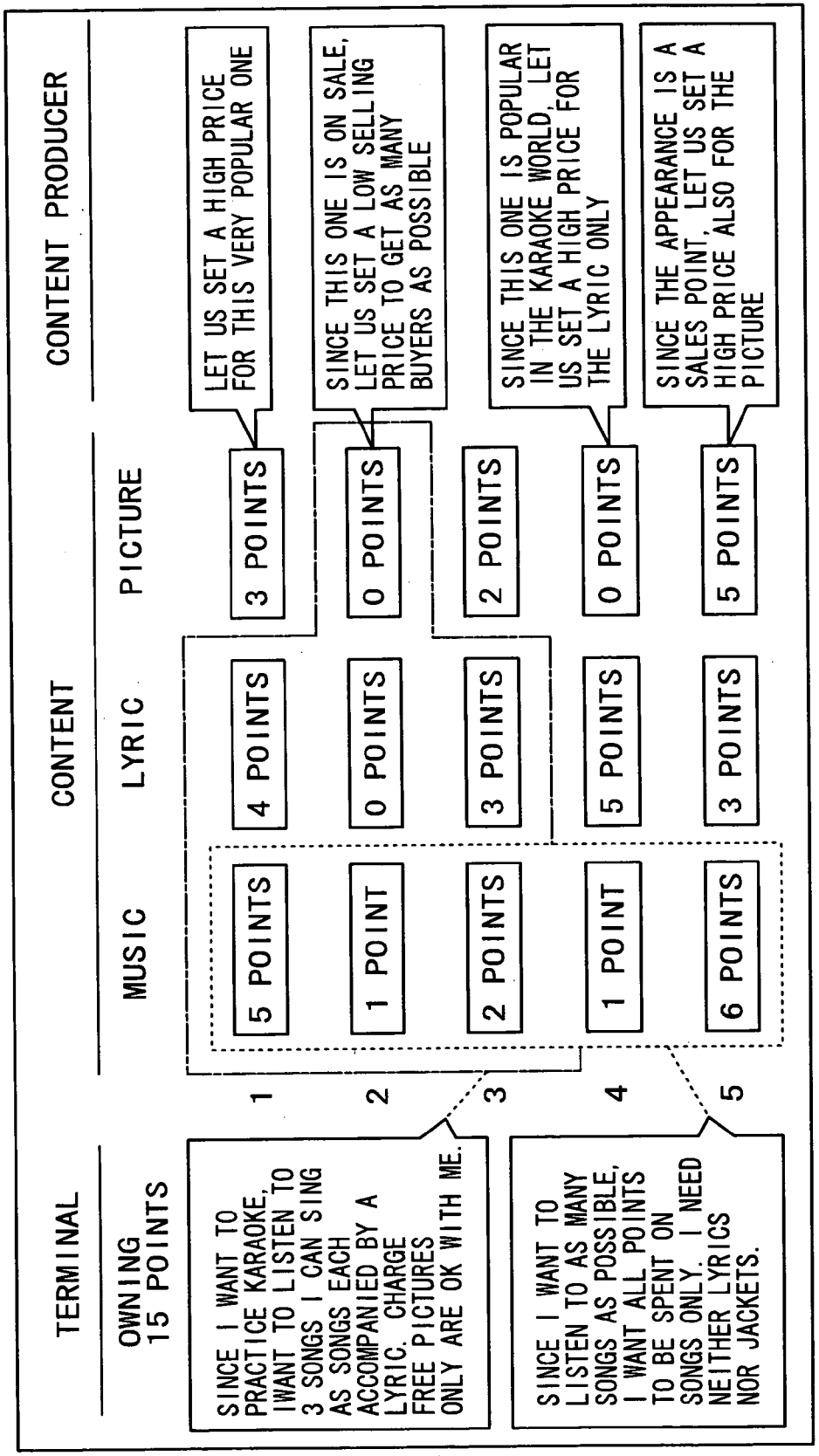
FIG. 46 is an explanatory diagram referred to in a description of updating prices of contents.

FIG. 46 is a diagram showing a typical case in which the terminal 211 owns 15 points purchased for example in the processing represented by the flowchart shown in FIG. 34.

Assume that the user owning the terminal 211 expresses: "Since I want to practice karaoke, I want to listen to 3 songs I can sing as songs each accompanied by a lyric. Charge-free pictures only are OK with me." In this case, the user may purchase, for example, the music and lyric of a first song, the music, lyric and picture of a second song and the music and lyric of a third song. Since the music and lyric of the first song are worth 5 points and 4 points respectively, the music, lyric and picture of the second song are worth 1 point, 0 points and 0 points respectively and the music and lyric of the third song are worth 2 points and 3 points respectively, the user needs to purchase a total of 15 points. As another example, the user owning the terminal 211 expresses: "Since I want to listen to as many songs as possible, I want all points to be spent on songs only. I need neither lyrics nor jackets." In this case, the user may purchase, for example, the music of each of first to fifth songs, which are worth a total of 15 points (=5 points+1 point+2 points+1 point+6 points).

From a content-producer point of view, a high price is set for the first song since the song is a very popular one. Since the second song is on sale, a low selling price is set for this song to get as many buyers as possible. Since the fourth song is popular in the karaoke world, a high price is set for only the lyric of the fourth song. As for the fifth song, since the appearance is a sales point, a high price is set also for the picture.

As described above, in the offline environment of the terminal 211, pseudo shopping using points can be carried out. In addition, in the license server 221, prices based on actual values can be set.

As shown in FIG. 47, a content producer can set prices in accordance with pricing policies such policies involving set discounts, price time variations and special campaigns.

An example of the set discounts is given as follows. If purchased individually, the user has to purchase contents at 10 points per content. If purchased collectively as an album, however, the user is required only to pay 6 points per content. As another example, if purchased individually, the user has to purchase contents at 10 points per content. If at least 10 contents of the same artist are purchased, however, the user is required only to pay 8 points per content. As a further example, if at least 30 contents produced by the same producer are purchased cumulatively, a right of 5 points is returned back to the user.

As for the price time variations, for example, during a period of 3 months after announcement of a content, the content is treated like a new one, having a value of 5 points. After the period of 3 months has lapsed, however, the content has only a value of 2 points. As another example, during 2 weeks in a selling season of a new song, the new song is worth 1 point but is raised to 5 points in adjustment to CD sales.

In the special campaigns, for example, songs like Christmas songs, which are not sold during an off season, can be listened to at a point count equal to half the normal point count in a sales campaign during an off season. As another example, a theme song of a movie is raised by necessary points in adjustment to a season of putting the movie in a TV broadcast. As a further example, due to a tie-up with a hardware manufacturer, the price of a content is discounted by necessary points when the content is listened to by using particular hardware.

It is to be noted that, even though the above descriptions assume that the set-content database 212 is stored in typically the hard disk 54 embedded in the terminal 211, the set-content database 212 can also be stored in a removable recording medium such as any one of the magnetic disk 61, the optical disk 62, the magneto-optical disk 63 and the semiconductor memory 64, which are shown in FIG. 7.

In addition, while sales records of set contents are collected for typically each terminal manufacturer or a content producer in the above descriptions, for example, the sales records of set contents can also be collected for each program development enterprise developing application programs such as the program of the encryption-processing module 313. Since examples for this case are similar to those shown in FIGS. 13 to 15, their descriptions are not repeated.

Further, by connecting any particular terminal 211 to another terminal 211 directly or through the network 2, a set content stored in the set-content database 212 of the particular terminal 211 and/or its utilization condition received from the license server 221 can be moved or copied to the other terminal 211. In this case, the terminal 211 functioning as the movement or copy source transmits the content ID of the moved or copied set content and the apparatus ID of the terminal 211 serving as the movement or copy destination to the license server 221 in order to inform the license server 221 that the set content and/or its utilization condition have been moved or copied to the destination terminal 211. As a result, the utilization of the set content in the other terminal 211 can be included in sales records. It is to be noted that, with a proper timing, the terminal 211 functioning as the movement or copy destination is also capable of transmitting the content ID of the moved or copied set content and the apparatus ID of the terminal 211 serving as the movement or copy destination to the license server 221 in order to inform the license server 221 that the set content and/or its utilization condition have been moved or copied to the destination terminal 211.

Furthermore, when a set content and/or a utilization condition is moved or copied, the terminal 211 can also store information on the movement or copy date/time in a memory and report the information to the license server 221. As a result, the license server 221 is capable of using the information on the movement or copy date/time in collection of sales records.

Moreover, the license server 221 is also capable of invalidating the use of a set content in a terminal 211 carrying out an illegal operation. The terminal 211 carrying out an illegal operation may be a terminal 211 serving as a movement or copy destination of a set content and/or its utilization condition. To put it concretely, the license server 221 stores the apparatus ID of a terminal 211 carrying out an illegal operation and, if a request to purchase a set content by specifying an apparatus ID matching the stored apparatus ID is received, the utilization condition of the set content is not transmitted to the terminal 211 sending the request.

As is obvious from the above descriptions, in accordance with the present invention, a content can be used immediately and expenses including the cost of the system construction and the cost of maintenance can be reduced. In addition, the price of a content can be updated.

In addition, the terminal 211 is connected to the license server 221 and the content server 222 by the network 2 so that updating processes can be carried out properly on the terminal 211. Thus, the user can install newly purchased songs in the set-content database 212 of the purchased terminal 211 as songs added to several thousand songs already stored in advance in the terminal 211.

Further, content IDs of contents pertaining to a range and an electronic point count for purchasing the contents can be purchased in an online mode and, later on, the contents pertaining to the range can be purchased by using electronic points in an offline mode. Thus, a terminal not connected to the network 2 all the time is also capable of reproducing a content.

Furthermore, in accordance with the terminal 211 provided by the second embodiment of the present invention, the terminal 211 is not only able to keep utilizing set contents stored in the terminal 211 in advance, but also capable of updating and adding songs (or contents) as favorites with the user. Thus, by utilizing this service, a set-content database 212 satisfying the desire of the user can be constructed.

As an application, in accordance with a command received from the license server 221, the terminal 211 can delete for example a content not serving as a favorite with the user owning the terminal 211. That is to say, on the basis of the utilization history for the terminal 211, the license server 221 may give a command to the terminal 211 as a command to delete some of set contents from the set-content database 212 of the terminal 211.

It is to be noted that every terminal and every server, which are described above, can be applied to an information-processing apparatus capable of communicating with another apparatus through a network.

The series of processes described above can be carried out by hardware and/or execution of software. If the series of processes described above is carried out by execution of software, programs composing the software can be installed into a computer embedded in dedicated hardware or a general-purpose personal computer or the like from a network or the recording medium described above. By installing a variety of programs into the general-purpose personal computer, the personal computer is capable of carrying out a variety of functions.

As shown in FIGS. 7 and 9, the recording medium for recording the programs is package media distributed separately from the computer as means for providing the user with the programs. Examples of the package media are the magnetic disks 61 and 91 including floppy disks, the optical disks 62 and 92 including CD-ROMs (Compact Disk-Read Only Memories) and DVDs (Digital Versatile Disks), the magneto-optical disks 63 and 93 including MDs (Mini Disks) and the semiconductor memories 64 and 94. The recording medium can also be provided to the user as a medium embedded in advance in the computer. Examples of the embedded recording medium are the ROMs 52 and 72 for recording the programs and the hard disks 54 and 74 each serving as a recording medium for storing the programs.

It is to be noted that, in this specification, steps describing a program recorded in the recording medium include of course processes that can be carried out in an order the steps are described along the time axis. However, the steps may also be processes that do not have to be carried out sequentially along the time axis. That is to say, the steps may also include processes that can be carried out concurrently or individually.

In addition, in this specification, a system represents the entire complete apparatus comprising a plurality of apparatus.

INDUSTRIAL APPLICABILITY

In accordance with the first to third inventions, for example, a content can be utilized immediately, whereas costs such as the costs to construct and maintain the content-providing system can be reduced. In particular, in the case of the first to third inventions, the price of a content can be updated.

In addition, in accordance with the fourth and fifth inventions, for example, a content can be utilized immediately, whereas costs such as the costs to construct and maintain the content-providing system can be reduced.

The invention claimed is:

1. A content-providing system comprising a terminal for utilizing contents and a server connected to said terminal through a network and used for managing said contents comprising:
   said terminal comprising:
   a storage unit having said contents, the contents including a plurality of predetermined content;
   a control unit programmed to transmit a request, via a communication unit, for utilization of at least one of said plurality of predetermined content by transmitting at least one content ID identifying the at least one of said plurality of predetermined content and by transmitting a request to purchase electronic points;
   wherein the control unit is further programmed to receive a table and a utilization-condition transmitted by said server in response to said request, wherein the table includes the at least one content ID and a corresponding predetermined cost for each of the at least one content ID, and wherein the utilization-condition includes an available electronic point amount determined based on the request to purchase electronic points;
   wherein the control unit is further programmed to store the utilization-condition in a utilization-condition storage unit and to store the table in a table storage unit;
   wherein the control unit is further programmed to receive an update for the table from said server, the update including a content ID from the at least one content ID and a corresponding current cost,
   wherein the control unit is further programmed to update the corresponding predetermined cost in the table for the content ID included in the update by replacing the respective predetermined cost with the corresponding current cost;
   a utilization execution unit programmed to acquire, from the table, a corresponding cost for at least one content ID included in the table, wherein the corresponding cost is the predetermined cost or a current cost received by the control unit;
   wherein the utilization execution unit is further programmed to update the utilization-condition, stored in the utilization-condition storage unit, by subtracting the corresponding cost from the available electronic point amount; and
   wherein the control unit is further programmed to transmit to said server, in response to reproduction of the predetermined content identified by said at least one content ID included in the table, utilization-history information comprising said at least one content ID included in the table and a characteristic of said reproduction;
   said server comprising:
   a control unit programmed to transmit, via a utilization-condition transmission unit, said table and said utilization condition to said terminal;
   wherein said control unit is further programmed to collect, via a collection unit, sales-history information comprising the available electronic point amount transmitted to the terminal and to store the sales-history information in a sales-history information storage unit;
   wherein said control unit is further programmed to transmit, via the utilization-condition transmission unit, the update for the table;
   wherein said collection unit is programmed to, in response to the utilization-history information transmitted by the terminal, identify and extract at least one content ID corresponding to said characteristic of said reproduction, wherein the at least one content ID extracted does not identify any of the plurality of predetermined content in the storage unit of the terminal;
   wherein said control unit is further programmed to transmit, to the terminal, the at least one content ID extracted.

2. The content-providing system according to claim 1, wherein said sales-history information stored in said sales-history information storage unit further includes an apparatus ID used for identifying said terminal.

3. An information-processing method executed by a content-providing system having a terminal connected to a server for utilizing contents through a network, said information-processing method comprising:
   storing, by the terminal, said contents, the contents including a plurality of predetermine content;
   transmitting, by the terminal, via a communication unit, a request for utilization of at least one of said plurality of predetermined content by transmitting at least one content ID identifying the at least one of said plurality of predetermined content and by transmitting a request to purchase electronic points;
   receiving, by the terminal, a table and a utilization-condition transmitted by said server in response to said request, wherein the table includes the at least one content ID and a corresponding predetermined cost for each of the at least one content ID, and wherein the utilization-condition includes an available electronic point amount determined based on the request to purchase electronic points;
   storing, by the terminal, the utilization-condition in a utilization-condition storage unit and storing, by the terminal, the table in a table storage unit;

receiving, by the terminal, an update for the table from said server, the update including a content ID for the at least one content ID and a corresponding current cost;

updating, by the terminal, the corresponding predetermined cost in the table for the content ID included in the update the associated current cost by replacing the respective predetermined cost with the corresponding current cost;

acquiring, by the terminal, from the table, a corresponding cost for at least one content ID included in the table, wherein the corresponding cost is the predetermined cost or a received current cost;

updating, by the terminal, the utilization-condition, stored in the utilization-condition storage unit, by subtracting the corresponding cost from the available electronic point amount; and transmitting, by the terminal, to said server, in response to reproduction of the redetermined content identified by said at least one content ID included in the table, utilization-history information comprising said at least one content ID included in the table and a characteristic of said reproduction;

transmitting, by the server, said table and said utilization condition to said terminal;

collecting, by the server, sales-history information comprising the available electronic point amount transmitted to the terminal and storing, by the server, the sales-history information in a sales-history information storage unit;

transmitting, by the server, the update for the table;

identifying and extracting, by the server, in response to the utilization-history information transmitted by the terminal, at least one content ID corresponding to said characteristic of said reproduction, wherein the at least one content ID extracted does not identify any of the plurality of predetermined content in the storage unit of the terminal; and transmitting to the terminal, by the server, the at least one content ID extracted.

* * * * *